US011783257B1

United States Patent
Estes et al.

(10) Patent No.: US 11,783,257 B1
(45) Date of Patent: Oct. 10, 2023

(54) SYSTEMS AND METHODS OF USING A TRANSFERRABLE TOKEN FOR GIG-ECONOMY ACTIVITY ASSESSMENT

(71) Applicant: STATE FARM MUTUAL AUTOMOBILE INSURANCE COMPANY, Bloomington, IL (US)

(72) Inventors: Hannah Estes, Queen Creek, AZ (US); Audrey Schwartz, Mesa, AZ (US); Michael DiBenedetto, Mesa, AZ (US); James P. Rodriguez, Avondale, AZ (US); Anna Zarkoob, Tempe, AZ (US); Ben Tucker, Bloomington, IL (US); Dar Beachy, Hopedale, IL (US); Elijah Abella, Chandler, AZ (US); Diana Sherwood, Scottsdale, AZ (US); Emily Bryant, Mesa, AZ (US); Kristin Sellers, Gilbert, AZ (US); Brian M. Fields, Normal, IL (US); Hanpei Zhang, Mesa, AZ (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 73 days.

(21) Appl. No.: 17/170,830

(22) Filed: Feb. 8, 2021

Related U.S. Application Data

(60) Provisional application No. 63/021,360, filed on May 7, 2020, provisional application No. 62/971,519, filed on Feb. 7, 2020.

(51) Int. Cl.
*G06Q 10/00* (2023.01)
*G06N 20/00* (2019.01)
*G06Q 10/0635* (2023.01)
*G06Q 10/0639* (2023.01)
(Continued)

(52) U.S. Cl.
CPC ......... *G06Q 10/0635* (2013.01); *G06N 20/00* (2019.01); *G06Q 10/02* (2013.01); *G06Q 10/0633* (2013.01); *G06Q 10/06398* (2013.01)

(58) Field of Classification Search
CPC ................................................ G06Q 10/06398
See application file for complete search history.

(56) References Cited

U.S. PATENT DOCUMENTS

| 9,311,271 | B2 | 4/2016 | Wright |
| 9,633,487 | B2 | 4/2017 | Wright |
| 10,192,369 | B2 | 1/2019 | Wright |

(Continued)

*Primary Examiner* — Matheus Ribeiro Stivaletti
(74) *Attorney, Agent, or Firm* — MARSHALL, GERSTEIN & BORUN LLP

(57) ABSTRACT

Systems and methods relating to improving the experience of gig-economy workers are disclosed, with particular reference to gig-economy work involving vehicle use. Such systems and methods include automatically monitoring and evaluating activities such as driving during performance of gigs, as well as providing recommendations based thereupon. Transferable tokens may be used to apply information across various types of gig activities. Such a transferable token may represent one or more risk levels associated with a gig-economy worker to provide reputational information between gig-economy platforms or between types of gig-economy activities. Thus, the transferable token may enable a gig-economy worker to transfer high customer ratings across gig-economy platforms.

17 Claims, 18 Drawing Sheets

(51) Int. Cl.
*G06Q 10/02* (2012.01)
*G06Q 10/0633* (2023.01)

(56) References Cited

U.S. PATENT DOCUMENTS

| | | | |
|---|---|---|---|
| 10,198,879 B2 | 2/2019 | Wright | |
| 2012/0253892 A1* | 10/2012 | Davidson | G06Q 10/0631 |
| | | | 705/7.42 |
| 2013/0047253 A1* | 2/2013 | Radhakrishnan | G06F 21/552 |
| | | | 726/22 |
| 2017/0091699 A1* | 3/2017 | Mueller | H04W 4/023 |
| 2018/0247273 A1* | 8/2018 | Tamma | G06Q 10/1095 |
| 2019/0375416 A1* | 12/2019 | Rau | G06N 20/20 |
| 2020/0005213 A1* | 1/2020 | Clemens | G06Q 10/063114 |
| 2021/0142229 A1* | 5/2021 | Young | G06Q 30/0283 |

\* cited by examiner

SYSTEMS AND METHODS OF USING A TRANSFERRABLE TOKEN FOR GIG-ECONOMY ACTIVITY ASSESSMENT

CROSS-REFERENCE TO RELATED APPLICATIONS

This application claims the benefit of U.S. Provisional Application No. 62/971,519 (filed Feb. 7, 2020) and U.S. Provisional Application No. 63/021,360 (filed May 7, 2020), the entirety of each of which is incorporated by reference herein.

TECHNICAL FIELD

The present disclosure generally relates to systems and methods for detecting, monitoring, and optimizing gig-economy work for gig-economy workers, particularly with respect to gigs involving vehicles or transportation.

BACKGROUND

Gig-economy work has grown significantly in recent years due to the coordination power of mobile computing networks. Millions of gig-economy workers provide a broad array of gig-economy services, such as on-demand transportation services (e.g., ridesharing or transportation network company ("TNC") services), distributed goods delivery services, project-based home and office assistance services, and other services on an ad hoc or transactional basis.

The rapid increase in both supply and demand for such services has drawn in many new service providers, but information resources are lacking. The differences between traditional work and gig-economy work have left gaps in areas such as risk assessment and gig optimization. This results in an increased record-keeping burden on individual gig-economy workers to attempt to track their own activities. Additionally, by the distributed nature of gig-economy work, the supply of gig-economy is the result of many unrelated individual decisions, making it difficult for individual gig-economy workers to determine whether it is worthwhile to offer their services at any given time.

Certain costs with significant impacts on gig-economy work profitability are also unobservable by even the most sophisticated gig-economy workers. For example, on-demand transportation services are typically in high demand at times and places where risk levels of vehicle accidents are elevated (e.g., during inclement weather, in crowded business districts, and late at night on weekends). However, risk levels associated with on-demand transportation gigs may not be directly observable. Thus, gig-economy workers are left without much-needed information relating to costs of providing gig services relative to the revenue that may be obtained from offering such services. Thus, inefficient use of gig-economy worker effort results from a lack of relevant data. Conventional techniques may have other drawbacks as well.

SUMMARY

The present embodiments relate to, inter alia, detecting, monitoring, and optimizing gig-economy work based upon data associated with a plurality of gig-economy workers and relating to a plurality of gigs performed by such gig-economy workers. Additional, fewer, or alternative features described herein below may be included in some aspects.

In one aspect, a computer-implemented method for monitoring and evaluating gig-economy work (e.g., commercial driving activity) may be provided. The method may include, via one or more processors, servers, transceivers, and/or sensors, (i) receiving (and/or generating) availability data corresponding to a gig-economy worker; (ii) responsive to receiving the availability data, collecting a set of data indicative of one or more gig-related behaviors (e.g., driving behaviors) of the gig-economy worker; (iii) determining a risk score for each gig-related behavior indicated in the set of data; and/or (iv) determining a gig-economy worker profile (e.g., a commercial driving profile) corresponding to the gig-economy worker by evaluating each risk score. The method may include additional, less, or alternate actions, including those discussed elsewhere herein.

In another aspect, a computer-implemented method for detecting gig-economy work (e.g., commercial driving activity) may be provided. The method may include, via one or more processors, servers, transceivers, and/or sensors, (i) receiving (and/or generating) movement data representing movement (e.g., movement of a vehicle) associated with a gig-economy worker; (ii) responsive to receiving the movement data, determining likelihoods that portions of the movement data are attributable to gig-economy work (e.g., commercial driving activities) based upon the movement data; and/or (iii) determining an aspect of an insurance policy for the gig-economy work or the gig-economy worker (e.g., insurance for a vehicle) based upon the likelihoods. The method may include additional, less, or alternate actions, including those discussed elsewhere herein.

In yet another aspect, a computer-implemented method for optimizing gig-economy work (e.g., commercial driving activity) may be provided. The method may include, via one or more processors, servers, transceivers, and/or sensors, (i) receiving, at one or more processors, one or more gig optimization criteria indicating one or more outcome gig metrics to optimize; (ii) obtaining condition data indicating a plurality of conditional values for gig metrics; (iii) selecting one or more gig-economy data models associated with the one or more outcome gig metrics; (iv) generating one or more gig optimization recommendations associated with the one or more gig optimization criteria by applying at least some of the condition data to the one or more gig-economy data models; and/or (v) causing at least one of the one or more gig optimization recommendations to be presented to a gig-economy worker by a display of a mobile computing device associated with the gig-economy worker. The method may include additional, less, or alternate actions, including those discussed elsewhere herein.

In a still a further aspect, a computer-implemented method for generating a transferable token for a gig-economy worker may be provided. Generating such a transferable token may include: (1) receiving data representing at least one of an activity, a behavior or a work of the gig-economy worker; (2) responsive to receipt of the data, determining at least one of a risk level or a risk profile for the gig-economy worker based upon the data; (3) forming a transferable token that includes the at least one of the risk level or the risk profile; and/or (4) when requested by a third party, providing the transferable token to the third party. The transferable token may be used by the third party to offer a new or updated policy, service, agreement, or account. The method may include additional, less, or alternate actions, including those discussed elsewhere herein.

In another aspect, a computer system for displaying targeted recommendations for transportation network trips may be provided. The computer system may comprise a transceiver, one or more memories, an electronic display disposed within a vehicle, and one or more processors interfacing with the transceiver, the one or more memories, and the electronic display. The one or more processors may be configured to receive availability data corresponding to a gig-economy worker and environmental data associated with an environment of the vehicle; determine a targeted recommendation based upon the environmental data; and/or cause the electronic display to display the targeted recommendation. The system may be configured to have additional, less, or alternate functionality, including that discussed elsewhere herein.

In another aspect, a computer-implemented method for displaying targeted recommendations for transportation network trips may be provided. The method may comprise (1) receiving availability data corresponding to a gig-economy worker and environmental data associated with an environment of the vehicle; (2) determining a targeted recommendation based upon the environmental data; and/or (3) displaying the targeted recommendation on an electronic display disposed within the vehicle. The method may include additional, less, or alternate actions, including those discussed elsewhere herein.

In another embodiment, a computer readable storage medium comprising non-transitory computer readable instructions stored thereon for displaying targeted recommendations for transportation network trips may be provided. The instructions when executed on one or more processors may cause the one or more processors to receive availability data corresponding to a gig-economy worker and environmental data associated with an environment of a vehicle; determine a targeted recommendation based upon the environmental data; and/or cause an electronic display disposed within the vehicle to display the targeted recommendation. The instructions may direct additional, less, or alternate functionality, including that discussed elsewhere herein.

According to another aspect, methods of coordinating or mobilizing gig-economy services may be provided. Such methods may include, via one or more processors, servers, and/or transceivers, (i) obtaining an indication of a triggering event associated with an elevated level of demand for a type of gig-economy service; (ii) generating a demand profile including parameters indicating a demand quantity of the type of gig-economy service; (iii) communicating demand data associated with the demand profile to one or more gig-economy platforms via corresponding application programming interfaces (APIs) of the one or more gig-economy platforms; (iv) receiving availability data regarding availability of a plurality of gig-economy workers for the type of gig-economy service based upon the demand profile; and/or (v) coordinating performance of the type of gig-economy service by at least some of the plurality of gig-economy workers for at least some of a plurality of gig-economy service consumers. The plurality of gig-economy service consumers may be identified based upon an association between the gig-economy service consumers and the elevated level of demand. In some embodiments, coordinating performance of the type of gig-economy service may include sending alerts to inactive gig-economy workers to indicate the elevated level of demand.

Systems or computer-readable media storing instructions for implementing all or part of the methods described above may also be provided in some aspects. Systems for implementing such methods may include one or more of the following: a mobile computing device, an on-board computer of a vehicle, a remote server, one or more sensors, one or more communication modules configured to communicate wirelessly via radio links, radio frequency links, and/or wireless communication channels, and/or one or more program memories coupled to one or more processors of any such computing devices or servers. Such program memories may store instructions to cause the one or more processors to implement part or all of the method described above.

BRIEF DESCRIPTION OF DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The Figures described below depict various aspects of the applications, methods, and systems disclosed herein. It should be understood that each Figure depicts an embodiment of a particular aspect of the disclosed applications, systems and methods, and that each of the Figures is intended to accord with one or more possible embodiments thereof. Furthermore, wherever possible, the following description refers to the reference numerals included in the following Figures, in which features depicted in multiple Figures are designated with consistent reference numerals.

Figure 1A:
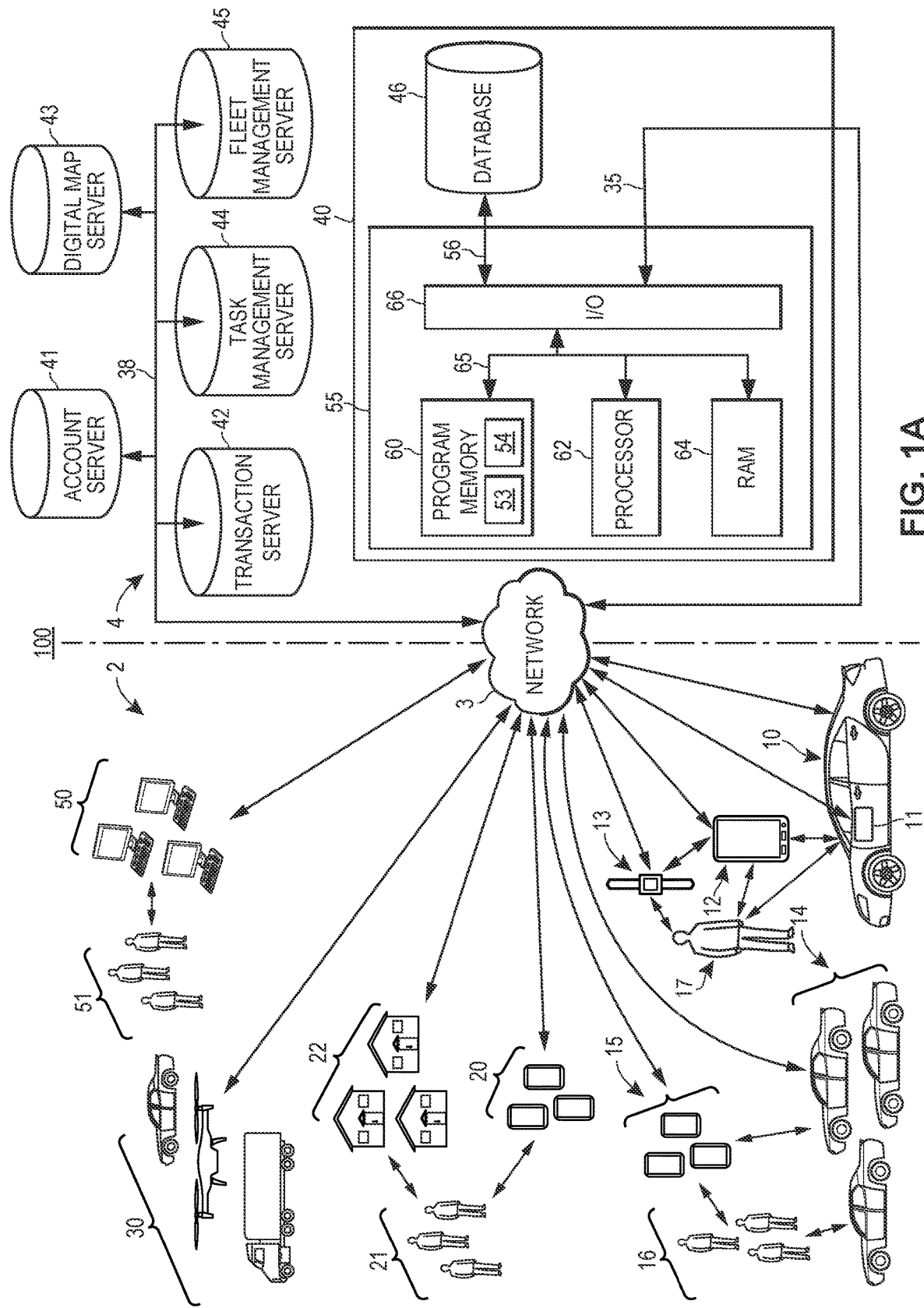
FIG. 1A illustrates a block diagram of an exemplary gig-economy system for facilitating and/or monitoring gig-economy work.

The Figures depict embodiments for purposes of illustration only. One skilled in the art will readily recognize from the following discussion that additional, and/or alternative embodiments of the systems and methods illustrated herein may be employed without departing from the principles of the invention described herein.

DETAILED DESCRIPTION

Gig-economy work currently suffers from a lack of available data upon which gig-economy workers may act to optimize their efforts. In order to provide accurate, timely, and actionable information, the techniques disclosed herein generally describe collecting and evaluating gig-related data to provide new information to gig-economy workers. With the authorization of gig-economy workers, the gig-related data may be automatically collected from computing devices (e.g., smartphones, mobile devices, wearables, vehicle sensors, and/or home sensors) associated with gig-economy workers using sensors installed therein or connected thereto. Thus, data regarding gig-economy work performance (e.g., hours, locations, profitability) may be collected and evaluated to provide records and recommendations for improving gig-economy work.

Such recommendations may include recommendations to reduce risk or increase the quality of gig-economy work at particular locations and times for particular gig-economy workers. Thus, customized recommendations may be generated and presented to gig-economy workers. Some such recommendations may include or be based upon criteria that are unobservable to gig-economy workers, such as risks (and associated expected values of losses) related to gigs. In some embodiments, gig insurance policies covering gig-economy work by gig-economy workers may be offered or used as a point of comparison for recommendations (e.g., to provide gig-economy workers estimates of cost differentials between gigs with different risk levels).

As used herein, the term "gig-economy work" means work performed by a gig-economy worker on a transactional basis that is mediated by a gig-economy platform that connects workers with customers for the provision of specific tasks or projects. Such gig-economy work may include on-demand or scheduled services, such as on-demand transportation, product delivery, defined scope office work, home project assistance, moving assistance, or outpatient medical services. As used herein, the term "gig-economy worker" means a worker engaged in the gig economy to perform gig-economy work for customers on a gig basis.

As used herein, the term "gig" means a specifically defined task, service, project, or activity performed on a predefined basis for the particular gig through a gig-economy platform. Example gigs include vehicle transportation between specified locations, delivery of a specified amount of goods to specified locations, installation of specified equipment at a specified location at a scheduled time, or remote on-demand diagnosis of a medical condition. As used herein, the term "gig-economy platform" means a digital platform operated by a networked computer system configured to match requests for performance of gigs by customers with offers to perform gigs by gig-economy workers.

Exemplary Gig-Economy System

FIG. 1A illustrates a block diagram of an exemplary gig-economy system 100 on which the exemplary computer-based methods described herein may be implemented. The high-level architecture may include both hardware and software applications, as well as various data communications channels for communicating data between the various hardware and software components. The gig-economy system 100 may be roughly divided into front-end components 2 and back-end components 4. The front-end components 2 may be associated with gig-economy workers and customers and may be configured to receive, generate, obtain, process, or present data regarding gig-economy work, including customer demand for services and worker availability to perform services. The back-end components 4 may be associated with gig-economy platforms providers and other data providers or consumers and may be configured to obtain and process gig-related data from the front-end components 2 in order to facilitate, monitor, manage, direct, aggregate, or optimize performance of gig-economy work.

In some embodiments of the system 100, the front-end components 2 may communicate with the back-end components 4 via a network 3. Various mobile computing devices 110 (discussed in further detail below) may communicate with the back-end components 4 via the network 3 to allow the back-end components 4 to match gig-economy workers with customers, monitor gig-economy work tasks and projects, process payment for gig-economy work performed, and/or record relevant details regarding gig-economy work. The back-end components 4 may use one or more servers 40 to receive data from the front-end components 2, store the received data, process the received data, and/or communicate information associated with the received or processed data. Some embodiments may include fewer, additional, or alternative components.

The front-end components 2 may include various computing devices configured to generate, process, or present information associated with the gig-economy work to gig-economy workers, customers, and additional participants. With respect to gig-economy workers, the front-end components 2 may include one or more vehicles 10 having on-board computers 11, user mobile devices 12, and/or wearable computing devices 13, all associated with a gig-economy worker 17. A plurality of additional vehicles 14 (which may include additional on-board computers, not shown) and additional mobile devices 15 may be associated with a plurality of additional gig-economy workers 16. Each vehicle 10, 14, mobile device 12, 15, and wearable 13 may have one or more sensors, including one or more cameras, audio devices, or other recording devices, for generating sensor data, image and audio data, and/or other data.

In some embodiments, autonomous devices 30 may also act as gig-economy workers or may take actions in conjunction with gig-economy workers 16 or 17 to provide gig-economy services to customers by performing gigs in whole or part. For example, an autonomous vehicle may deliver a shipment of equipment to a location on a street near a customer office, but a gig-economy worker 17 may be needed to remove the equipment from the autonomous vehicle and install the equipment within the customer office.

The vehicle 10 may be a personal vehicle associated with the gig-economy worker 17, such as an owned or leased vehicle. The vehicle 10 may similarly be a rental vehicle or a vehicle-share vehicle used by the gig-economy worker 17.

The vehicle may be any type of powered or unpowered vehicle used by the user for transportation. Over time, the gig-economy worker 17 may make a plurality of trips between various locations using various vehicles 10, which may include gig-related trips and personal trips.

Information regarding at least some such trips may be generated, collected, transmitted, or stored by one or more mobile computing devices 110 associated with the vehicle 10 or the gig-economy worker 17, such as an on-board computer 11, a user mobile device 12, or a wearable computing device 13. The on-board computer 11A may be a factory-installed or aftermarket computer installed within the vehicle 10 to perform monitoring, control, or other functions. The on-board computer 11A may be configured to provide general vehicle management and control, or it may be configured for a specific purpose, such as monitoring vehicle usage or recording data regarding vehicle operation. The on-board computer 11A may interface with the one or more sensors within the vehicle 10 to collect data regarding vehicle movement or operation.

The user mobile device 12 may include general-purpose or special-purpose computing devices used by the user and designed for portability, such as a smart phone, a laptop computer, a notebook computer, a tablet computer, or other computing devices associated with the gig-economy worker 17. The user mobile device 12 may include one or more applications, programs, or routines configured to monitor user transportation, as well as generating an interface for presenting information to the user and receiving information from the user.

The wearable computing device 13 may include general-purpose or special-purpose computing devices designed to be worn by the user, such as smart watches, smart glasses, fitness trackers, or other similar devices. The wearable computing device 13 may be configured to operate independently or may require a communication connection with a user mobile device 12 for some or all features.

In some embodiments, additional sensors, transceivers, or computing devices in the operating environment of the vehicle 10 may collect or provide additional information. For example, infrastructure components (not shown) installed in various environments may provide information regarding vehicle location or local conditions (e.g., weather or traffic conditions).

The front-end components 2 may further include additional vehicles 14 associated with the additional gig-economy workers 16. Such additional vehicles 14 may include traditional, semi-autonomous, or autonomous vehicles not currently being used by the user, such as personal vehicles of others, commercial vehicles, or vehicle-share vehicles. Some such additional vehicles 14 may include or be associated with addition mobile devices 15, which may be on-board computers or mobile devices similar to those discussed above.

These additional mobile devices 15 may be communicatively connected to sensors or other components within the additional vehicles 14, to other additional vehicles 14 or the vehicle 10, to infrastructure components, to other transportation components, or to the network 3. For example, the additional mobile devices 15 may be configured to implement vehicle-to-vehicle or vehicle-to-infrastructure communication, which may include communication with the computing devices associated with the vehicle 10. The additional vehicles 14 and the additional mobile devices 15 may be associated with the additional gig-economy workers 16, who may be other users of the system 100.

With respect to customers, the front-end components 2 may include a plurality of customer computing devices 20 and/or connected home devices 22 associated with a plurality of customers 21. The customers 21 may use the customer computing devices 20 or connected home devices 22 to request gig-economy services, specify details regarding such gigs, confirm gigs, or initiate payment associated with gigs. In some embodiments, the connected home devices 22 may be configured to automatically obtain gig-economy services by requesting gigs be performed when certain conditions are determined to have been met (e.g., replacing air filters periodically, scheduling HVAC routine maintenance, scheduling cleaning services, or repair of malfunctioning components of a smart home system). Thus, connected home devices 22 may communicate with gig-economy platforms via the network 3 to obtain gig-economy services in response to the occurrence of triggering conditions, which an associated customer 21 may have set or authorized in advance.

In some embodiments, autonomous devices 30 may similarly operate as customers to obtain gig-economy services, such as by requesting performance of maintenance gigs (e.g., clearing sensor blockage, replacing sensors, fueling, inflating tires, cleaning the vehicle interior or exterior, or other services). For example, an autonomous vehicle may obtain cleaning of a passenger compartment or clearing/repair of a blocked sensor during ongoing operation providing autonomous transportation service.

In some embodiments, the front-end components 2 may further include additional participant computing devices 50 associated with additional participants 51 to interact with other components of the gig-economy system 100. Such additional participants 51 may be associated with data providers or consumers, such as owners of autonomous devices 30, traditional service providers, advertising or marketing services, or management service providers. The additional participants 51 may obtain information regarding gig-economy work and provide or offer related services to customers 21 or gig-economy workers 16 and 17. For example, moving equipment rental facilities may offer equipment rental for gigs, which may be provided to gig-economy workers 16 and 17 through a user interface associated with the server 40 or with a gig-economy platform.

In some embodiments, some of the front-end components 2 may generate or collect telematics or other data, which telematics data may be associated with gigs or may be used for comparison of gig and non-gig conditions. The telematics data may be communicated to the server 40 or other back-end components 4 via the network 3.

The various computing devices of the front-end components 2 may communicate with the back-end components 4 via wired or wireless connections to the network 3. The network 3 may be a proprietary network, a secure public internet, a virtual private network or some other type of network, such as dedicated access lines, plain ordinary telephone lines, satellite links, cellular data networks, combinations of these. The network 3 may include one or more radio frequency communication links, such as wireless communication links with mobile computing devices 110, such as the on-board computer 11, user mobile device 12, wearable computing device 13, additional mobile devices 15, customer computing devices 20, connected home devices 22, autonomous devices 30, or additional participant computing devices 50. The network 3 may also include other wired or wireless communication links with other mobile computing devices 110 or other computing devices. Where the network 3 may include the Internet, and data communications may take place over the network 3 via an Internet communication protocol.

The back-end components 4 may include one or more servers 40 configured to implement part or all of the gig-economy-related processes described herein. Each server 40 may include one or more computer processors adapted and configured to execute various software applications and components of the gig-economy system 100, in addition to other software applications. The server 40 may further include a database 46, which may be adapted to store data related to gigs associated with a plurality of users. Such data may include data related to gig-workers, customers, gig performance, or conditions during gig performance, as discussed elsewhere herein, which data may be collected by or uploaded to the server 40 via the network 3. The server 40 may access data stored in the database 46 or external data sources when executing various functions and tasks associated with the methods discussed elsewhere herein.

The server 40 may have a controller 55 that is operatively connected to the database 46 via a link 56. It should be noted that, while not shown, additional databases may be linked to the controller 55 in a known manner. For example, separate databases may be used for various types of information, such as user profiles, gig record data, current condition data, or gig-economy data models. Additional databases (not shown) may be communicatively connected to the server 40 via the network 3, such as databases maintained by third parties (e.g., weather, construction, or road network databases). The controller 55 may include a program memory 60, a processor 62 (which may be called a microcontroller or a microprocessor), a random-access memory (RAM) 64, and an input/output (I/O) circuit 66, all of which may be interconnected via an address/data bus 65.

It should be appreciated that although only one processor 62 is shown, the controller 55 may include multiple processors 62. Similarly, the memory of the controller 55 may include multiple RAMs 64 and multiple program memories 60. Although the I/O circuit 66 is shown as a single block, it should be appreciated that the I/O circuit 66 may include a number of different types of I/O circuits. The RAM 64 and program memories 60 may be implemented as semiconductor memories, magnetically readable memories, or optically readable memories, for example. The controller 55 may also be operatively connected to the network 3 via a link 35.

The server 40 may further include a number of software applications stored in a program memory 60. The various software applications on the server 40 may include one or more software applications for monitoring, predicting, facilitating, supporting, or optimizing gig-economy activities. Such software applications may include a classifier 53 configured to classify observed activity data as being either gig-related or not gig-related, as well as machine-learning models 54 trained and used for such classification, as discussed further below. The various software applications may be executed on the same computer processor or on different computer processors.

The back-end components 4 may further include one or more additional servers providing information relating to aspects of gig-economy work. These additional servers may be configured to communicate with the server 40 via the network 3 via a link 38, and these additional servers may include an account server 41, a transaction server 42, a digital map server 43, a task management server 44, and/or a fleet management server 45. Information regarding availability or performance of gig-economy tasks or projects may be stored in databases associated with the various additional servers 41-45, which data may be accessed as part of the methods described herein. In some embodiments, additional or alternative servers may be used to store information relevant to gig-economy work, such as weather conditions or insurance policies.

The account server 41 may maintain a plurality of user accounts associated with gig-economy workers 16 and 17, customers 21, or additional participants 51. In some embodiments, the account server 41 may be used to store user profiles for such users, which may be associated with various services, such as telecommunications services, financial services, insurance policies, or gig-economy services. The transaction server 42 may process and record financial transactions related to gig-economy work, such as by facilitating payments through electronic transfer of funds.

The digital map server 43 may store geocoded map data regarding locations and transit pathways through geographic areas, which map data may be used to determine effective distances or travel times between locations, as well as for determining optimal or alternative routes. In some embodiments, the digital map server 43 may provide real-time or historical traffic data relating to one or more route segments within the geographic area, which may include indications of traffic congestion, traffic flow, construction, lane closures, road closures, accidents, blockages, or other traffic-related conditions.

The servers 44 and 45 may be associated with gig-economy platforms and configured to match gig-economy workers 16 and 17 with customers for gigs, track gig performance, and manage payment. The task management server 44 may process gig-related data relating to gig tasks or projects, while the fleet management server 45 may process worker information to determine locations of available gig-economy workers 16 and 17. In some embodiments, the task management server 44 or the fleet management server 45 may communicate with the digital map server 43 to obtain map data relevant to gigs.

Although the gig-economy system 100 is shown to include one or a limited number of the various front-end components 2 and of the back-end components 4, it should be understood that different numbers of any or each of these components may be utilized in various embodiments. Furthermore, the database storage or processing performed by the one or more servers 40 and/or additional servers 41-45 may be distributed among a plurality of servers in an arrangement known as "cloud computing." This configuration may provide various advantages, such as enabling near real-time uploads and downloads of information, as well as providing additional computing resources needed to handle the monitoring, matching, modeling, and optimization tasks described herein. This may in turn support a thin-client embodiment of some computing devices of the front-end components 2, such as some mobile computing devices 110.

Figure 1B:
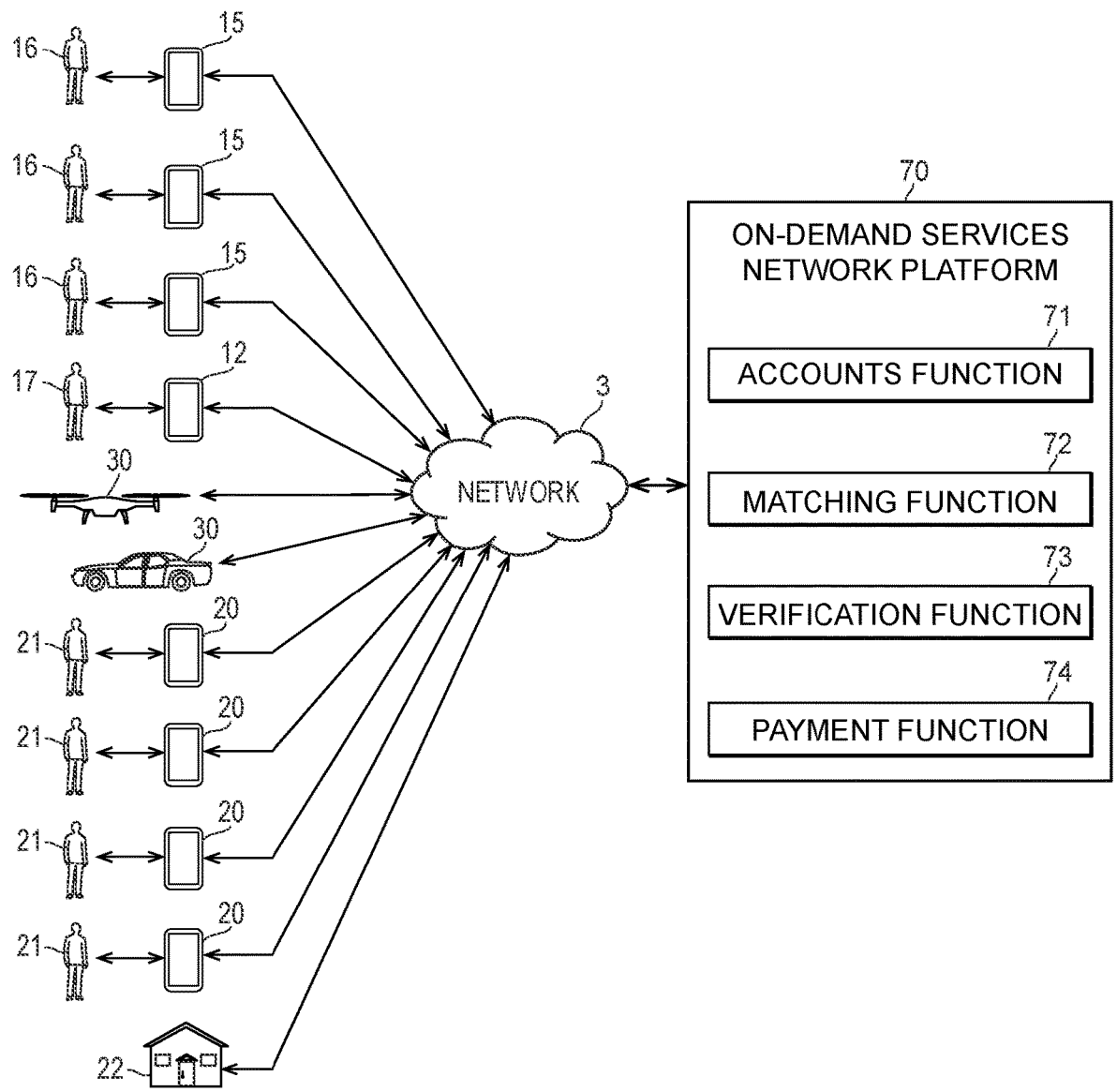
FIG. 1B illustrates a block diagram of an exemplary single-platform gig-economy system for facilitating and/or monitoring gig-economy work associated with a single gig-economy platform.

FIG. 1B illustrates a block diagram of an exemplary single-platform gig-economy system 150 for facilitating and/or monitoring gig-economy work associated with a single gig-economy platform. The single-platform gig-economy system 150 may operate in conjunction with other gig-economy platforms as part of the gig-economy system 100, with each gig-economy platform communicating with the front-end components 2 via the network 3.

As illustrated, an on-demand services network platform 70 is communicatively connected to a plurality of computing devices via the network 3 to facilitate gig-economy work associated with the gig-economy platform. Thus, the on-demand services network platform 70 may be connected to the user mobile device 12 associated with the gig-economy worker 17, additional mobile devices 15 associated with additional gig-economy workers 16, autonomous devices 30, connected home devices 22, and customer computing devices 20 associated with customers 21 via the network 3.

The on-demand services network platform 70 is configured with various functions 71-74 to obtain user data via the network 3, match gig demand with gig supply, monitor performance, and handle payment. Thus, the accounts function 71 may be configured to create, modify, and maintain user accounts associated with users of the platform. The accounts function 71 may also maintain records of completed gigs associated with each user. The matching function 72 may receive gig demand information (e.g., requests for gig-economy services by customers) and gig supply information (e.g., indications of availability for gig-economy work by gig-economy workers) in order to match gig-economy workers with customers for particular gigs. The matching function 72 may also access additional data, such as location data, to assign or suggest matches. Additionally, the matching function 72 may manage gigs to avoid duplication of gig-economy work. The verification function 73 may communicate with customers or gig-economy workers to verify performance of gigs, as well as soliciting and receiving rating data relating to completed gigs. The payment function 74 may handle electronic payment for completed gigs and, in some embodiments, may handle deposits or partial payments for gigs.

Although the on-demand services network platform 70 is illustrated as a single block in FIG. 1B, it should be understood that the on-demand services network platform 70 may be implemented using one or more servers 40 operating together the implement the gig-economy platform.

Exemplary Mobile Device

Figure 2:
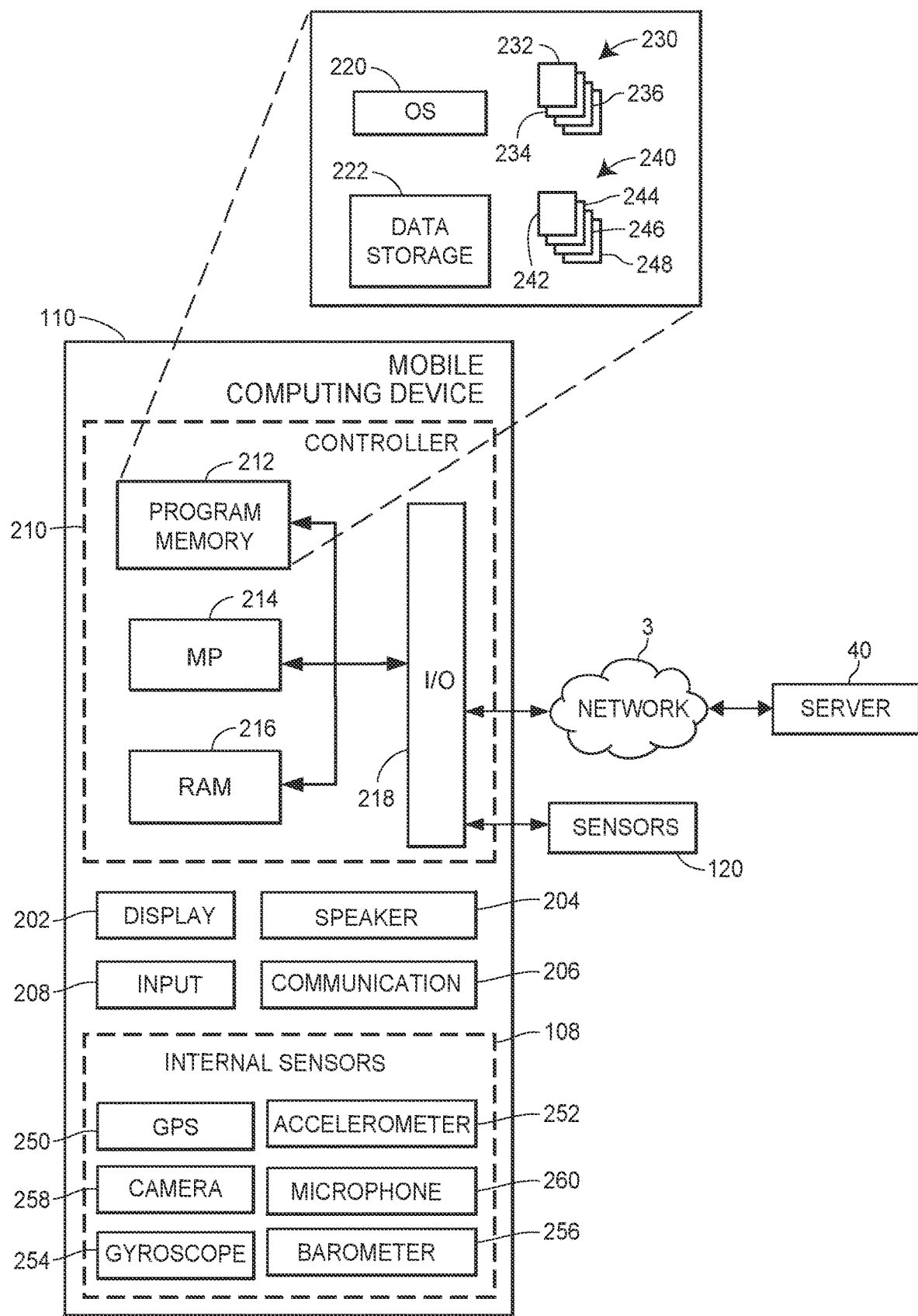
FIG. 2 illustrates a block diagram of an exemplary mobile computing device.

FIG. 2 illustrates a block diagram of an exemplary mobile computing device 110, consistent with the exemplary gig-economy system 100. The exemplary mobile computing device 110 may be one of any of the computing devices associated with a user, vehicle, or other entity discussed above (e.g., an on-board computer 11, a user mobile device 12, a wearable computing device 13, an additional mobile device 15, a customer computing device 20, a connected home device 22 (or smart home device or sensor), or an additional participant computing device 50). In some embodiments, the mobile computing device 110 may also be a part of a control or communication system of an autonomous device 30, either as an integrated subsystem or as a separate system in communicative connection with one or more other systems of the autonomous device 30. The mobile computing device 110 may include a display 202, a speaker 204, a communication unit 206, an input 208, internal sensors 108, and a controller 210. The mobile computing device 110 may be communicatively connected to the server 40 via the network 3.

In some embodiments, the mobile computing device 110 and the server 40 may be integrated into a single device, or either may perform the functions of both. In further embodiments, the mobile computing device 110 may be communicatively connected to one or more external sensors 120, which may provide additional or alternative data to the data obtained from the internal sensors 108. Collectively, any set of one or more of the internal sensors 108 and/or external sensors 120 may be referred to herein as the "sensors."

Similar to the controller 55, the controller 210 may include a program memory 212, one or more processors or microprocessors (MP) 214, a RAM 216, and an I/O circuit 218, all of which are interconnected via an address/data bus. The program memory 212 may include an operating system 220, a data storage 222, a plurality of software applications 230, and/or a plurality of software routines 240. The operating system 220, for example, may include one of a plurality of general purpose or mobile platforms, such as the Android™, iOS®, or Windows® systems, developed by Google Inc., Apple Inc., and Microsoft Corporation, respectively. Alternatively, the operating system 220 may be a custom operating system designed for operation of special-purpose hardware, such as a wearable computing device 13 or an on-board computer 11A of a vehicle 10.

The data storage 222 may include data such as user profiles and preferences, application data for the plurality of applications 230, routine data for the plurality of routines 240, and other data related to the autonomous operation features. In some embodiments, the controller 210 may also include, or otherwise be communicatively connected to, other data storage mechanisms (e.g., one or more hard disk drives, optical storage drives, solid state storage devices, etc.), which may provide local or remote data storage (e.g., cloud storage).

As discussed with reference to the controller 55, it should be appreciated that although FIG. 2 depicts only one microprocessor 214, the controller 210 may include multiple microprocessors 214. Similarly, the memory of the controller 210 may include multiple RAMs 216 and multiple program memories 212. Although FIG. 2 depicts the I/O circuit 218 as a single block, the I/O circuit 218 may include a number of different types of I/O circuits. The controller 210 may implement the RAMs 216 and the program memories 212 as semiconductor memories, magnetically readable memories, or optically readable memories, for example.

The one or more microprocessors 214 may be adapted and configured to execute any of one or more of the plurality of software applications 230 or any one or more of the plurality of software routines 240 residing in the program memory 212, in addition to other software applications. The software applications 230 may include various gig-economy platform applications, mapping applications, insurance applications, or gig work management and tracking applications. Thus, the software applications may include a TNC platform application 232 for finding and performing on-demand transportation gigs, a gig delivery platform application 234 for finding and performing product delivery gigs, and a gig work management application 236 for tracking and optimizing gig work.

Such gig work management application 236 may be configured to generate or present gig optimization recommendations or other gig optimization data to a user of the mobile computing device 110 (e.g., a gig-economy worker 17). In some embodiments, the gig work management application 236 may be configured to present information regarding insurance risks or policies relating to performance of gigs, which may include facilitating or automatically causing the purchase or use of insurance policies covering gig-economy work.

The plurality of software applications 230 may call various of the plurality of software routines 240 to perform functions relating to gig-economy work. The plurality of software routines 240 may thus include a clock routine 242 to maintain or determine a current time, a sensor control routine 244 to transmit instructions to internal sensors 108 or external sensors 120 and to receive data from such sensors, a location routine 246 that determines a current location using data from the GPS unit 250, or a monitoring and reporting routine 248 that transmits information regarding gig-economy work to the server 40 via the network 3. Any of the plurality of software applications 230 may be designed to operate independently of the software applications 230 or in conjunction with the software applications 230.

The display 202 and speaker 204 of the mobile computing device 110, along with other integrated or communicatively connected output devices (not shown), may be used to present information to the user of the mobile computing device 110 or others. The display 202 may include any known or hereafter developed visual or tactile display technology, including LCD, OLED, AMOLED, projection displays, refreshable braille displays, haptic displays, or other types of displays. The one or more speakers 204 may similarly include any controllable audible output device or component, which may include a haptic component or device. In some embodiments, communicatively connected speakers 204 may be used (e.g., headphones, Bluetooth headsets, docking stations with additional speakers, etc.). The input 208 may further receive information from the user. Such input 208 may include a physical or virtual keyboard, a microphone, virtual or physical buttons or dials, or other means of receiving information. In some embodiments, the display 202 may include a touch screen or otherwise be configured to receive input from a user, in which case the display 202 and the input 208 may be combined.

The mobile computing device 110 may further include internal sensors 108. The internal sensors 108 may include any devices or components mentioned herein, other extant devices suitable for capturing data regarding a physical environment, or later-developed devices that may be configured to provide data regarding a physical environment (including components of vehicles, structures, or other objects within the physical environment). The internal sensors 108 of the mobile computing device 110 may be supplemented by additional sensors 120, in some embodiments, which may be physically and/or communicatively connected to the mobile computing device 110 to provide additional data to the mobile computing device 110. Some additional sensors 120 may be configured or intended for other uses, such as geolocation, movement tracking, photography, or spatial orientation of the device. Such additional sensors 120 may, nonetheless, be used to provide sensor data for gig-economy-related uses, as discussed herein. As an example, the additional sensors 120 may include one or more additional accelerometers for detecting user movement during a user trip (i.e., accelerometers installed within a vehicle in which the user is traveling or a smart watch worn by the user).

Although discussion of all possible sensors of the mobile computing device 110 would be impractical, if not impossible, several sensors warrant particular discussion. Disposed within the mobile computing device 110, the internal sensors 108 may include a GPS unit 250, an accelerometer 252, a gyroscope 254, a barometer 256, a camera 258, or a microphone 260. Any or all of these sensors may be used to generate sensor data associated with user location or gig-economy work. Additionally, other types of currently available or later-developed sensors may be included in some embodiments.

The GPS unit 250 and the accelerometer 252 may provide information regarding the location or movement of the mobile computing device 110. The GPS unit 250 may use "Assisted GPS" (A-GPS), satellite GPS, or any other suitable global positioning protocol (e.g., the GLONASS system operated by the Russian government) or system that locates the position of the mobile computing device 110. For example, A-GPS utilizes terrestrial cell phone towers or Wi-Fi hotspots (e.g., wireless router points) to more accurately and more quickly determine location of the mobile computing device 110, while satellite GPS generally is more useful in more remote regions that lack cell towers or Wi-Fi hotspots.

The accelerometer 252 may include one or more accelerometers positioned to determine the force and direction of movements of the mobile computing device 110. In some embodiments, the accelerometer 252 may include a separate X-axis accelerometer, Y-axis accelerometer, and Z-axis accelerometer to measure the force and direction of movement in each dimension respectively. It will be appreciated by those of ordinary skill in the art that a three dimensional vector describing a movement of the mobile computing device 110 through three dimensional space can be established by combining the outputs of the X-axis, Y-axis, and Z-axis accelerometers using known methods.

Similarly, other components may provide additional positioning or movement sensor data. In some embodiments, a gyroscope 254 may be used in addition to, or instead of, the accelerometer 252 to determine movement of the mobile computing device 110. For example, a MEMS gyroscope may be included within the mobile computing device 110 to detect movement of the mobile computing device 110 in three dimensional space. Of course, it should be understood that other types of gyroscopes or other types of movement-detecting sensors may be used in various embodiments. Such sensor data may be used to determine relative movement of the mobile computing device 110 within a physical environment, such as during a trip. Such relative position information may be combined with other sensor data (such as GPS data) to determine movement of the mobile computing device 110 along a route. Such additional positioning or movement data may be used to differentiate user movement (e.g., within a vehicle) from movement of the mobile computing device 110 by the user (e.g., such as holding a phone to the user's ear during a phone call).

The camera 258 may be used to capture still or video images of the local physical environment of the mobile computing device 110. Such images may be used to identify user location based upon surroundings or to distinguish between movement of the user and movement of the mobile computing device 110 by the user. The one or more cameras 258 may include digital cameras or other similar devices, such as charge-coupled devices, to detect electromagnetic radiation in the visible wavelength range or other wavelengths.

It will be readily understood that one or more cameras 258 may be disposed within the mobile computing device 110 and configured to generate either still images or video recordings. For example, multiple cameras 258 may be disposed to obtain stereoscopic images of the physical environment. In some embodiments, the camera 258 may include an infrared illuminator or other device to stimulate emission within a targeted range. Such infrared illuminators may be automatically activated when light is insufficient for image capturing. Additional or alternative internal sensors 108 may be included in some embodiments to capture data regarding locations and shapes of objects within the physical environment.

The microphone 260 may similarly be used to detect sounds within the local physical environment, such as spoken notes or comments by the user of the mobile computing device 110. One or more microphones 260 may be disposed within the mobile computing device 110 or may be communicatively connected thereto. For example, wired or wireless microphones 260 may be communicatively connected to the mobile computing device 110, such as wireless speaker/microphone combination devices communicatively paired with the mobile computing device 110.

The mobile computing device 110 may also communicate with the server 40 or other components via the network 3. Such communication may involve the communication unit 206, which may manage communication between the controller 210 and external devices (e.g., network components of the network 3). The communication unit 206 may further transmit and receive wired or wireless communications with external devices, using any suitable wireless communication protocol network, such as a wireless telephony network (e.g., GSM, CDMA, LTE, etc.), a Wi-Fi network (802.11 standards), a WiMAX network, a Bluetooth network, etc. Additionally, or alternatively, the communication unit 206 may also be capable of communicating using a near field communication standard (e.g., ISO/IEC 18092, standards provided by the NFC Forum, etc.). For example, such near field communication may be used to activate or access a transportation mode (e.g., by using an electronic ticket or unlocking a vehicle door of a vehicle-sharing vehicle). Furthermore, the communication unit 206 may provide input signals to the controller 210 via the I/O circuit 218. The communication unit 206 may also transmit sensor data, device status information, control signals, or other output from the controller 210 to the server 40 or other devices via the network 3.

Exemplary Gig-Economy Work Flow Methods

Figure 3:
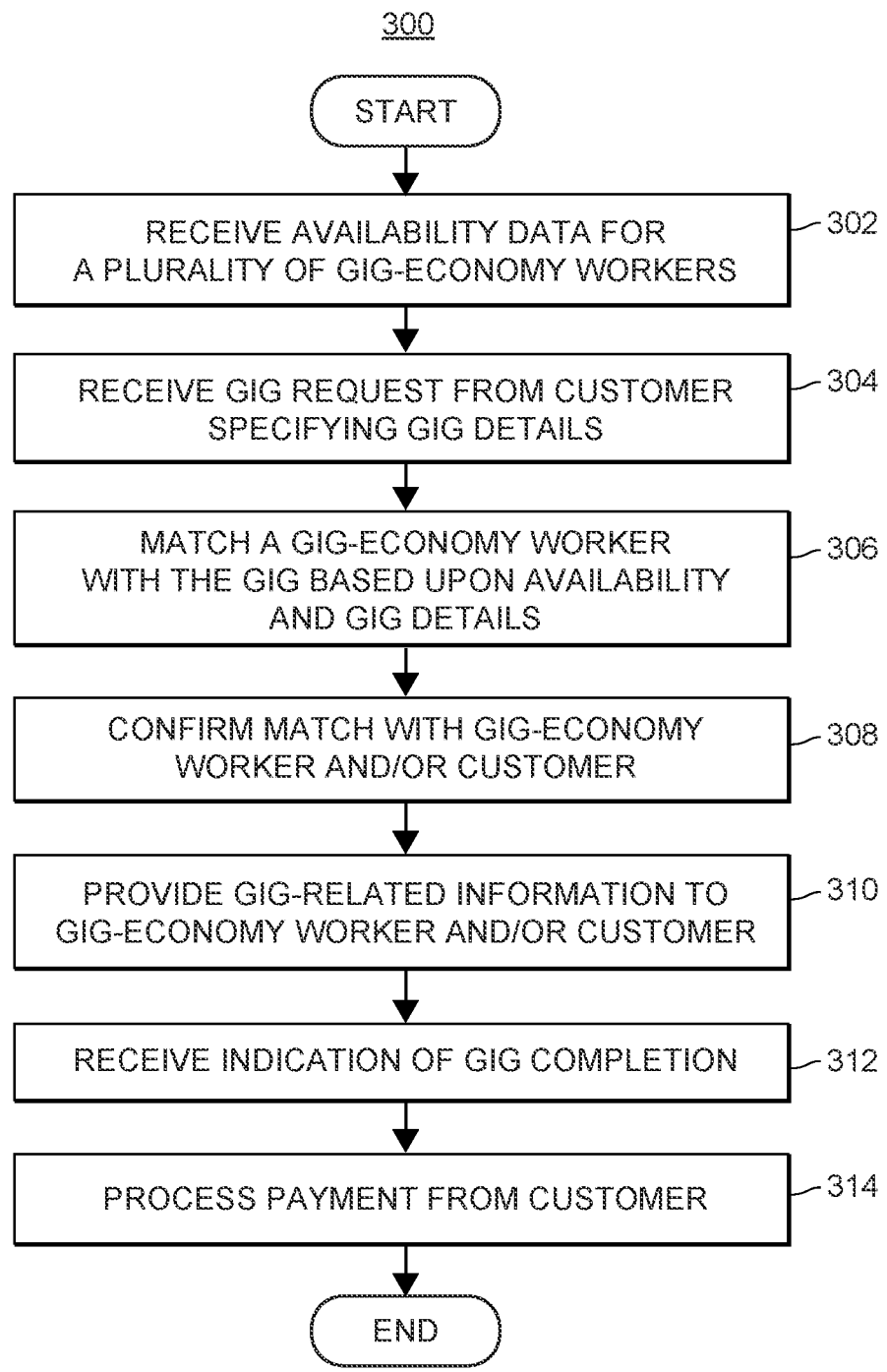
FIG. 3 illustrates a flow diagram of an exemplary gig performance method.

FIG. 3 illustrates a flow diagram of an exemplary gig-performance method 300 to indicate a typical work flow of gig creation, matching, performance, and payment in the gig-economy. The gig-performance method 300 is exemplary only, and other methods may include additional, fewer, or alternative actions. Various parts of the gig-performance method 300 may be implemented by or performed using the various front-end components 2 and back-end components 4, which may communicate via the network 3, as described above. In some embodiments, the gig-performance method 300 may be implemented by one or more servers of an on-demand services network platform 70 (e.g., one or more servers 40 configured to implement a single gig-economy platform).

At block 302, the gig-performance method 300 may begin by receiving availability data for a plurality of gig-economy workers at a server 40 from mobile computing devices 110 associated with gig-economy workers 16 and 17. The availability data may include current locations of each of the gig-economy workers. In some embodiments, additional current details related to some or all of the gig-economy workers may also be received.

At block 304, the server 40 may further receive a gig request from a customer mobile device 20. The gig request may specify gig details, such as locations, times, or types of gig-economy work to be performed. For example, a gig request may indicate a current or future request for on-demand transportation service from a first location to a second location.

At block 306, the server 40 may match one of the plurality of gig-economy workers with the customer request to assign the gig. This matching may include determining a subset of gig-economy workers matching the details of the gig request, such as location, skills, gig-worker rating, customer rating, type of vehicle, time availability, travel availability, etc. The subset of gig-economy workers may be ranked based upon a quality of matches. The server 40 may then attempt to match the gig request with one or more of the gig-economy workers in the subset of gig-economy workers by sending a proposed match to one or more gig-economy workers, the customer, or both.

At block 308, the server 40 may confirm the match with one of the gig-economy workers, the customer, or both. Confirming the match may require active selection of the gig by one or both parties, or the match may be confirmed by inaction after a predetermined period of time following a notification of the proposed match. Confirmation of the match may create the gig on the gig-economy platform.

At block 310, the server 40 may provide gig-related information to one or both of the gig-economy worker or the customer prior to or during performance of the gig. Such gig-related information may include timing instructions or predictions, recommended travel routes, or delivery instructions. In some embodiments, the server 40 may provide sequential gig-related information at a plurality of stages of the gig, such as directions to a pick-up location followed by directions to a drop-off location.

At block 312, the server 40 may receive an indication of gig completion from one or both of the gig-economy worker or the customer when the gig is finished. Such indication of gig completion may include rating information or comments on the gig.

At block 314, the server 40 may process payment for the gig from the customer. The server 40 may further process payment to the gig-economy worker, either immediately or in an aggregated transfer at a later time. Payments may be processed by electronic fund transfers or charges using previously linked financial accounts.

Exemplary Computer-Implemented Method for Monitoring and Evaluating Commercial Driving Activity Generally speaking, to insure a gig-economy worker, an insurance provider may consider and analyze a number of factors. For example, the insurance provider may use telematics and/or other data to monitor or identify driving behaviors of a gig-economy worker (e.g., gig-economy worker 17) during a gig. The data may be used to score gig-economy workers based upon their driving behaviors and/or develop commercial driving profiles/ratings/scores. Further, the telematics and/or other data may be used to monitor differences in gig-economy worker commercial/personal driving behaviors.

Because gig-relating commercial driving behavior may differ significantly from personal driving behavior of the gig-economy worker, distinguishing between gig-related driving and non-gig-related driving may result in a significant reduction in the cost of personal driving insurance for the gig-economy worker. Moreover, limited insurance policies for gig-related driving may be offered to the gig-economy worker, along with information or recommendations to reduce risk associated with gig-economy work. Such information may include estimated or actual costs associated with such risk (e.g., insurance policy premiums or expected values of losses associated with gig-economy work).

A. Exemplary Driving Monitoring Method

Figure 4:
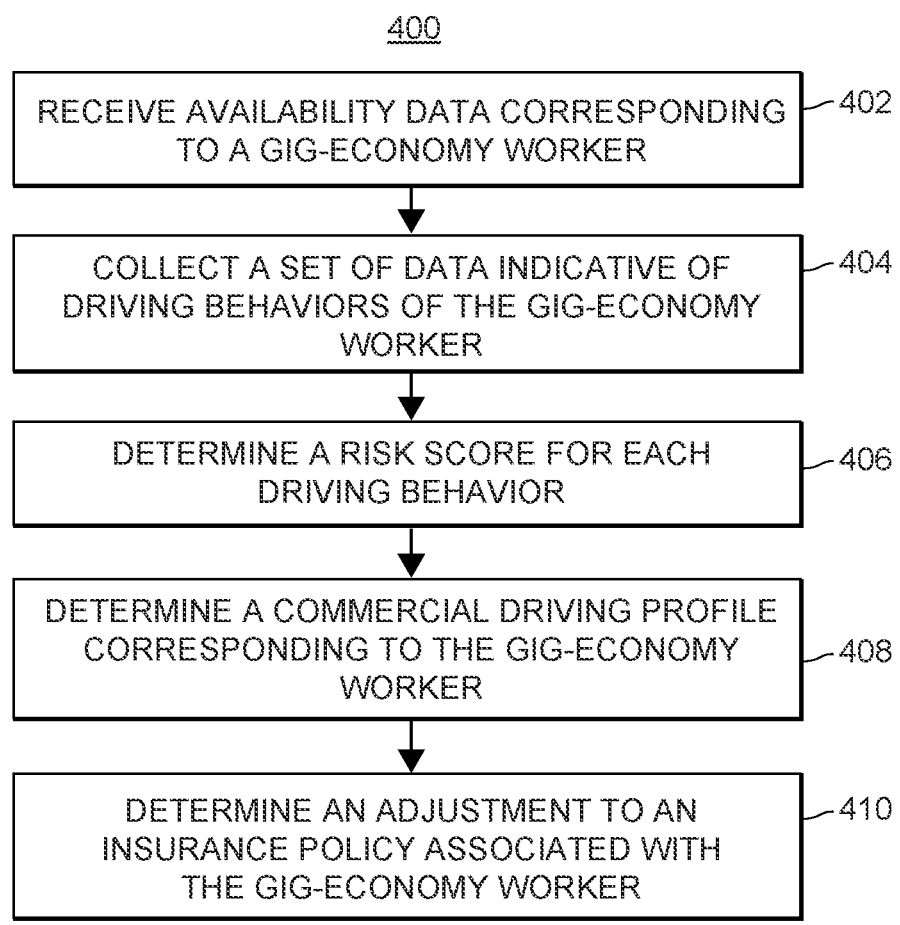
FIG. 4 illustrates a flow diagram of an exemplary gig-economy driving monitoring method.

FIG. 4 illustrates a flow diagram of an exemplary gig-economy driving monitoring method 400 for monitoring and evaluating commercial driving activity. The method 400 begins by receiving availability data corresponding to a gig worker (block 402). In certain embodiments, the availability data may indicate a beginning of a commercial interaction between the gig-economy worker (e.g., gig-economy worker 17) and a customer (e.g., a gig-economy customer 21). However, it should be understood that the availability data may indicate a gig-economy worker activating a gig-economy platform application on a mobile device and/or any other suitable action or combination thereof. For example, the gig-economy worker 17 may activate a gig-economy platform application on a user mobile computing device 110 (e.g., on-board computer 11A or user mobile device 12) to initiate participation in the gig-economy system 100. By activating the mobile application, the mobile computing device may transmit the availability data to an external server (e.g., fleet management server 45) to facilitate the gig-economy worker matching with a customer, as described herein. Block 402 may be performed by, for example, a fleet management server 45.

The method 400 continues by collecting a set of data indicative of one or more driving behaviors of the gig-economy worker (block 404). Generally, the set of data may include telematics and/or other data, such as environmental data. The telematics data may include information regarding vehicle operation, such as driving speed, braking, acceleration, distance from other vehicles, turns, lane changes, route, origination, destination, direction of travel, fuel usage, and/or other aspects of vehicle operation. In certain embodiments, the environmental data may include one or more of (i) a road condition, (ii) a weather condition, (iii) a nearby traffic condition, (iv) a road type, (v) a construction condition, (vi) a presence of pedestrians, or (vii) a presence of other obstacles.

The set of data may be collected at or via a mobile device, or in some embodiments, a server. Moreover, the set of data may be generated by sensors affixed to or associated with the vehicle driven by the gig-economy worker, sensors incorporated in a mobile device, or in some embodiments, associated with a plurality of vehicles and/or an infrastructure component (e.g., a traffic camera, a speed radar device, etc.). Each of these sensors may be internal sensors 108 or external sensors 120 of a corresponding mobile computing device 110, as described above. For example, the telematics and/or other data may be generated by or include information related to vehicle-to-vehicle (V2V) communications and/or vehicle-to-infrastructure (V2I) communications. Block 404 may be performed by, for example, the on-board computer 11A or user mobile device associated with the gig-economy worker 17.

The telematics data and/or other data may indicate one or more driving behaviors of a gig-economy worker. The telematics data may indicate the speed at which the gig-economy worker typically drives; the type of vehicle that the gig-economy worker typically drives; the type of roads or routes that the gig-economy worker usually takes; the distance at which the gig-economy worker typically trails other vehicles; whether the gig-economy worker drives a large percentage of time adjacent to other vehicles traveling in the same direction (such as on a four-lane highway); whether the gig-economy worker typically drives too slow or too fast in relation to the posted speed limit, or in relation to other vehicles on the road; and/or other driving behaviors of the gig-economy worker. Similarly, the other data may indicate the weather conditions in which the gig-economy worker will normally drive; the locations where the gig-economy worker typically drives; and/or the dates/times of day during which the gig-economy worker usually drives or drives the most.

As an example, the telematics data may include information related to the operation of one or more vehicles identified by one or more processors (e.g., processor 214 of mobile computing device 110) based upon analysis of the telematics and/or other data. Analysis of the data may reveal the amount and/or type of other vehicles a gig-economy worker uses. Data collected (such as by the mobile computing device 110) may reveal that the gig-economy worker uses a safer vehicle (e.g., a vehicle with a higher safety rating) a certain percentage of the time. The data may further be used to determine times and/or places in which the gig-economy worker uses the safer vehicle. The gig-economy worker may use the safer vehicle when performing a gig and a less safe vehicle when driving for personal use. If the gig-economy worker commonly transports customers (e.g., gig-economy customers 21) using a safer vehicle, that may indicate that the gig-economy worker is typically risk-averse in a gig setting.

People who are risk-averse may in turn typically have less risk of accident or injury, so determining such risk aversion of the gig-economy worker may be used to offer gig insurance policies to the gig-economy worker at a lower cost. Consequently, the substantial overlap of timestamps indicating safe vehicle usage with the availability data may indicate that the gig-economy worker consistently/frequently transports gig-economy customers in a high safety-rating vehicle.

As an example, the set of data may reveal location information, such as where the gig-economy worker drives. The risk for open road or highway driving may be less than the risk associated with downtown or city driving. Highway driving may indicate that a gig-economy worker is not driving through a large amount of intersections, and/or typically driving greater distances from other vehicles on the road (i.e., less bumper-to-bumper driving). Driving over a certain speed, such as 45 mph, may also indicate that a gig-economy worker normally drives on the highway, and thus may have a lower risk of accident. Consequently, if the set of data includes location data associated with a highway and speed data consistent with the speed limit of the highway, the set of data may indicate that a gig-economy worker consistently/frequently transports gig-economy customers on highways.

As another example, the set of data may include time and/or time of day information. The data may include a percentage of time that the vehicle spends on highways (which may be associated with a relatively low risk), and/or a percentage of time that the vehicle spends in parking lots (which may be associated with a relatively high risk). The set of data may also indicate normal traffic conditions associated with a gig-economy worker, and/or the percentage of time that a vehicle used by a gig-economy worker is not being driven and/or parked in a public place (such as on the street), but rather is stored or housed inside and/or in a secure location (such as in the garage of the owner). Storing a vehicle inside may prevent theft and/or damage from the environment, such as wind or hail damage. Consequently, if the set of data includes time data indicating a large amount of highway driving time and low traffic data consistent with the normal traffic flow of the highway, the set of data may indicate that a gig-economy worker consistently/frequently transports gig-economy customers on highways.

As yet another example, the set of data may include the number of miles that a gig-economy worker typically drives during a gig. More miles driven may indicate more risk, which may further depend upon type of road traveled. The set of data may also indicate the type, make, or model of a vehicle that is driven by the gig-economy worker. Certain vehicle types, makes, or models may have superior safety, equipment, or other vehicle ratings. Consequently, if the set of data includes a typical number of miles driven by the gig-economy worker during a gig indicating a short typical gig distance and a vehicle with a high safety rating, the set of data may indicate that the gig-economy worker consistently/frequently transports gig-economy customers over short distances in a safe vehicle (e.g., a low risk gig).

In some embodiments, the set of data may facilitate mood detection in real-time or building an average mood profile for the gig-economy worker. The mood of a gig-economy worker may impact driving behavior. Soft or light music may indicate that the gig-economy worker is relaxed and calm while driving. Conversely, loud music may indicate that the gig-economy worker is in an aggressive mood. A mobile device or smart vehicle application may detect the songs or type of music usually played on the vehicle sound system or radio, and/or loudness thereof.

In some embodiments, the gig-economy worker may be an autonomous vehicle system. For example, a gig-economy worker may be present in the vehicle, and enable one or more autonomous features of the autonomous vehicle system, such that the one or more autonomous features make decisions to control or otherwise impact the control of the vehicle during a gig. In these embodiments, the set of data may include the decisions implemented by autonomous vehicle system to control or otherwise impact the control of the vehicle during gig performance. For example, in response to enabling the one or more autonomous features, a processor may create a timestamp. The timestamp may include information regarding the date, time, location, vehicle environment, vehicle condition, and autonomous operation feature settings or configuration information. The date and time may be used to identify a gig or one period of autonomous operation feature use, in addition to indicating risk levels due to traffic or other factors.

The location and environmental data included in the set of data may include information regarding the position of the vehicle (e.g., via the GPS unit 250) and its surrounding environment (e.g., road conditions, weather conditions, nearby traffic conditions, type of road, construction conditions, presence of pedestrians, presence of other obstacles, availability of autonomous communications from external sources, etc.). Vehicle condition information may include information regarding the type, make, and model of the vehicle, the age or mileage of the vehicle, the status of vehicle equipment (e.g., tire pressure, non-functioning lights, fluid levels, etc.), or other information relating to the vehicle. In some embodiments, the timestamp may be recorded on the mobile computing device 110, or an external server (e.g., server 40).

More generally, when the gig-economy worker is an autonomous vehicle system, the processor executing instructions in accordance with the exemplary method 400 may be communicatively connected with or otherwise closely monitor the sensors comprising the autonomous vehicle system. For example, the processor may execute instructions to determine configuration information associated with the autonomous vehicle system.

The configuration information may correspond to information regarding the number and type of the sensors included in the autonomous vehicle system (e.g., included in the on-board computer 11), the disposition of the sensors within the vehicle, the one or more autonomous operation features, autonomous operation feature control software, versions of the software applications or routines implementing the autonomous operation features, or other related information regarding the autonomous operation features. For example, the configuration information may include the make and model of the vehicle (indicating installed sensors and the type of on-board computer 11), an indication of a malfunctioning or obscured sensor in part of the vehicle, information regarding additional after-market sensors installed within the vehicle, a software program type and version for a control program installed as an application on the on-board computer 11, and software program types and versions for each of a plurality of autonomous operation features installed as applications or routines in the program memory of the on-board computer 11.

Once activated to perform during a gig, the sensors of the autonomous vehicle system may generate sensor data regarding the vehicle and its environment. In some embodiments, one or more of the sensors may preprocess the measurements and communicate the resulting processed data to the on-board computer 11. The sensor data may include information regarding the vehicle's position, speed, acceleration, direction, and responsiveness to controls. The sensor data may further include information regarding the location and movement of obstacles or obstructions (e.g., other vehicles, buildings, barriers, pedestrians, animals, trees, or gates), weather conditions (e.g., precipitation, wind, visibility, or temperature), road conditions (e.g., lane markings, potholes, road material, traction, or slope), signs or signals (e.g., traffic signals, construction signs, building signs or numbers, or control gates), or other information relating to the vehicle's environment. In some embodiments, the autonomous vehicle system sensors may indicate the number of gig-economy customers within the vehicle, including an indication of whether the vehicle is entirely empty.

In addition to receiving sensor data from the sensors, in some embodiments the processor may receive autonomous communication data from a communication component or a communication module of the autonomous vehicle system. The communication data may include information from other autonomous vehicles (e.g., sudden changes to vehicle speed or direction, intended vehicle paths, hard braking, vehicle failures, collisions, or maneuvering or stopping capabilities), infrastructure (road or lane boundaries, bridges, traffic signals, control gates, or emergency stopping areas), or other external sources (e.g., map databases, weather databases, or traffic and accident databases).

The communication data may be combined with the sensor data and included in the set of data to obtain a more robust understanding of the vehicle environment. For example, the processor may combine sensor data indicating frequent changes in speed relative to tachometric data with map data relating to a road upon which the vehicle is traveling to determine that the vehicle is in an area of hilly terrain. As another example, weather data indicating recent snowfall in the vicinity of the vehicle may be combined with sensor data indicating frequent slipping or low traction to determine that the vehicle is traveling on a snow-covered or icy road.

In any event, the exemplary method 400 continues by determining a risk score for each driving behavior (block 406). Generally, the one or more processors may determine the risk scores by applying a risk model to each of the indicated driving behaviors, either separately or together with other driving behaviors. The risk model may include pre-determined risk values for each driving behavior, the model may compare each driving behavior to a set of known driving behaviors of other gig-economy workers, and/or the model may utilize machine learning to adaptively determine risk scores for each driving behavior. The risk model may be stored in and retrieved from local memory (e.g., program memory 212), external memory/servers (e.g., account server 41, server 40), and/or otherwise accessed for use. Block 406 may be performed by, for example, the processor 214 of mobile computing device 110 or processor 62 of server 40.

In certain embodiments, the risk model includes a set of known driving behaviors of other gig-economy workers. The set of known driving behaviors may include information regarding typical or average driving behaviors for a specific driving environment and/or type of driving environment. The set of known driving behaviors may be generated, developed, and/or determined based upon telematics and/or other data regarding driving behavior of a plurality or group of gig-economy workers and/or vehicles. For example, the set of known driving behaviors may be determined from telematics data collected from hundreds or thousands of gig-economy workers and/or individual gigs in an area and/or along a particular portion of a roadway (e.g., a city, a census tract, a parking lot, a block of a street, a highway section, an intersection, an entrance or exit ramp, etc.). The set of known driving behaviors may be compared with the insured's driving behavior to analyze and/or determine a risk score for the insured.

For example, the set of data may indicate an average speed that the gig-economy worker normally drives at as compared to typical gig-economy workers, and/or average gig-economy workers in a given community or geographical area. Speed data may be gathered that indicates the average speed of other gig-economy workers in a given area or on a given stretch of road. The speed data may also indicate average braking events (e.g., number of braking events, whether such braking is hard or soft, deceleration rate during braking, distance to stop, etc.) or aggressive driving (or lack thereof) for other gig-economy workers on a given stretch of road.

When the gig-economy worker is on the same road as the road for which other gig-economy worker data is collected, data related to the gig-economy worker's specific vehicle speed and braking may be collected. If the gig-economy worker's vehicle speed on that road is below the speed indicated for the other gig-economy workers, it may indicate that the gig-economy worker typically drives below the speed limit and/or in a low risk manner. Conversely, if the gig-economy worker's vehicle speed on that road (or stretch of road or location) is above an average or many of the other gig-economy worker speeds, that may indicate the gig-economy worker typically drives in a more risky manner.

If the gig-economy worker's vehicle braking information indicates that the gig-economy worker brakes a below-average amount, that may be indicative that the gig-economy worker trails other vehicles at a risk-averse distance, does not tailgate, and/or otherwise drives in a lower-risk manner. Conversely, if the vehicle braking information indicates that the gig-economy worker brakes an excessive or above-average amount, that may indicate that the gig-economy worker is typically following other vehicles too closely and/or potentially driving in a manner associated with above-average risk.

In some embodiments, GPS data from a number of other gig-economy workers may be gathered. A database of other gig-economy workers' behavior on certain roads or areas may be built, such as demonstrating the speed and/or braking of the average gig-economy worker on a specific section of road. Telematics and/or other data, including GPS data (e.g., via GPS unit 250), associated with the gig-economy worker may be collected and compared with the other gig-economy worker characteristics for specific sections of road. If lower than average risk is identified by the behavior exhibited by the gig-economy worker, the one or more processors may then determine a low risk score for the gig-economy worker associated with a specific section of road.

As previously mentioned, the risk model may utilize machine learning to adaptively determine risk scores for each driving behavior. Generally, machine learning may involve identifying and recognizing patterns in existing data (such as autonomous vehicle system, feature, or sensor data; autonomous vehicle system control signal data; vehicle-mounted sensor data; mobile device sensor data; and/or telematics, image, or radar data) in order to facilitate making predictions for subsequent data. Machine learning models may be created based upon example inputs of data in order to make valid and reliable predictions for novel inputs.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict a correct or preferred output. In unsupervised machine learning, the processing element may be required to find its own structure in unlabeled example inputs. In certain embodiments, machine learning techniques may be used to extract the one or more driving behaviors from the set of data, and determine risk scores for each driving behavior.

For example, the one or more processors may train a machine learning model based upon (i) a set of prior driving behaviors, and (ii) a set of prior risk scores. Further, the one or more processors may apply the machine learning model to the set of data to generate the risk score for each indicated driving behavior. The machine learning programs may utilize deep learning algorithms that are primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

The machine learning programs may be trained with the set of prior driving behaviors and the set of prior risk scores to identify relationships between and among driving behaviors and their corresponding risk scores. Accordingly, upon receipt of the set of data, the machine learning programs may determine a risk score for each driving behavior indicated in the set of data.

Moreover, in certain embodiments where the gig-economy worker activates one or more features of an autonomous vehicle system, the one or more processors may execute instructions to determine a risk score for the autonomous vehicle system based upon the one or more control decisions made by the autonomous vehicle system. The information regarding the control decisions generated by the autonomous vehicle system may include information regarding control decisions not implemented to control the vehicle. The control decisions not implemented to control the vehicle may include an alternative control decision not selected by the autonomous vehicle system to control the vehicle. Additionally or alternatively, the control decisions not implemented to control the vehicle may include a control decision not implemented because the one or more features were disabled.

In these embodiments, the control decisions may be generated by the autonomous vehicle system to direct the vehicle to turn left, turn right, exit onto an off ramp, enter onto a highway, slow down, accelerate, stop, merge left or merge right, signal a lane change or turn, change lanes, stop at an intersection or stop light, and/or park the vehicle. The control decisions may also be related to control decisions (directing the autonomous system or vehicle operation) associated with, for example, whether to apply the brakes; how quickly to apply the brakes; an amount of force or pressure to apply to the brakes; how much to increase or decrease speed; how quickly to increase or decrease speed; how quickly to accelerate or decelerate; how quickly to change lanes or exit; the speed to take while traversing an exit or on ramp; at what speed to approach a stop sign or stop light; how quickly to come to a complete stop; and/or how quickly to accelerate from a complete stop.

The set of data may also include reasons as to why one or more control decisions were executed or not executed by the autonomous vehicle system. For example, the control decisions may be entered into a log of operating data that includes such reasons. The reason as to why one or more controls decisions were not executed by the autonomous vehicle system may be that the autonomous system software was corrupted or an autonomous vehicle system sensor was malfunctioning or not working properly. The reason as to why one or more controls decisions were not executed by the autonomous vehicle system may be that the autonomous vehicle system determined that (i) the autonomous vehicle system software was corrupted, or (ii) an autonomous vehicle system sensor was malfunctioning or not working properly. The reason as to why one or more controls directed were not executed by the autonomous vehicle system may be that the autonomous vehicle system was overridden by the gig-economy worker, or already engaged by the gig-economy worker. Additional or alternate reasons may also be determined.

The set of data may also include external data from the log of operating data. As previously discussed, the external data may include identification of information regarding road conditions, weather conditions, nearby traffic conditions, type of road, construction conditions, presence of pedestrians, and presence of other obstacles. It is to be appreciated that the set of data may additionally include any suitable data captured, generated, or otherwise acquired by the autonomous vehicle system.

The method 400 continues by determining a commercial driving profile corresponding to the gig-economy worker (block 408). Generally, the commercial driving profile may indicate a quality assessment of the gig-economy worker based upon the risk scores calculated for each driving behavior indicated for the gig-economy worker during a gig. The commercial driving profile may include each risk score for each driving behavior; when and where the gig-economy worker is driving an insured or other vehicle during gigs; what type of vehicle the gig-economy worker typically drives during gigs; and/or other conditions or factors related to operation of the vehicle during one or more gigs, including those discussed elsewhere herein.

Thus, the commercial driving profile includes information specifically representative of a gig-economy worker's performance and driving behavior during a gig. Additionally or alternatively, the commercial driving profile may represent a gig-economy worker's performance or driving behavior during periods indicated in the timestamps of the availability data. Accordingly, the commercial driving profile may differ from a profile representative of the gig-economy worker's driving behavior during personal use of the vehicle. Block 408 may be performed by, for example, the processor 62 of server 40.

The exemplary method 400 may continue by determining an adjustment to an insurance policy associated with the gig-economy worker (optional block 410). In certain embodiments, the adjustment to the insurance policy may be an offer to accept or reject an insurance policy. The insurance policy may be a gig insurance policy specifically tailored to cover accidents or other incidents that may occur during a gig or during gig-economy work over a period of time. For example, based upon the commercial driving profile, the gig-economy worker may receive an offer to accept or reject a gig policy that covers accidents and/or other incidents that may occur while the gig-economy driver is performing a gig. Additionally or alternatively, the gig-economy worker may receive benefits, incentives, and/or other discounts to a premium, deductible, rate, and/or any other suitable value associated with an already existing gig policy.

Of course, as gig-economy workers continue to perform gigs, their behaviors may change over time. In order to make higher profits or simply spend less time per gig, a gig-economy worker may drive more tenaciously. If a gig-economy worker prefers to decrease the number of gigs performed while maintaining a profit level, the gig-economy worker may accept gigs featuring longer routes. Thus, one or more processors may occasionally collect data corresponding to a gig-economy worker's performance during gigs to update their corresponding commercial driving profile.

B. Exemplary Gig-Economy Driving Data Collection Method

Figure 5:
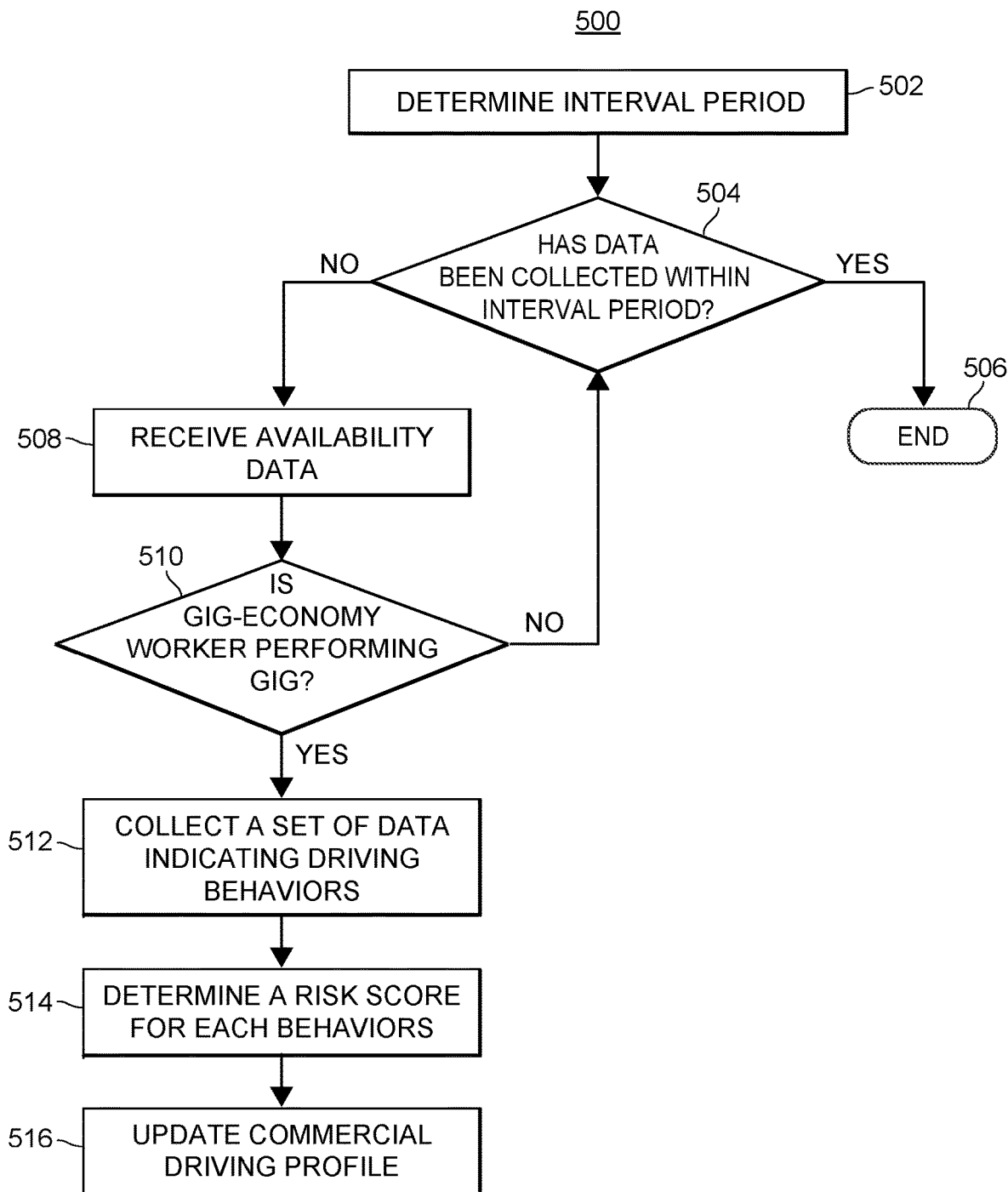
FIG. 5 illustrates a flow diagram of an exemplary gig-economy driving data collection method.

FIG. 5 illustrates a flow diagram of an exemplary gig-economy driving data collection method 500 for determining whether a set of data indicative of one or more driving behaviors of the gig-economy worker has been collected within a determined interval period and, if not, collecting data. A processor (e.g., processor 62 of server 40 or processor 214 of mobile computing device 110) may execute an instruction to determine an interval period for collecting, requesting, or transmitting data (block 502).

Generally, a company that maintains the commercial driving profile may determine an interval period for transmitting data. For example, if an insurance company that insures the gig-economy worker maintains the commercial driving profile, the insurance company may pre-determine the interval period to be hours, days, months, years, etc. In certain embodiments, a gig-economy worker may set a preference for an interval period. The processor may execute an instruction to determine whether or not a set of data has been collected within the interval period (block 504). If the processor executing the instruction determines that a set of data has been collected within the interval period (YES branch of block 504), then the processor may execute an instruction to end the exemplary method 500 (block 506).

If the processor executing the instruction determines that a set of data indicative of one or more driving behaviors of the gig-economy worker has not been collected within the interval period, (NO branch of block 504) then the processor may execute an instruction to receive availability data from a computing device associated with the gig-economy worker (block 508). In this circumstance, the availability data may indicate whether a gig-economy worker is currently performing a gig. For example, the processor may query the mobile computing device of the gig-economy worker, or other suitable device the gig-economy worker uses to perform gigs, to receive an indication whether any of the gig-economy platform applications are active. In this manner, the processor may determine whether the gig-economy worker is currently performing a gig (block 510).

If the processor receives availability data indicating the gig-economy worker is not currently performing a gig (NO branch of block 510), the processor may execute an instruction to return the exemplary method 500 to block 504. However, if the processor receives availability data indicating the gig-economy worker is currently performing a gig (YES branch of block 510), the processor may execute an instruction to collect a set of data indicative of one or more driving behaviors of the gig-economy worker (block 512). Further, the processor may execute an instruction to analyze the set of data and determine a risk score for each driving behavior indicated in the set of data (block 514), as described herein. Accordingly, the processor may execute an instruction to utilize the risk scores by updating a commercial driving profile associated with the gig-economy worker (block 516).

For example, assume that the processor receives availability data indicating the gig-economy worker is currently performing a gig (YES branch of block 510). The processor may receive a set of data that corresponds to a time period encompassing the current gig and any gigs the gig-economy worker performs until the gig-economy worker disconnects from all or some gig-economy platform applications (e.g., rideshare/on-demand transportation, food delivery, package delivery, etc.). The set of data may indicate that both an average speed and an average distance per gig performed by the gig-economy worker during the time period is higher compared to an average speed and an average distance per gig indicated in the commercial driving profile associated with the gig-economy worker.

Further in this example, the set of data may indicate a location of the gigs performed in the time period that differs from the typical position of gigs indicated in the commercial driving profile associated with the gig-economy worker. As previously mentioned, the processor may identify the location (e.g., using GPS data via GPS unit 250) and apply a risk model to determine a risk score for each behavior in light of the location. In this example, assume the processor identifies the location as a low traffic density highway. The processor may then determine that the higher average speed and average distance per gig correspond to a lower overall risk because these driving behaviors are consistent with highway driving, and the particular highway has a low traffic density.

It is to be appreciated that the exemplary method 500 may be performed in accordance with a machine learning model, as described herein. For example, a processor may utilize a machine learning model to update the commercial driving profile associated with a gig-economy worker. The processor may train the machine learning model with prior determined interval data or a predetermined interval period, one or more prior sets of data, and one or more prior risk scores. The processor may then execute instructions in accordance with the machine learning model to automatically determine an interval period (block 502); determine whether data has been collected within the interval period (block 504); end the exemplary method 500 if data has been collected within the interval period (block 506); receive the availability data (block 508); determine whether the gig-economy worker is currently performing a gig (block 510); collect a set of data indicating one or more driving behaviors of the gig-economy worker (block 512); determine a risk score for each driving behavior indicated in the set of data (block 514); and/or update a commercial driving profile associated with the gig-economy worker (block 516).

Another point of emphasis gig-economy workers commonly express is maximizing gig performance. Gig-economy workers want to understand how they are evaluated, and techniques they can implement to improve their ratings, scores, etc. Higher ratings or scores may result in more or better gigs being available to or assigned to the gig-economy worker by a gig-economy platform, which in turn can enable the gig-economy workers to generate more revenue and increase profits. Consequently, a method to provide a gig-economy worker with real-time feedback (referenced herein as "education points") regarding their gig performance is highly desired.

C. Exemplary Gig-Economy Driving Education Point Method

Figure 6:
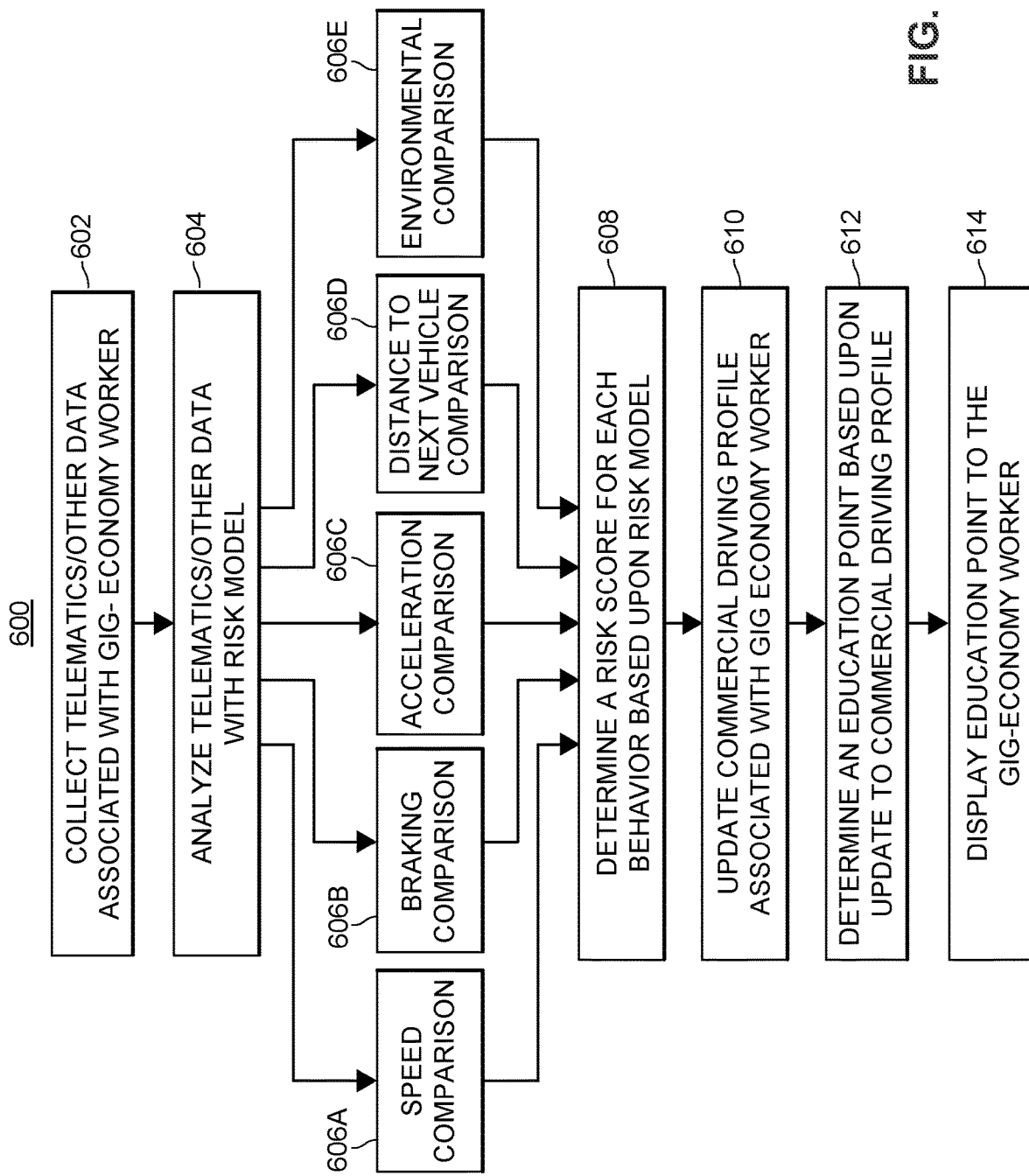
FIG. 6 illustrates a flow diagram of an exemplary gig-economy driving education point method.

FIG. 6 illustrates a flow diagram of an exemplary gig-economy driving education point method 600 of determining an education point for display to a gig-economy worker. In certain embodiments, the method 600 may be implemented in whole or in part by one or more components of the server 40 or the mobile computing device 110. For example, the method 600 may be implemented by a server 40 remote from the front-end components 2 (e.g., vehicles 10 or 14, mobile devices 12 or 15, autonomous devices 30, etc.) or another server of the back-end components 4. In some embodiments, the front-end components 2 may be used to generate and/or collect data relating to driving behavior of multiple drivers, including gig-economy worker 17 associated with the vehicle 10. The method 600 is exemplary and may include additional, fewer, or alternate actions, including those discussed elsewhere herein.

The method 600 may begin by collecting telematics and/or other data associated with a gig-economy worker (block 602). The telematics and/or other data may include information regarding vehicle operation, such as driving speed, braking, acceleration, cornering, distance from other vehicles, turns, lane changes, direction, heading, route, origination, destination, time-of-day, and/or other aspects of vehicle operation. Such data may be collected at or via a server, such as an insurance provider remote server. In certain embodiments, the telematics and/or other data may be generated by sensors associated with a plurality of vehicles and/or an infrastructure component (e.g., a traffic camera, a speed radar device, etc.). The telematics and/or other data may also be generated by or include information related to vehicle-to-vehicle (V2V) communications and/or vehicle-to-infrastructure (V2I) communications.

In some embodiments, collecting the telematics and/or other data associated with the gig-economy worker may include collecting telematics and/or other data associated with other drivers. Further the method 600 may include determining an average driver profile indicative of driving behavior of a plurality of other drivers. The average driver profile may be generated periodically by a server (e.g., monthly, quarterly, annually, etc.). One or more average driver profiles may be generated and used for comparison with the gig-economy worker commercial driving profile, as discussed herein. By using an average driver profile, significant improvements in efficiency of computing resources (e.g., processor usage, data communication, memory storage, etc.) usage may be achieved relative to a direct comparison of the gig-economy worker commercial driving profile against information relating to a plurality of other drivers. In some embodiments, the average driver profile may be limited in scope to a number of classes and/or types of information, which may further improve processing and/or memory storage efficiency.

The method 600 may continue by comparing and/or analyzing the telematics and/or other data with a risk model to identify low risk driving, high risk driving, or risk scores associated with the driving behavior, as described herein (block 604). This may include determining and/or identifying (at a server or at another computing device) high or low risk behavior, in accordance with the risk model. In some embodiments, this may include a comparison of telematics data regarding a plurality of driving behaviors and/or risk-indicating behaviors. For example, the risk model may include comparisons related to speed (block 606A), braking (block 606B), acceleration or deceleration (block 606C), average distance to the next vehicle (block 606D), and/or an optional comparison of environmental conditions (block 606E). Other comparison of driver characteristics and/or behavior may also be made using the telematics and/or other data with the risk model, as previously described.

The method 600 may continue by determining a risk score for the gig-economy worker based upon the comparisons of the gig-economy worker's driving behavior with the value incorporated in the risk model (block 608). A remote server (e.g., server 40) or other suitable computing device (e.g., mobile computing device 110) may be used to determine one or more risk scores based upon the one or more driving behaviors identified and/or determined in blocks 604 and/or 606A-E. The one or more risk scores may indicate an absolute risk level associated with the vehicle and/or gig-economy worker, or in some embodiments, the one or more risk scores may indicate relative risk levels in comparison with one or more risk scores associated with the other drivers and/or driver behavior.

In certain embodiments, multiple risk scores may be combined into one risk score, which may be a weighted combination of the multiple risk scores. Where a weighted combination is determined, the weights may be determined manually or automatically by known or later-developed computer-learning methods (e.g., support vector machines, random forests, artificial neural networks, etc.). In some embodiments, the risk score may also include one or more risk aversion scores indicating a general risk preference profile or level of the gig-economy worker.

The method 600 may continue by adjusting, updating, and/or generating a commercial driving profile associated with the gig-economy worker, based upon the one or more risk scores for the gig-economy worker determined at block 608 (block 610). In certain embodiments, a remote server or other suitable computing device may additionally determine a change to an insurance policy based upon the one or more risk scores. For example, a discount may be generated for an insurance policy when a determined risk score indicates that the gig-economy worker operates a vehicle in a risk averse manner or in a manner that results in lower risk than the average risk associated with other drivers. In some embodiments, a gig-economy worker and/or other party may be notified or warned regarding the risk scores, adjustment, and/or update.

The method 600 may continue by determining an education point for the gig-economy worker based upon the update, adjustment, and/or generation of the commercial driving profile (block 612). Generally speaking, an education point may be any message, audio/visual cue, and/or other form of feedback intended to inform a gig-economy worker about a particular behavior. The particular behavior may be related to any control functions of a vehicle, such as accelerating, braking, cornering, steering, etc., as well as environmental feedback (e.g., interior audio levels too high, road slippery, internal temperatures too high, etc.).

A computer processor (e.g., processor 62 of server 40 or processor 214 of mobile computing device 110) may determine the education point based upon an education model. For example, the computer processor may store and access the education model via a memory after receiving the telematics and/or other data. The education model may have predetermined education points for display in response to the telematics and/or other data. Additionally or alternatively, the education model may actively determine education points for display based upon the telematics and/or other data.

This may include determining and/or identifying (at a server or at another computing device) high and/or low risk behavior. This may also include determining associations and/or correlations between the data and risk preferences and/or levels associated with one or more gig-economy workers. For example, data indicating a gig-economy worker maintains a greater distance from vehicles traveling ahead of the gig-economy worker may be used to determine risk scores or levels for either or both of a driving behavior and/or general risk preferences of the gig-economy worker.

As an example, assume a computer processor receives data indicating that the gig-economy driver is following a proximate vehicle at a distance of 2 feet. This distance of 2 feet may comprise the distance to next vehicle data in block 606D. The computer processor may further determine that any distance to a next vehicle under 5 feet is too close to the next vehicle. Accordingly, the computer processor may determine an education point intended to inform the gig-economy worker to increase their following distance. The education point may include a display such as "Slow Down," "Too Close," or any other suitable indication. To provide context for such recommendation, in some embodiments the education point may include an indication of a cost associated with the education point (e.g., a cost differential in a gig insurance policy or an expected value of a risk differential from continuing to follow too closely compared with adjusting to a safer following distance).

Moreover, the education point may indicate that the gig-economy worker is following the next vehicle by 2 feet. The education point may include multiple messages, and may scroll across the surface of a display (e.g., display 202), or simply alternate between/among different education points. It should be understood that the following distance data may include more data, such as a following duration. The following duration may include a length of time the gig-economy worker has followed the next vehicle.

In another example, assume that the computer processor receives a speed associated with the gig-economy worker's vehicle, and further assume that the speed is 80 miles per hour (mph). The computer processor may access external data sources (e.g., digital map server 43) and/or utilize image analysis to determine a speed limit associated with the current environment (e.g., current roadway). For example, the computer processor may analyze a set of digital images received from an imaging apparatus (e.g., camera 258) to determine an associated speed limit. The computer processor may compare the determined speed limit to the received speed of the gig-economy worker's vehicle to determine that the gig-economy worker's vehicle is traveling above the posted speed limit, and should slow down. Correspondingly, the computer processor may determine an education point indicating that the gig-economy worker should decrease the speed of the vehicle. Again, an indication of a cost associated with action or inaction may be presented together with the education point to the gig-economy worker in some embodiments.

In yet another example, the computer processor may receive data from the gig-economy worker's vehicle indicating historical usage data of the vehicle. The historical usage data may indicate values corresponding to the past operation of the gig-economy worker's vehicle. The historical usage data may indicate an average speed of the gig-economy worker's vehicle, an average acceleration of the gig-economy worker's vehicle, and/or any other suitable telematics-based data and/or other suitable indicator. For example, the suitable indicator may also include typical routes associated with the gig-economy worker's vehicle. Thus, the system of the present disclosure may determine one or more education points corresponding to the historic operation of the gig-economy worker's vehicle as well as education points corresponding to the current operation of the gig-economy worker's vehicle. In some embodiments, costs associated with such education points (e.g., potential reductions in insurance costs) may be generated for each of the education points.

To illustrate, assume the gig-economy worker historically operates the vehicle at speeds in excess of posted speed limits during gigs, and the gig-economy worker is currently driving above the posted speed limit during a gig. The computer processor may determine one or more education points to mitigate both the speeding behavior currently taking place, as well as an education point to mitigate the gig-economy worker's continued operation of the vehicle above the speed limit.

In certain embodiments, the education model may incorporate a weighted prioritization metric to more accurately determine relevant, succinct recommendations (e.g., education points). The weighted prioritization metric may assign weighting values to the data, and determine an associated education point based upon the most heavily weighted data. Additionally or alternatively, the weighted prioritization metric included in the model may categorize various associations of data, and subsequently apply weighting values based upon the categorizations. For example, the categorizations may include vehicle telematics data, vehicle routing data, upcoming traffic information, current traffic information, and/or any other suitable data or combination thereof. Further, the weighted prioritization metric may assign aggregate weighting values to the categorizations based upon the type, amount, or other relevant consideration or combination thereof when assigning the aggregate weighting value to the categorization.

As an example, the weighted prioritization metric may assign a weighted value of 95 (on a scale of 0-100) to the vehicle telematics data categorization if there is data indicating that the gig-economy worker is operating their vehicle more than 20 mph in excess of the posted speed limit during a gig, and a weighted value of 35 if there is traffic data indicating a minor traffic slowdown several miles ahead. Thus, the computer processor may display an education point corresponding to the gig-economy worker's excessive speed, instead of an education point directed to the minor traffic slowdown. Additionally or alternatively, the computer processor may first display the message corresponding to the excessive speed before transitioning to the message directed to the minor traffic slowdown, reflecting the weighted prioritization. However, it should be understood that the computer processor may display any determined education point in any order, regardless of the prioritization, and such display settings may be adjustable by the gig-economy worker.

In any event, the method 600 continues by displaying the education point to the gig-economy worker (block 614). The computer processor may transmit the education point to a device located within the gig-economy worker's vehicle for display (e.g., a vehicle display panel), and/or the computer processor may execute instructions to display the education point on a display (e.g., display 202).

In certain embodiments, the computer processor may transmit a periodic education point for display in the gig-economy worker's vehicle to provide one or more beneficial driving behaviors intended to positively impact a gig-economy worker's performance during gigs. For example, and as discussed herein, a gig-economy worker may consistently drive over the speed limit, which may negatively impact their profile rating and their potential revenue/profit. Thus, the computer processor may transmit the periodic education point for display to the gig-economy worker to provide a suggested beneficial driving behavior (e.g., an update suggesting that the user slow down).

Additionally, the computer processor may concurrently display a predicted commercial driving profile update/adjustment associated with the education point. For example, the education point may suggest that the gig-economy worker slow down during gigs, and may additionally indicate that should the gig-economy worker slow down, their associated commercial driving profile rating will increase by 5 points. In some embodiments, the updated or adjustment may be determined and presented in terms of cost or savings associated with actions relating to the education point, such as a change in costs associated with a gig insurance policy (either an in-force or hypothetical policy) or a change in the expected value of losses related to the risks associated with action or inaction on the education point. In this way, the gig-economy worker may receive data upon which to rationally determine how best to optimize their gig-economy work when risk is considered. In further embodiments, an option to obtain a gig insurance policy covering one or more gigs may be presented to the gig-economy worker for review and acceptance.

Additionally or alternatively, should the gig-economy worker follow the suggestion made in the education point, the gig-economy worker may unlock or otherwise access special discounts, features, and/or other promotions related to the particular gig-economy platform application currently in use, a gig insurance policy held by the gig-economy worker, and/or any other suitable business, application, etc. For example, the gig-economy worker may receive discounts at fast food establishments, gas stations, car mechanics, and/or other suitable establishments. Thus, the method 600 may facilitate better driving habits, and the gig-economy worker's subsequent gig performance and overall profitability may be improved, by linking good driving behavior with monetary incentives. It is to be appreciated that any suitable scoring system or metric may be used for the profile rating.

Exemplary Methods for Detecting Commercial Driving Activity

Generally speaking, an insurance provider for a gig-economy worker may consider and analyze a number of factors when, for example, quoting or offering an insurance policy to the gig-economy worker, reviewing coverage provided by an insurance policy for the gig-economy worker, handling an insurance claim, etc. For example, the insurance provider may use movement data and/or other data to associate movements to gig activities (e.g., commercial activities) and non-gig activities (e.g., personal activities like shopping, going to an event, going to school, going to work, etc.) at the time of an accident. Such data may be used to, when an accident occurs, impute the accident to a personal insurance policy or to a gig or commercial insurance policy.

In some embodiments, a gig-economy insurance policy may be a limited insurance policy that only provides coverage to a gig-economy worker for a loss that occurs while performing a gig-related activity, such as an accident while providing on-demand transportation services. For example, a gig-economy insurance policy cost may be based upon an amount of time spent driving for gig-economy work, such as a percentage of time spent on gig-related driving, a distance driven while performing gig-economy work, or total hours spent on gig-related driving.

In some embodiments, the amount of gig-related driving may be weighted (e.g., based upon time of day, location, weather conditions, road conditions, or other factors associated with the gig-related driving) to reflect relative risk levels. For the convenience of gig-economy workers, telematics or other data may be used to attribute driving activity to gigs or to personal driving. For example, the server 40 may automatically detect driving activity and attribute such driving activity to a first gig, a time between gigs, or to home at the end of gig activities be attributed to gig-related coverage.

Figure 7:
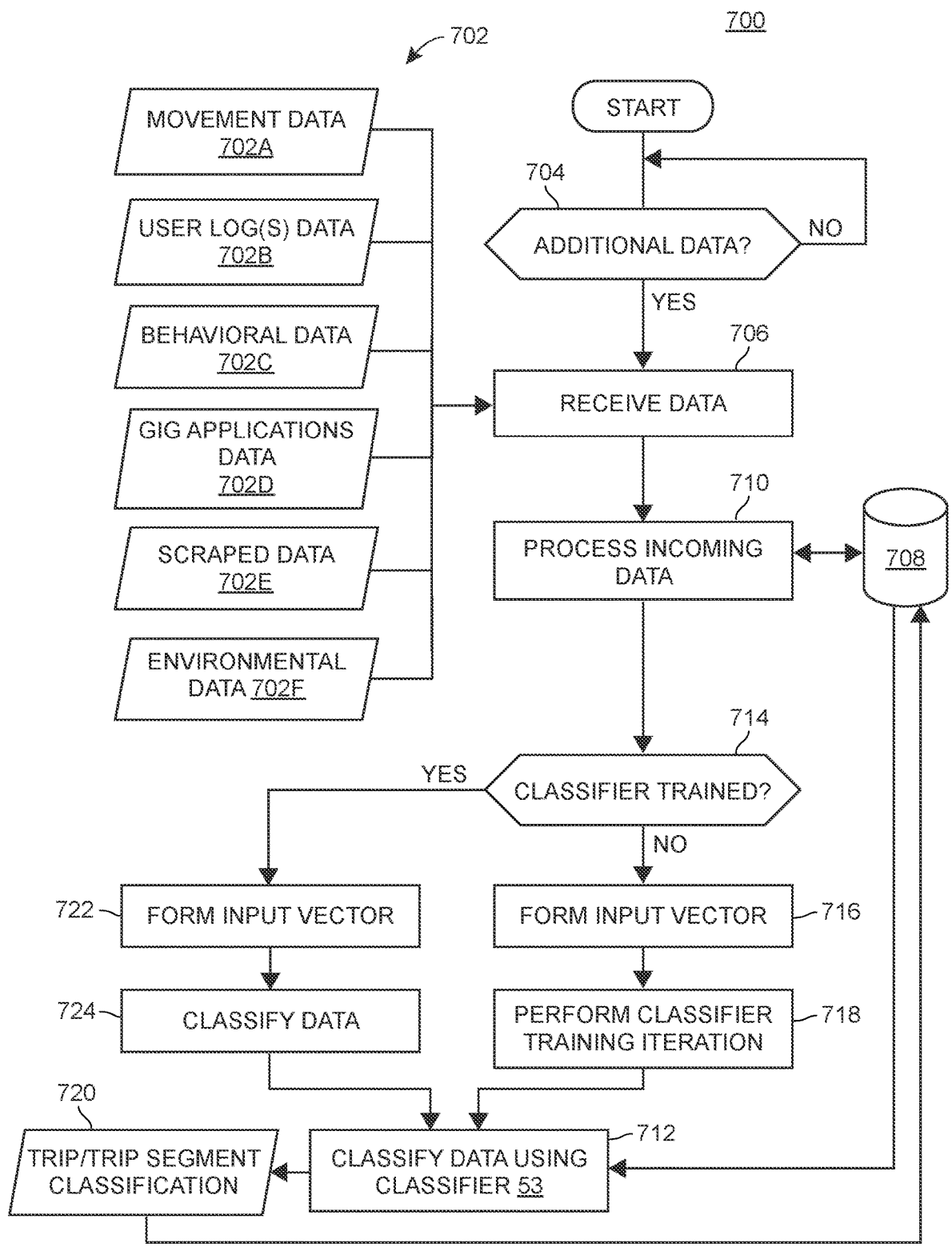
FIG. 7 illustrates a flow diagram of an exemplary automatic gig-economy activity identification method.

FIG. 7 illustrates a flow diagram of an exemplary automatic gig-economy activity identification method 700 representative of example processes, methods, logic, software, computer- or machine-readable instructions for determining the likelihood that activity (e.g., driving of the gig-economy worker 17) is related to commercial activity or personal activity at a particular point in time. The processes, methods, logic, software and instructions may be an executable program or portion of an executable program for execution by a processor such as the processor 62 of server 40. The program may be embodied in software or instructions stored on a non-transitory computer- or machine-readable storage device, storage medium and/or storage disk associated with the processor 62 in which information is stored for any duration (e.g., for extended time periods, permanently, for brief instances, for temporarily buffering, and/or for caching of the information).

Although the example program is described with reference to the automatic gig-economy activity identification method 700, other methods of detecting whether activity of a person is related to gig-economy work or personal activity may alternatively be implemented based upon the description herein. For example, the order of execution of the blocks may be changed, and/or some of the blocks described may be changed, eliminated, or combined. Additionally, or alternatively, any or all of the blocks may be implemented by one or more hardware circuits or modules structured to perform the corresponding operations, with or without executing software or instructions.

The automatic gig-economy activity identification method 700 begins with, for example, the processor 62 of server 40 waiting to receive data 702 representative of the movements of a gig-economy worker and possibly other gig-economy workers (e.g., the additional gig-economy workers 16) (block 704). In some embodiments, the data 702 may indicate a beginning of a gig-related interaction between the gig-economy worker and a customer (e.g., one of the gig-economy customers 21). The data 702 may indicate a location at which a gig-economy worker activated a gig-economy platform application on a mobile device (e.g., mobile computing device 110), a location at which the gig-economy worker accepted a gig via a mobile device, locations to which the gig-economy work traveled, etc. The processor 62 receives the data 702 representative of one or more movements of the gig-economy worker (block 706).

Example data 702 includes: (i) movement data 702A, which may include telematics data and/or information regarding vehicle operation such as, but not limited to roads traveled, road segments traveled, intersections traversed, pathways traveled, locations of stops other than those associated with rules of the road, length of stops, etc.; (ii) log data 702B indicating times of certain events; (iii) behavioral data 702C relating to monitored actions such as driving maneuvers; (iv) gig applications data 702D stored by one or more gig-economy platform applications related to the travel of a gig-economy worker in the performance of gig-related activities; (v) scrapped data 702E scraped from one or more gig-economy platform applications related to the travel of a gig-economy worker in the performance of gig-related activities; (vi) environmental data 702F; and/or (vii) any other available data that may be indicative of gig-economy work performance. The data 702, the movement data 702A, the log data 702B, the behavioral data 702C, the gig applications data 702D, the scraped data 702E, the environmental data 702F, and/or other data may be used to associate roads traveled, road segments traveled, intersections traversed, pathways traveled, locations of stops, lengths of stops, etc., with a likelihood of gig-related activity (e.g., commercial activity) compared to non-gig-related activity (e.g., personal activity).

Any or all of the data 702 (i.e., data 702A-702F) may be collected or generated with one or more sensors of a mobile device, one or more sensors of a vehicle (e.g., internal sensors 108 or external sensors 120 associated with the vehicle 10) communicatively coupled to an on-board computer of the vehicle (e.g., the on-board computer 11A of the vehicle 10), a computing device within or connected to the vehicle (e.g., a mobile computing device 110, such as a user mobile device 12), a GPS device, and/or any other means to track, store and recall relevant data. The data 702 may, in some examples, include historical data for comparison or establishing a baseline of non-gig-related driving activity. In some examples, the data 702 includes data related to the movements of other gig-economy workers (e.g., additional gig-economy workers 16 associated with additional vehicle 15), which may be used to classify a gig-economy worker's movements as being gig-related or as not being gig-related.

Example movement data 702A includes data indicative of locations or movements, which may include roads traveled, road segments traveled, intersections traversed, pathways traveled, turns made, locations of stops other than those associated with rules of the road, length of stops, time of data associated with driving events, etc.

Example log data 702B includes times and locations associated with events, which may include times and places of gig starts, durations and places of gig stops. Log data 702B may be generated and/or stored automatically and/or manually on, for example, a mobile device. In some embodiments, log data 702B may include gig-economy worker indications of start and stop times of gig-economy work for purposes of using a gig insurance policy. In further embodiments, the log data 702B may include automatically generated log entries, such as entries of vehicle start-up and shut-down events.

Example behavioral data 702C includes data indicative of behaviors that may be associated with gig-economy work, which may include speed data such as acceleration and/or deceleration rates, speed relative to posted speed limit, braking data such as braking speed and/or distance, risk-adverse driving data such as less aggressive acceleration and braking, handling data such as aggressive or tight turning, etc. Any or all of the behavioral data 702C may be used to help identify gig or non-gig activity when driving behavior differs between gig and non-gig activity.

Further example behavioral data 702C includes, but is not limited to, the speed at which the gig-economy worker typically drives when performing gig-related activities; the type of vehicle that the gig-economy worker typically drives during gig-related or non-gig-related activities; the type of roads or routes that the gig-economy worker usually takes during gig-related or non-gig-related activities; the distance at which the gig-economy worker typically trails other vehicles during gig-related or non-gig-related activities; whether the gig-economy worker drives a large percentage of time adjacent to other vehicles traveling in the same direction (such as on a four-lane highway) during gig-related or non-gig-related activities; whether the gig-economy worker typically drives too slow or too fast in relation to the posted speed limit during gig-related or non-gig-related activities; and/or other driving behaviors of the gig-economy worker during gig-related or non-gig-related activities.

Similarly, the other data may indicate the weather conditions that the gig-economy worker will normally drive in during gig-related or non-gig-related activities; the locations where the gig-economy worker typically drives during gig-related or non-gig-related activities; and/or the dates/times of day that the gig-economy worker usually drives or drives the most at during gig-related or non-gig-related activities.

Example gig applications data 702D includes data associated with a gig-economy worker's gig-related applications, such as data captured by gig-economy platform applications. Such gig-related applications may include third-party applications used to enhance the experience of the gig-economy worker, such as mapping applications or insurance-related applications.

Example scraped data 702E includes data captured for each gig, such as customer, start and/or stop, type of gig, etc., stored by, for example, a company operating an interface (e.g., a website) for a gig-economy worker to identify and select gigs. Data related to the posting and assignment of gigs can be scraped from such websites or other interfaces of gig-economy platforms.

Example environmental data 702F includes data associated with the local environment in which a gig is performed, such as local weather or infrastructure conditions. The environmental data 702F may be captured by, for example, public and private surveillance cameras, toll plazas, swiping on access cards, etc.

While examples described herein relate to automobiles, they may be used in connection with, for example, bicycles, motorcycles, scooters, hover boards, skateboard, drones, autonomous vehicle, smart car, planes, trains, subways, buses, walking, running and/or any other means that can be used to perform gig-related activities and personal activities.

In any event, as data 702 is received (block 706), the method 700 continues by processing the incoming data 702 for storage in a database 708 (block 710), which database 708 may comprise one or more databases 46. In one example, for each person, data is stored in the database 708 as a sequence of entries, where each entry includes (i) an identifier for a traveled segment, intersection, path, location, etc., (ii) a start time, (iii) an end time, (iv) a type (e.g., gig or non-gig) for the entry, if known, etc., and/or (v) an identifier for the gig-economy worker associated with the entry. In some examples, the gig or non-gig type of activity (or a likelihood of gig or non-gig activity) is determined using the behavioral data 702C.

To determine likelihoods of commercial activity, the automatic gig-economy activity identification method 700 operates a classifier 53 (see FIG. 1A) to determine the likelihoods of observed activity being either gig activity or non-gig activity (block 712). In the example of FIG. 1A, the classifier 53 is or may include a portion of a memory unit (e.g., the program memory 60) configured to store software, and machine- or computer-readable instructions that, when executed by a processing unit (e.g., the processor 62) cause the processing unit to perform a classification of data into gig-related activity or non-gig-related activity (block 712). In some examples, the classifier 53 determines the likelihoods that traversals of trip segments (e.g., a section of traveled road, a section of traveled pathway, an intersection, a stopping point, a point-of-interest) are attributable with gig-related activity (e.g., commercial driving activities) or to non-gig activity (e.g., personal driving activities).

In some examples, the classifier 53 utilizes, applies, or implements a machine-learning model 54 to process data stored in the database 708 to determine (e.g., estimate, generate, calculate, etc.) likelihoods that movements are gig-related. The machine-learning model 54 may utilize deep learning algorithms that are primarily focused on, for example, pattern recognition, and may be trained by processing example data. The machine-learning model 54 may include Bayesian program learning (BPL), voice recognition and synthesis, image or object recognition, optical character recognition, and/or natural language processing—either individually or in combination. The machine-learning model 54 may also include natural language processing, semantic analysis, automatic reasoning, and/or machine-learning. The machine-learning model 54 and/or the classifier 53 may be implemented by the server 40 as a set of logical instructions executed as machine- or computer-readable instructions to implement the classifier 53 and/or the machine-learning model 54.

As previously mentioned, the classifier 53 may utilize, apply, or include machine-learning to adaptively learn to attribute movements with gig- and non-gig-related activities. Generally, machine-learning may involve identifying and recognizing patterns in existing data such as the data 702 in order to facilitate making predictions for subsequent data 702. The machine-learning model 54 may be created using unsupervised and/or supervised machine-learning. In supervised learning, one or more processing elements are provided with example inputs and associated known or true outputs, and may seek to discover a general rule that maps inputs to outputs, so that when subsequent novel inputs are provided, the processing element may, based upon the discovered rule, accurately predict the correct or a preferred output. In unsupervised machine-learning, the processing element may be required to find its own structure in unlabeled example inputs. In some embodiments, machine-learning techniques may be used to determine likelihoods that movements are attributable with commercial activity from the data 702.

As received data 702 is processed and stored in the database 708 (block 710), it is determined whether the classifier 53 has been trained or is still being trained (block 714). For example, if a machine-learning model 54 of the classifier 53 is still being trained, input vectors are formed (block 716). In some examples, the input vectors are the same as the data stored in the database 708. The classifier 53 is trained by causing the classifier 53 to train, test and validate a machine-learning model 54 of the classifier 53. In some examples, as new data 702 is received, the new data 702 and, in some instances, previous data stored in the database 708, is used to train the classifier 53 by performing a classifier training iteration (block 718) to train the machine-learning model 54. The iteratively trained machine-learning model is then used to operate the classifier 53 to generate output classifications 720 (block 712). Output classifications 720 of the classifier 53 during training are compared with actual gig or non-gig data to form errors that are used to develop and update the machine-learning model 54.

In some examples, data stored in the database 708 is used repeatedly to train a machine-learning engine of the classifier 53 until the machine-learning model 54 has converged. For example, until the classifier 53 is classifying travel segment transversals as gig or non-gig correctly with a predetermined threshold level of accuracy. In some examples, convergence of the machine-learning model 54 is performed using k-fold cross-validation. The data stored in the database 708 is randomly split into k parts (e.g., 5 parts), and the machine-learning model 54 of the classifier 53 is trained using k−1 parts of the k parts of the database 708 to form trial segment traversal likelihoods. The machine-learning model 54 is evaluated using the remaining one part of the database 708 to which the machine-learning model 54 has not been exposed.

Outputs of this developing machine-learning model 54 for the database 708 are compared to actual or known likelihoods to determine the performance or convergence of developing machine-learning model 54. Performance or convergence can be determined by, for example, identifying when a metric computed over the errors (e.g., a mean-square metric, a rate-of-decrease metric, etc.) satisfies certain criteria (e.g., a metric is less than a predetermined threshold, such as a root mean squared error).

Returning to block 714, if the machine-learning model 54 of the classifier 53 is determined to have been trained (block 714), input vectors are formed (block 722). In some examples, the input vectors are the same as the data stored in the database 708. The new data from the database 708 is classified (block 724) by processing the data with the classifier 53 (block 712), and the output classifications 720 of the classifier 53 are used to attribute travel segments of the new data 702 to gig activities (e.g., commercial activities) or non-gig activities (e.g., personal activities).

In some examples, the machine-learning engine of the classifier 53 is at least partially or initially training using data 702 for a gig-economy worker that is known to be (e.g., indicated by the gig-economy worker) as being unrelated to gig-economy work, such as data provided by the gig-economy worker regarding driving prior to starting work as a gig-economy worker. Subsequent gig and non-gig activities could be used to further train the machine-learning model 54 and/or to test the machine-learning model 54.

In some examples, the machine-learning model 54 of the classifier 53 is additionally trained using data 702 for other gig-economy workers. Such data may be applicable when there are number of gig-economy worker in a same geographic area that likely have similar gig driving patterns. Such data may be used, for example, to determine an initial likelihood of gig-related activity, which may be further refined using data specific to a particular gig-economy worker.

Exemplary Gig-Economy Data Model Generation

The methods and systems described herein may facilitate gig-economy data collection and analysis, which may be used to model and predict various metrics related to gig-economy work. As described further below, data models may be generated and used to produce recommendations for gig-economy workers to optimize their work. Currently, optimization of gig-economy work is limited to improvements in the efficiency of performing a task after accepting it (e.g., more efficient on-demand ride or delivery routes) or individual determinations of when to work based upon lagging signals of demand (e.g., notifications of current surge rates going into effect after a rapid increase in demand relative to supply). More robust data models are needed for accurate prediction of demand and profitability. Additionally, the robust data models described herein enable optimization based upon worker-specified criteria, such as a gig-worker schedule, current or future locations, or gig preferences. By modeling gig metrics relating to a plurality of gig-economy platforms, the techniques described herein also enable optimization recommendations to be generated between different gigs of different types or on different gig-economy platforms. The methods described herein solve the problems of insufficient predictive power in the existing techniques of gig-economy work evaluation and optimization by generating and using data models of gig metrics for comparison and optimization of gigs according to various criteria in view of current or expected conditions.

Figure 8:
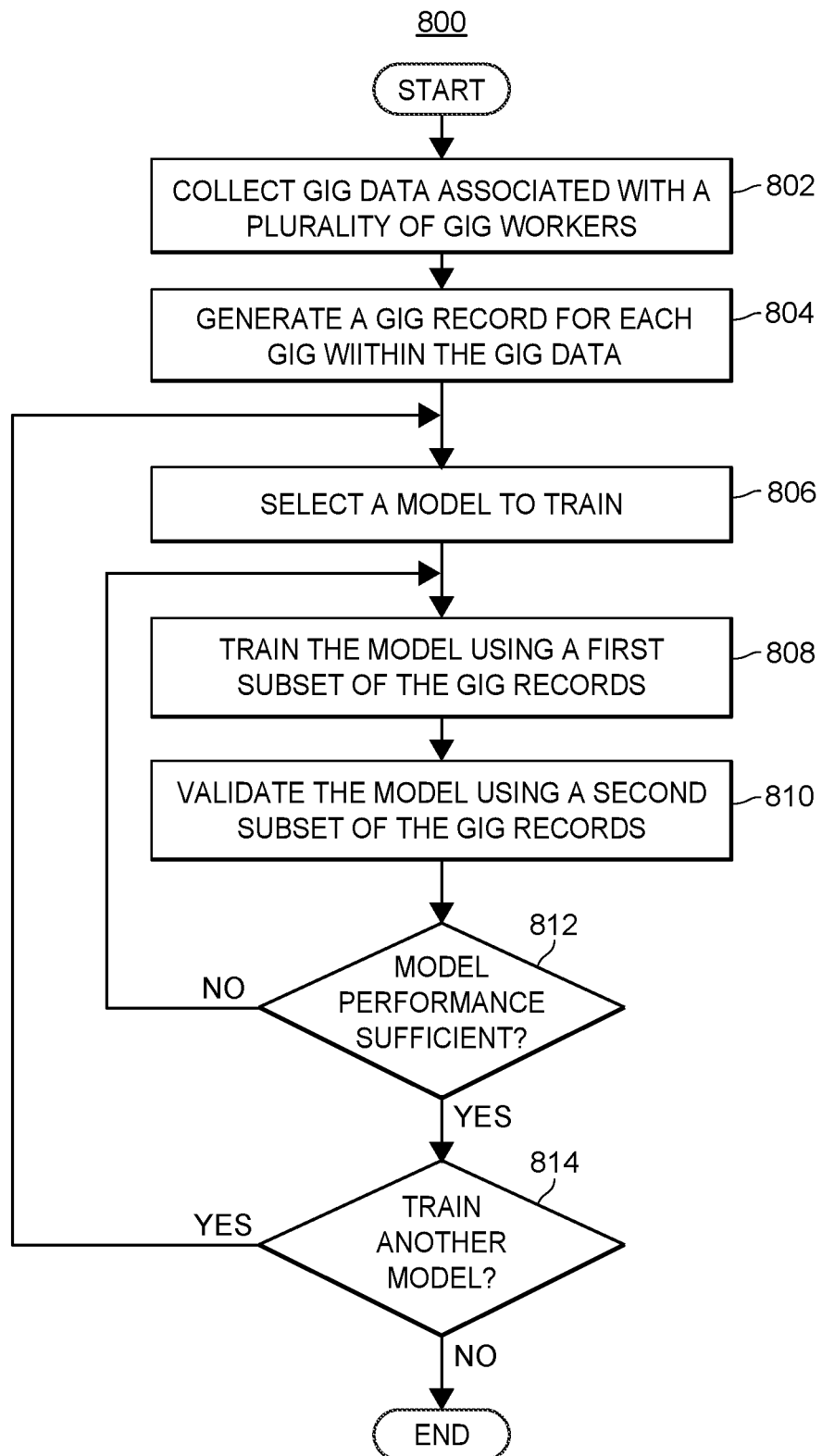
FIG. 8 illustrates a flow diagram of an exemplary gig-economy data model generation method.

FIG. 8 illustrates a flow diagram of an exemplary gig-economy data model generation method 800 for training gig-economy data models using data relating to a plurality of gigs performed by a plurality of gig-economy workers. The data may be associated with gigs created and performed through a plurality of gig-economy platforms, such as on-demand services network platforms 70. In some embodiments, one or more gig-economy data models may be generated for each gig-economy platform to facilitate cross-platform comparison and optimization recommendations. The method 800 may be performed by the one or more processors of one or more servers 40 implementing executable instructions stored as computer-readable instructions stored in the one or more program memories 60. In order to obtain gig data for processing, the one or more servers 40 may communicate with a plurality of front-end components 2 or other back-end components 4 via the network 3. In alternative embodiments, similar computer-implemented methods of generating gig-economy data models may be performed, which may include additional, alternative, or fewer aspects to those described below.

The exemplary gig-economy data model generation method 800 may begin with collecting gig data associated with a plurality of gigs performed by a plurality of gig-economy workers over a period of time (block 802). The gig data may be pre-processed to generate a set of gig records containing a gig record for each gig in the gig data (block 804), which gig records may include both gig metrics extracted from the gig data and gig metrics calculated from the gig data. This set of gig records may then be used to generate gig-economy data models by selecting a machine learning model to train (block 806), training the model with a first subset of the gig records (block 808), and validating the model using a second subset of the gig records (block 810). Training and validation may be performed iteratively until the model performance is determined to be sufficient (block 812). Additional models may then be selected and similarly trained (blocks 806-812) until no further models remain to be trained (block 814).

At block 802, the server 40 may collect gig data relating to a plurality of gigs performed by a plurality of gig-economy workers. The gig data may include details relating to the gig and its performance, such as a category of the gig (e.g., on-demand transportation, package delivery, home maintenance tasks, office tasks, or construction tasks), times associated with the gig (e.g., time gig offer created, time gig accepted, time performance started, or time completed), locations associated with the gig (e.g., project location, pick-up location, drop-off location, or waypoints), details associated with gig performance (e.g., performance requirements or specific instructions), ratings associated with the gig (e.g., ratings by gig-economy workers or customers), financial information (e.g., total gig payment by customer, gig payment received by gig-economy worker, pricing levels or modifiers in effect for the gig, or out-of-pocket costs associated with the gig—such as parking or roadway tolls), and/or other gig-related data providing details regarding the gig.

In some embodiments, some or all of the gig data may be collected by communication with one or more gig-economy platforms, such as on-demand services network platforms 70. In further embodiments, some or all of the gig data may be collected from mobile computing devices 110 associated with a plurality of gig-economy workers (e.g., on-board computer 11, user mobile device 12, wearable computing device 13, or additional mobile devices 15).

In some embodiments, data may be collected from other network-connected computing devices, such as customer computing device 20, connected home devices 22, or autonomous devices 30. In additional embodiments, the server 40 may collect condition data associated with gigs from additional data sources, such as data regarding weather conditions, traffic conditions, special events (e.g., holidays, parades, conventions, sporting events, concerts, or other events affecting a large number of people), and/or other relevant information that may impact supply or demand for gig-economy services.

In yet further embodiments, telemetric data may be collected from gig-economy workers during gig work, such as through a specialized software application installed by the interested gig-economy workers to better track their gig-economy activities for recordkeeping, tax, or profit optimization purposes. Such telemetric data may include, for example, metrics regarding vehicle movement during a gig, which may have implications for vehicle maintenance costs, customer satisfaction, and worker satisfaction related to the gig.

At block 804, the server 40 may organize the collected data into a data set of standardized data for analysis by generating a gig record containing gig metrics for each of the gigs indicated in the collected gig data. Thus, the server 40 may identify each unique gig in the gig data to avoid duplication and may combine data from various sources into each gig record (e.g., customer and gig-worker ratings for the same gig may be matched and included in the gig record for that gig).

In addition to gig metrics that may be directly extracted from the gig data (e.g., times, locations, prices, platforms, ratings, or the like), the server 40 may determine additional gig metrics associated with the gig records. The additional gig metrics may include standardized categorization of gig data, such as adding entries for a category of gig-economy service involved (e.g., on-demand transportation, product delivery, defined scope office work, home project assistance, or moving assistance). For some gigs, such categories may be determined based upon the associated gig-economy platform.

The additional gig metrics may similarly include gig metrics calculated from the available data to provide more useful data points for analysis. Such calculated gig metrics may include metrics such as total cost in performing a gig (e.g., by combining direct out-of-pocket costs with indirect costs, such as fuel costs, wear, and maintenance costs for vehicle use based upon time and distance traveled) or profit per unit time for a gig, which may include or exclude indirect costs of performing the gig. Such calculated gig metrics may be of particular interest to gig-economy workers and may thus be useful in training models for optimization of gig-economy work decisions. In some embodiments, gig metrics may be calculated for related groups of gigs, such as total profit (net or gross) for a gig-economy worker over a period of time (e.g., over the course of a day) during which the gig-economy worker completed multiple gigs. Such gig metrics may that link multiple gig records in a useful manner.

Once the gig data set has been prepared by generating the set of gig records, the server 40 may select a machine learning model to train using the gig records at block 806. The machine learning model may be selected for supervised or unsupervised learning. For example, unsupervised learning may be used for identifying unexpected relationships between gigs, while supervised learning may be used to train models for optimization of salient gig metrics, such as profitability.

A model may be specified based upon user input specifying relevant gig metrics as predicted variables and other variables as potential explanatory variables. For example, a model may be specified to predict the profit per unit time or the total profit using the remaining gig metrics. Conditions for training the model may likewise be selected, such as limits on model complexity or limits on model refinement past a certain point. Due to the limitations and differences of the gig data available for different gig-economy platforms, one or more models may be selected for specific platforms. Because gig outcomes vary significantly by location and time, the models may be selected also based upon location (e.g., state or metropolitan area) or time (e.g., weekdays or weekends). In some embodiments, unsupervised machine learning techniques may be used to determine the relevant geographic location or time groupings based upon the gig records.

Thus, the gig-economy data model generation method 800 may begin with selecting machine learning models to identify relevant groups of gig records for further analysis, then train models relating to selected gig metrics based upon the identified groupings of the gig records. This may be particularly useful for continuous variables such as time and location, where clear delineations may not be readily apparent to human analysts, and which stand in contrast to discrete variables such as the gig-economy platform associated with the gig record.

At block 808, the selected model may be trained using a first subset of the gig records to generate a trained model. The selected model may be trained using appropriate machine learning techniques, based upon the type of model selected and any conditions specified for training the model. The model may be trained using a supervised or unsupervised machine-learning program or algorithm. The machine-learning program or algorithm may employ a neural network, which may be a convolutional neural network, a deep learning neural network, or a combined learning module or program that learns in two or more features or feature datasets in a particular areas of interest. The machine-learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine-learning algorithms and/or techniques.

Machine-learning may involve identifying and recognizing patterns in existing data in order to facilitate making predictions for subsequent data. In some embodiments, due to the processing power requirements of training machine learning models, the selected model may be trained using additional computing resources (e.g., cloud computing resources) based upon data provided by the server 40.

At block 810, upon generation of the trained model, the trained model may be validated using a second subset of the gig records to determine model accuracy and robustness. Such validation may include applying the trained model to the gig records of the second subset of gig records to predict values of some of the gig metrics of such records based upon values of other gig metrics of the records. The trained model may then be evaluated at block 812 to determine whether the model performance is sufficient based upon the validation stage predicted values. The sufficiency criteria applied may vary depending upon the size of the gig data set available for training, the performance of previous iterations of trained models, or user-specified performance requirements.

When the server 40 determines the trained model has not achieved sufficient performance, additional training may be performed at block 808, which may include refinement of the trained model or retraining on a different first subset of the gig records, after which the new trained model may again be validated at block 810. When the server 40 determines the trained model has achieved sufficient performance at block 812, the trained model may be stored for later use, and the gig-economy data model generation method 800 may continue. In some embodiments, trained gig-economy data models may be stored in the database 46 associated with one or more servers 40.

At block 814, after training a model using the gig records, the server 40 may determine whether there remain additional models to train. Such additional models may be related to other gig-economy platforms, gig categories, location groups, or time groups. In some embodiments, additional divisions of the gig records may be used to determine further models to be trained, which may depend upon the availability of sufficient gig records for the additional divisions. For example, a trained model may be generated for the entirety of a metropolitan area as a relatively generic model when a more specific model cannot be generated for some areas within the metropolitan area with small numbers of gig records, while more specific models may also be generated for areas within the metropolitan area for which sufficient gig records are available. When the server 40 determines that no further models remain to be trained, the gig-economy data model generation method 800 ends.

Exemplary Gig Optimization Recommendation Methods

The data models generated based upon gig data as discussed above or by other methods may further be used to generate real-time or advance recommendations for optimizing aspects of gig-economy services by gig-economy workers. In contrast to the limited means of optimizing gig-economy work based upon individual experience or lagging indicators of demand, the methods described below generate optimization recommendation based upon predictions of expected demand, as well as expected characteristics of gigs predicted to be available. Thus, the predictive methods described herein enable optimization of relevant gig metrics, rather than simply providing a lagging indication of current overall demand on a particular gig-economy platform. Such methods solve the problems of insufficient predictive power and worker-specific customization in the existing techniques of gig-economy work evaluation and optimization by using data models of gig metrics for comparison and generation of optimization recommendations according to various criteria in view of current or expected conditions.

Figure 9:
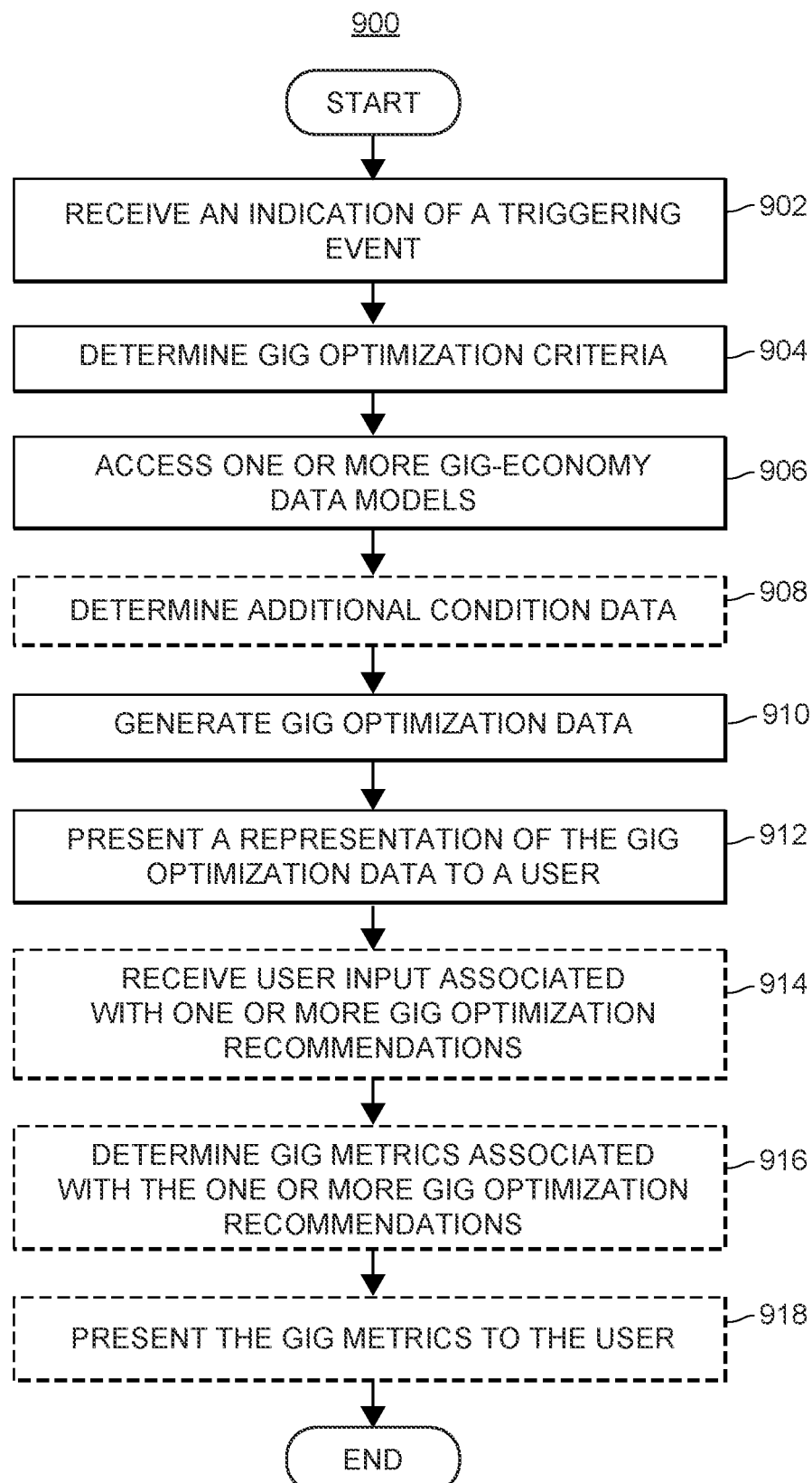
FIG. 9 illustrates a flow diagram of an exemplary optimization recommendation generation method.

FIG. 9 illustrates a flow diagram of an exemplary optimization recommendation generation method 900 for providing gig-economy workers with recommendations for optimizing gig-economy work based upon gig-economy data models. Gig-economy work recommendations may include recommendations relating to timing, location, or type of gigs to pursue in order to maximize or minimize gig-economy optimization criteria, such as total profit, profit per unit time, or travel distance. By using gig-economy data models generated for a plurality of gig-economy platforms, such as on-demand services network platforms 70, the optimization recommendations may also enable gig-economy workers to shift their efforts between different categories or types of gig-economy work in response to demand.

The optimization recommendations may be generated by one or more servers 40 implementing executable instructions stored as computer-readable instructions stored in the one or more program memories 60. In order to obtain relevant optimization criteria or condition data, the one or more servers 40 may communicate with a plurality of front-end components 2 or other back-end components 4 via the network 3. In alternative embodiments, similar computer-implemented methods of generating gig optimization recommendations may be performed, which may include additional, alternative, or fewer aspects to those described below.

The exemplary optimization recommendation generation method 900 may begin with receiving an indication of a triggering event to generate optimization information (block 902). In response to such indication, gig optimization criteria may be determined (block 904), and one or more relevant gig-economy data models may be accessed (block 906). In some embodiments, additional condition data may be determined in order to produce accurate optimization information (block 908). Using the one or more gig-economy data models, the gig optimization criteria, and (where available) the additional condition data, gig optimization data is then generated (block 910), which may include gig optimization recommendations for a particular user, location, or time. A representation of such gig optimization data may then be presented to a gig-economy worker or other user (block 912). In some embodiments, the user may enter input associated with one or more gig optimization recommendations presented or sought (block 914). In response to such input, gig metrics associated with the gig optimization recommendations may be predicted (block 916) and presented to the user (block 918).

At block 902, the server 40 may receive an indication of a triggering event to cause the generation of gig optimization information. In some embodiments, the triggering event may be a user request from a mobile computing device 110 associated with a gig-economy worker 17 (e.g., the user mobile device 12). In further embodiments, the triggering event may be automatically generated based upon user-specific information, such as upon a gig-economy worker 17 opening an application associated with gig-economy work on a user mobile device 12, upon the gig-economy worker 17 indicating availability for gigs in such an application, upon completion of a gig by the gig-economy worker 17, or periodically during gig-economy work availability by the gig-economy worker 17. For example, a gig-economy worker 17 may access a gig optimization dashboard application on the user mobile device 12 to view current or future gig optimization data, which may include user-specific gig optimization recommendations.

As another example, the triggering event may be a determination that a gig-economy worker 17 is currently engaged in gig-economy driving, rather than personal driving, as discussed above. In yet further embodiments, the triggering event may be an event unassociated with a specific user, such as upon the passage of a predetermined time period or upon the availability of new condition data or new gig-economy data models. In such embodiments, the resulting gig optimization data may be stored for presentation to multiple users.

At block 904, the server 40 may determine gig optimization criteria indicating the parameters of the optimization. Such optimization criteria may be associated with one or more gig metrics to be optimized, as well as gig metrics indicating constraints on the optimization (e.g., location, time, or categories of gigs to be performed). For example, net profit and net profit per hour may be determined to be gig metrics to be optimized, while geographic area and time range may be constraints on the optimization. Thus, the optimization may be limited to conditions relevant to a particular gig-economy worker at a particular time, providing more accurate gig optimization recommendations.

In some embodiments, optimization criteria may be determined based upon indications of such criteria included in a request from a mobile computing device 110. For example, a user request may indicate user-defined optimization criteria such as a time range, location range, or preferred gig-economy platforms for gig work.

In further embodiments, the server 40 may obtain schedule or preference data relating to a gig-economy work, such as in a user profile generated by the user or generated from data the user has granted permission to access. For example, a user schedule may be used to determine locations and times to use as optimization criteria, such as a home or office location to which the user will travel after completion of gig-economy work, which may be used to reduce uncompensated travel related to gigs performed by a user (e.g., travel to or from a location before or after completing a gig).

As another example, user preference data may indicate a user-specified ranking or rating of gig-economy platforms or categories of gig-economy work, which may be used to weight the gig optimization recommendations in favor of preferred gig types. In some embodiments, default values of certain gig optimization criteria may be used when other optimization criteria are not specified, such as a current time determined at the server 40 or a geographic area associated with a user based upon past gigs performed by the user.

At block 906, the server 40 may select and access one or more gig-economy data models based upon the gig optimization criteria. This may include matching the optimization criteria with model specifications of previously trained models stored in a database 46 to select one or more gig-economy data models that may be relevant to optimization.

In some embodiments, gig-economy data models meeting only some of the gig optimization criteria may also be selected for use in generating gig optimization recommendations or comparison points concerning adjusting the gig optimization criteria. For example, models for different times of day or nearby locations outside a specified geographic area may be selected and accessed to generate and present alternative gig optimization data regarding alternative gig-economy work conditions that may be of interest to a user, such as alternative recommendations to perform gig-economy work at a different time of day. Such alternative gig optimization data may be presented in addition to gig optimization data based upon matching all the gig optimization criteria, thereby providing a useful comparison regarding the benefit or detriment from adjusting the optimization criteria. The selected gig-economy data models may then be accessed by the server 40 from the database 46.

At block 908, in some embodiments, the server 40 may determine additional condition data to use in the optimization. Such additional condition data may include current or predicted conditions that affect supply, demand, or performance of relevant gigs. For example, inclement weather typically increases demand for on-demand transportation, as well as increasing time to complete such gigs. In contrast, inclement weather is usually uncorrelated with package delivery. Therefore, current or predicted weather conditions may be determined by the server 40 when at least one of the gig-economy data models uses weather conditions as a predictive variable. Additional condition data may include conditions such as weather conditions, traffic conditions, local events, estimates of demand, or estimates of supply by other gig-economy workers. Thus, the server 40 may obtain additional condition data from one or more gig-economy platforms via network 3, such as by communication with a transaction server 42, task management server 44, or fleet management server 45.

In some embodiments, additional condition data may be obtained from customer devices, such as customer computing devices 20, connected home devices 22, or autonomous devices 30. Such additional condition data may be indicative of current user-specified or automated gig requests, or it may be indicative of future demand for gig-economy services.

At block 910, the server 40 may apply the optimization criteria and any additional condition data to the one or more gig-economy data models to generate gig optimization data. Such gig optimization data may include expected values of gig metrics to be optimized for each model, as well as ranges of the gig metrics. Values of gig metrics to be optimized may be determined for each of a plurality of combinations of model predictive variables, including variables not associated with the gig optimization criteria. For example, a plurality of locations within a geographic area to wait for a gig may be used as input values for a gig-economy data model to obtain corresponding output values of expected net profit, thereby allowing a comparison of different waiting locations based upon their expected impact on profitability. By calculating the values of output gig metrics for each of a plurality of input variables and/or a plurality of gig-economy data models, the output gig metrics may be compared to identify optimal gig parameters.

In some embodiments, the optimal gig parameters may account for risk associated with various gigs, which may vary by gig type, time, or location. Such risk may be considered as a cost associated with the gig-economy work, either as a direct cost (e.g., a cost of a short-term or supplemental insurance policy) or as an indirect cost (e.g., an expected value of losses associated with such risk).

In further embodiments, optimal gig parameters may be further used to generate gig optimization recommendations that may be implemented by a gig-economy worker to optimize the outcomes of gig-economy work. For example, a gig optimization recommendation may indicate switching from providing on-demand travel services to providing on-demand office services is expected to result in an increase in net profit between certain times of day, while the reverse may be optimal during at other times, based upon predicted values of gig metrics calculated using the gig-economy models. In some embodiments, a plurality of potential gig optimization recommendations associated with a plurality of gig parameters may be generated, while a subset of such potential gig optimization recommendations may be selected as the gig optimization recommendations based upon their relative impact on the expected values of gig metrics to be optimized.

At block 912, the server 40 may cause a representation of at least some of the gig optimization data to be presented to a user via a display 202 of a mobile computing device 110. In some embodiments, the representation of the gig optimization data may comprise one or more gig optimization recommendations, which recommendations may be associated with various conditions (e.g., times or geographical areas). In further embodiments, the representation may include a visual presentation of the gig optimization data outputs relative to input values, such as a tabular presentation of predicted profit for each a plurality of hours or a heat map showing the predicted profitability or waiting time for gigs at various locations within a geographic area. In some embodiments, a dashboard of gig optimization data may be presented to the user to make multiple decisions, such as a gig-economy platform to use and a location at which to offer gig-economy services. When a gig optimization recommendation is to be presented to the user, in some embodiments, a representation of such recommendation may be presented as an alert or push notification on the mobile computing device 110 associated with the user.

In some embodiments, one or more options may be presented to the user for selection or input, such as options relating to gig optimization criteria. Such options may be presented to the user to enable the user to compare various scenarios by adjusting the optimization criteria.

At block 914, in some embodiments, the server 40 may receive from a mobile computing device 110 via the network 3 one or more indicators of user input related to the gig optimization criteria options. Such user input may indicate selection of options regarding gig metrics to be optimized, gig metrics used as input by the models, or gig metrics used in determining which gig-economy data models to apply. For example, the user input may indicate a new category of gig-economy work or a new gig-economy platform to analyze. In some embodiments, the user input may be received as values or selections used to generate one or more output gig metric values as an interactive gig metric calculator. In such embodiments, predicted values of certain user-specified or predetermined output gig metrics (e.g., gig metrics related to profit or cost) may be updated in real time in response to user input indicative of input gig metrics (e.g., gig metrics related to time, location, or type of gig).

At block 916, in some embodiments, the server 40 may determine one or more predicted values of the gig metrics based upon the user input and the gig-economy data models. In some instances, the server 40 may select and access additional gig-economy data models based upon the user input, such as in cases when the user input changes gig metric values that were used to select the one or more gig-economy data models previously used in generating the gig optimization data. Thus, the user input may be used to generate updated gig optimization data according to the previously identified gig-economy data models or additional gig-economy data models. In some embodiments, the user input may be used to generate one or more gig optimization recommendations for the user, which may be the same as or differ from previously generated gig optimization recommendations.

At block 918, in some embodiments, the server 40 may then cause a representation of the determined gig metric values or gig optimization recommendations to be presented the user via the display 202 of the mobile computing device 110. The representation may likewise include one or more options for the user to input or select further gig optimization criteria for further analysis, in which case further gig optimization data or recommendations may be generated and presented to the user. When no further user input is received, the optimization recommendation generation method 900 may end.

Figure 10:
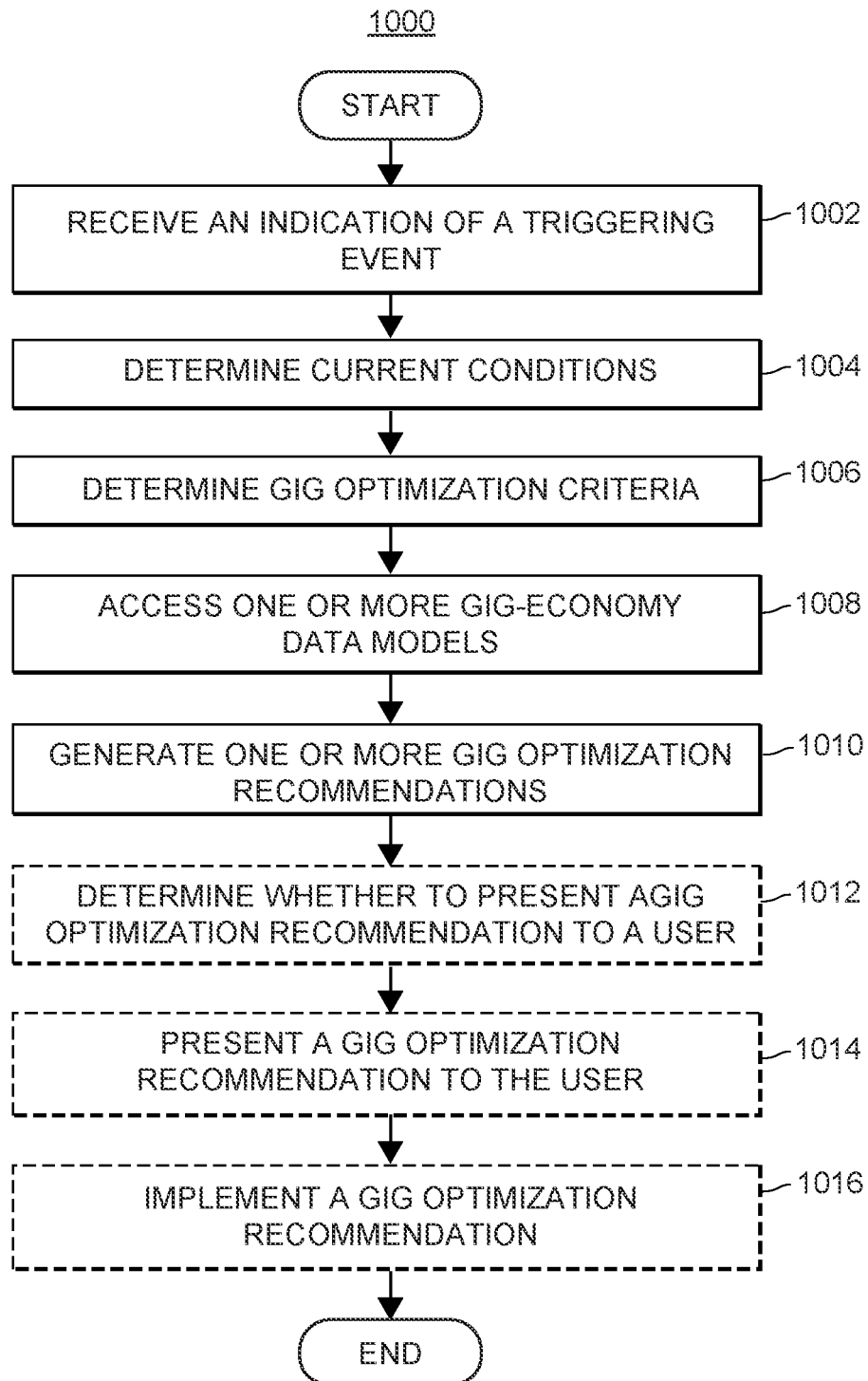
FIG. 10 illustrates a flow diagram of an exemplary real-time optimization recommendation generation method.

FIG. 10 illustrates a flow diagram of an exemplary real-time optimization recommendation generation method 1000 for providing gig-economy workers with gig optimization recommendations based upon gig-economy data models and current conditions. The gig optimization recommendations may be generated in a manner similar to the gig optimization recommendations discussed above. However, using current conditions has the advantages of providing immediately actionable recommendations and of reducing or eliminating the need for user input.

By using gig-economy data models generated for a plurality of gig-economy platforms, such as on-demand services network platforms 70, the optimization recommendations may also enable gig-economy workers to shift their efforts between different categories or types of gig-economy work in response to current demand. The gig optimization recommendations may be generated by one or more servers 40 implementing executable instructions stored as computer-readable instructions stored in the one or more program memories 60.

In order to obtain current condition data, the one or more servers 40 may communicate with a plurality of front-end components 2 or other back-end components 4 via the network 3. In alternative embodiments, similar computer-implemented methods of generating gig optimization recommendations may be performed, which may include additional, alternative, or fewer aspects to those described below.

The exemplary real-time optimization recommendation generation method 1000 may begin with receiving an indication of a triggering event to generate gig optimization recommendations (block 1002). In response to such indication, relevant current conditions may be determined (block 1004), and gig optimization criteria may be determined (block 1006). Based upon the gig optimization criteria and current conditions, one or more relevant gig-economy data models may be accessed (block 1008) and used to generate one or more gig optimization recommendations for the user (block 1010).

In some embodiments, the one or more gig optimization recommendations may then be presented to the user (block 1014). In other embodiments, the one or more gig optimization recommendations may be evaluated to determine whether present any of the gig optimization recommendations to the user (block 1012), following which one or more gig optimization recommendations may be presented to the user (block 1014) in some instances. In further embodiments, one or more of the gig optimization recommendations may be implemented automatically (block 1016), with or without user verification or notification.

At block 1002, the server 40 may receive an indication of a triggering event to cause the generation of gig optimization recommendations. The indication of the triggering event may be received from a mobile computing device 110 (e.g., an on-board computer 11, a user mobile device 12, or a wearable computing device 13) associated with a user (e.g., a gig-economy worker 17). In some embodiments, the indication of the triggering event may be received from a gig-economy platform, such as a server of an on-demand services network platform 70. In further embodiments, the server 40 may automatically generate the indication of the triggering event based upon information available at the server 40 (e.g., passage of a predicted time duration associated with an expected required to complete a current gig) or based upon information received from other data sources via the network 3.

The triggering event may be an event or action indicating the user is currently available to accept a new gig or will be available in a short time. Thus, the triggering event may include any of the following: the user signing in to a gig-economy application on the mobile computing device 110, the user status changing from unavailable to available in a gig-economy application, the completion of a gig, or the user location being within a threshold distance of a completion location of a gig. Thus, the triggering event may be associated with a time at which a user could reasonable taken actions to follow a recommendation, thereby providing real-time guidance to the user at an appropriate time.

At block 1004, the server 40 may next determine current conditions related to gig-economy work. In some embodiments, the current conditions may be determined based upon data received from the user via the network 3, as well as additional data from other data sources. Such current condition data may include the current location of the user, an expected completion location of the user upon completion of a current gig, user schedule data (e.g., upcoming schedule blocks or associated locations), current vehicle fuel levels, or other user-specific data that may affect the gig optimization recommendations for the user at a particular time. Such additional data from other data sources may include, for example, demand data from customer computing devices 20, demand or result data from connected home devices 22, demand or supply data from autonomous devices 30, current gig-economy market data from one or more gig-economy platforms (e.g., supply or demand data from on-demand services network platforms 70), external condition data (e.g., weather conditions, traffic conditions, or data regarding local events), or other similar data not specific to the user.

In addition, general condition data not specific to the current time may be determined, such as general user preferences or skills possessed by the user. In some embodiments, the server 40 may generate values of some current conditions from received current condition data, such as by calculating a distance of the user from a destination location (e.g., a home or worksite location), a time spent performing gig-economy work, or a time remaining until a scheduled event (e.g., a time the user has scheduled as being unavailable for gig-economy work).

At block 1006, the server 40 may determine optimization criteria for generating gig optimization recommendations. Such optimization criteria may be based upon general user preferences (or general default preferences, such as net profit optimization). In some embodiments, the optimization criteria may be based in whole or part upon the current conditions, such as by determining optimization criteria indicating preference for completing a gig near a location or by a target time. Some optimization criteria may be based upon a combination of current condition data and general condition data, such as a user preference to avoid certain routes or areas during inclement weather. In some embodiments, optimization criteria may be associated with current risk levels, such as by adjusting net profit to account for increased risk during high-risk times or at high-risk locations (e.g., busy tourist areas during inclement weather). Thus, the cost of additional risk associated with gig-economy work may be included in the optimization process, either as an indirect cost (e.g., an expected value of potential losses) or as a direct cost (e.g., a cost for increased or short-term insurance coverage to protect against potential losses).

At block 1008, the server 40 may select and access one or more gig-economy data models to use in generating gig optimization recommendations based upon the optimization criteria and the current condition data. The gig-economy data models may be accessed by the server 40 from the database 46. This may include matching the optimization criteria with model specifications of previously trained models stored in a database 46 to select one or more gig-economy data models that may be relevant to optimization. In some embodiments, as discussed above, gig-economy data models meeting only some of the gig optimization criteria may also be selected for use in generating gig optimization recommendations or comparison points concerning adjusting the gig optimization criteria.

At block 1010, the server 40 may apply the current condition data to the one or more gig-economy data models to generate one or more gig optimization recommendations. In some embodiments, the server 40 may additionally apply part of the optimization criteria to the gig-economy data models to generate the gig optimization recommendations. The gig optimization recommendations may be generated by optimizing values of gig metrics generated by the one or more gig-economy data models based upon input data, which may be fixed (e.g., condition data) or variable (e.g., locations within a geographic area or type of gig-economy work). The optimized values of the gig metrics may then be used to determine recommendations to the user in order to optimize the relevant gig metrics.

In some embodiments, gig optimization recommendations may be based upon an optimization score calculated as a weighted combination of a plurality of gig metrics in order to account for counteracting factors. In alternative embodiments, the server 40 may generate one gig optimization recommendation based upon the current conditions or may generate a plurality of gig optimization recommendations based upon the current conditions.

At block 1012, in some embodiments, the server 40 may determine whether to present one or more of the gig optimization recommendations to the user. This may include determining a continuation estimate indicating a comparable gig metric or optimization score based upon a continuation of current gig-economy activities by the user (e.g., assuming the same type of gig at the current location of the user). The one or more gig optimization recommendations may be compared to the continuation estimate to determine whether at least one of the gig optimization recommendations improves upon the continuation estimate by a threshold amount. Such threshold amount may be a zero or non-zero level of improvement, which may be expressed in terms of various metrics, such as profit, time, risk, or rated quality.

In other embodiments, the server 40 may always present at least one gig optimization recommendation to the user following receipt of the indication of the triggering event. Such embodiments may be implemented, for example, when a user has selected to receive such recommendations in order to obtain the most current data for making decisions.

At block 1014, in some embodiments, the server 40 may cause a representation of at least one of the gig optimization recommendations to be presented to the user via a mobile computing device 110. The representation of the gig optimization recommendation may include a recommended action (e.g., changing location or gig-economy platform), which may be presented to the user as an alert or push notification. In some embodiments, the gig optimization recommendation may further include an indication of a reason for such change (e.g., a predicted increase in profit or decrease in risk), one or more alternative recommendations, or a feedback option to allow the user to indicate acceptance or rejection of the gig optimization recommendation. Such user feedback may be used in future optimization recommendations to improve the quality of the gig optimization recommendations for the user.

At block 1016, in some embodiments, the server 40 may cause the gig optimization recommendation to be implemented. This may include causing the mobile computing device 110 to change the user's availability on one or more gig-economy platforms (e.g., by switching between applications associated with such platforms). This may similarly include communicating with one or more computing devices to establish the conditions for optimization of gig-economy work. For example, the server 40 may communicate with one or more connected home devices 22 or autonomous devices 30 to indicate availability for gig-economy work associated with such devices. In some embodiments, the server 40 may cause one or more autonomous devices 30 to travel to a location for gig-economy work associated with the user.

After presentation or implementation of a gig optimization recommendation, the real-time optimization recommendation generation method 1000 may end until another triggering event occurs. In some embodiments, a reset period or delay may be applied to ensure a minimum time passes between successive gig optimization recommendations.

Exemplary Transferable Tokens for Gig-Economy Risk Assessment

Risks related to performance of gig-economy work correlate across or relate to various categories of gig-economy activities, behaviors and work, as well as insurance, banking, employment, security, etc., in predictable ways. Thus, low-risk behavior in performance of one type of gig-economy activity typically indicates low-risk behavior in performance of gig-economy activities, behaviors and work, including other types of gig-economy activities and work, insurance, banking, employment, security, etc. In order to increase accuracy in risk assessment for gig-economy workers and provide credit, insurance, banking, employment, etc. with lower risks, transferable tokens may be generated for gig-economy workers and used in generation of gig insurance policies, non-gig insurance policies, banking, employment, security, etc. for such gig-economy workers.

Figure 11A:
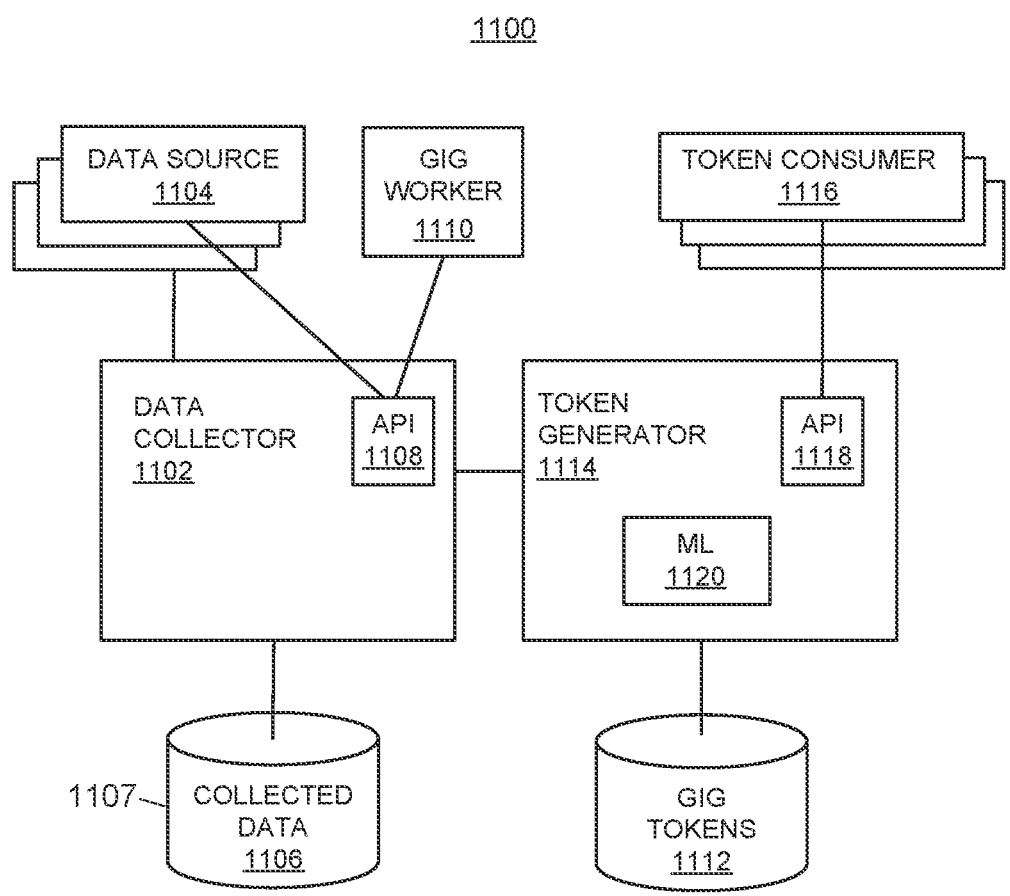
FIG. 11A illustrates a block diagram of an exemplary computer system for generating and applying transferable token generation.

A. Exemplary Systems for Generating and Applying Transferable Tokens for Gig-Economy Risk Assessment FIG. 11A illustrates a block diagram of an exemplary computer system 1100 to generate and utilize transferable tokens 1112 for applying information regarding risk across various types of gig and non-gig economy activities, behaviors, and work. To gather information, the exemplary system 1100 includes any number and/or type of example data collectors, one of which is designated at reference numeral 1102. The data collector 1102 accesses, collects, receives, or otherwise obtains data 1106 from any number and/or type of data sources, one of which is designated at reference numeral 1104, and stores the data 1106 in a collected data database 1107. The data sources 1104 provide or make available data 1106 related to gig and non-gig activities, behaviors, work, etc. In some examples, the data collector 1102 collects, accesses, or queries data 1106 from the one or more data sources 1104. In other examples, the data sources 1104 actively provide data 1106 (e.g., periodically or as changed) to the data collector 1102 via, for example, an application programming interface (API) 1108.

In some examples, a gig worker 1110 (e.g., a gig-economy worker 17 of FIGS. 1A-B) provides the data collector 1102 with permissions (e.g., usernames, passwords, PINs, etc.) to obtain the data 1106 from the data sources 1104. In some examples, the data collector 1102 scrapes web pages for the data. In some examples, the gig workers 1110 may provide data 1106 related to themselves (which data may be gig-related or non-gig related) via the API 1108 and/or another API (not shown).

Example data 1106 may include or relate to one or more of the following non-limiting examples: time spent performing gig-related activities, behaviors and work; miles driven for gig-related activities; amount of work per period of time; number of weeks spent performing gig-related activities and work—continuous and/or total; amount of continuous gig-related activities and work; type(s) of gig-related activities and work; payments, payment types and ratios (e.g., credit card, debit card, or online payment platforms); customer ratings or gig-related ratings; acceptance rate of gig-related activities and work; vehicle type, age and mileage of vehicle; traditional credit information—credit score, marital status, length of employment, etc.; membership in other reward programs; number of financial accounts; strength of passwords; assets; contracts, mortgages, debt, bills, etc.; telematics data; driving behavior; motor vehicle tickets; accident record; and number and/or type of other transactions.

To generate transferable tokens 1112, the system 1100 includes an example token generator 1114. The token generator 1114 generates one or more transferable tokens 1112 associated with the gig worker 1110 based upon the data 1106 collected for the gig worker 1110. The tokens 1112 are transferable in that they can, at least in some embodiments, be transferred or used by third parties or other entities on behalf of the gig worker 1110 to assist in the acquisition of further gig-related activities and work, obtain financial services, insurance, etc. For example, a transferable token 1112 associated with a gig worker 1110 indicating a good reputation for gig work performed through a first gig-economy platform may be transferable to indicate a good general reputation for the gig worker 1110 on a second gig-economy platform, thereby providing useful information to potential customers on the second gig-economy platform. The transferable tokens 1112 may include at least one indication of a general risk level or risk preference profile for the gig worker 1110 based upon the collected data 1106.

The token generator 1114 may generate the transferable token 1112 using one or more risk models associated with gig performance. For example, each of a plurality of data points (e.g., gig records or event records associated with gigs) of the data 1106 may be applied to a risk model to determine risk levels associated with particular gigs or events.

Example transferable tokens 1112 may include data or entries that represents, for example: reputation as a gig worker; missing data or experience that could qualify the gig worker for a higher score or rating; financial trust and level of trust; transaction frequency; methods related to financial institutions; insurance policies and coverages; personal and business references; personal and business references; credit sources, amounts and payment history; recent life events such as new job, move, marital status change, birth of child, etc.

The risk information contained in the transferable tokens 1112 may be used by one or more third parties, gig-economy customers, or other token consumers, one of which is designated at reference numeral 1116, to assess reputation, quality, or risk for the gig-economy worker 1110. The transferable tokens 1112 may be provided to the token consumers 1116 and/or accessed by the token consumer 1116 via an API 1118. Example token consumers 1116 include, but are not limited to, gig-related service companies (e.g., gig-economy platform operators), those seeking gig workers (e.g., gig-economy customers), those seeking non-gig workers (e.g., traditional employers), financial institutions, insurance institutions, etc. In some embodiments, the risk levels or risk scores may be used to generate a risk modifier score indicating the gig-economy worker's general level of risk relative to a baseline (e.g., an average risk score for gig-economy workers in an area).

In some embodiments, such transferable tokens 1112 may be generated and stored as or with a user profile (e.g., an average mood profile or commercial driving profile). For example, a risk modifier score may be stored as an entry in a user profile associated with the gig worker 1110.

The token generator 1114 may utilize, apply, or implement a machine-learning (ML) module 1120, such as the machine-learning module 54 (FIG. 1A), to adaptively learn to associate risk with gig- and non-gig-related activities. Generally, machine-learning may involve identifying and recognizing patterns in existing data 1106 in order to facilitate making risk predictions for subsequent gig and non-gig activities, behaviors and work. The ML module 1120 may be created using unsupervised and/or supervised machine-learning.

The ML module 1120 processes gig and non-gig data 1106 stored in the collected data database 1107 (e.g., for a first type of gig) to determine (e.g., estimate, generate, calculate, etc.) risks associated with other gig-related activities, work and behaviors (e.g., for a second type of gig). The ML module 1120 may utilize deep learning algorithms that are primarily focused on, for example, pattern recognition, and may be trained by processing example data. The ML module 1120 may include Bayesian program learning (BPL), voice recognition and synthesis, image or object recognition, optical character recognition, and/or natural language processing—either individually or in combination. The ML module 1120 may also include natural language processing, semantic analysis, and/or automatic reasoning. The ML module 1120 and/or the token generator 1114 may be implemented by the server 40 (FIG. 1A) as a set of logical instructions executed as machine- or computer-readable instructions to implement the token generator 1114 and/or the ML module 1120.

In some examples, the ML module 1120 is at least partially or initially trained using collected data 1106 for a gig worker 1110 when they were known not to be engaged in gig-economy activities (e.g., as indicated by the gig worker 1110) as being unrelated to gig-economy work, such as data 1106 provided by the gig-economy worker regarding driving prior to starting work as a gig worker 1110. Subsequent gig and non-gig activities could be used to further train the ML model 1120 and/or to test the ML model 1120.

In some examples, the ML model 1120 of the token generator 1114 is additionally trained using collected data 1106 for other gig-economy workers. Such data 1106 may be applicable, for example, when there are a number of gig-economy worker in a same geographic area that likely have similar risks, gig driving patterns, etc. Such data 1106 may be used, for example, to determine an initial gig-related risk, which may be further refined using data 1106 specific to a particular gig-economy worker.

While an exemplary system 1100 to generate and utilize transferable tokens 1112 for applying information regarding risk across various types of gig and non-gig economy activities, behaviors, and work is illustrated in FIG. 11A, one or more of the elements, processes and/or devices illustrated in FIG. 11A may be combined, divided, re-arranged, omitted, eliminated and/or implemented in any other way. Further, the example data collector 1102, the example token generator 1114, the example ML module 1120 and/or, more generally, the exemplary system 1100 may be implemented by hardware, software, firmware and/or any combination of hardware, software and/or firmware.

Thus, for example, any of the data collector 1102, the token generator 1114, the ML module 1120 and/or, more generally, the system 1100 could be implemented by one or more analog or digital circuits, logic circuits, programmable processors such one or more of the processor 62 (FIG. 1A), programmable controller(, graphics processing units (GPUs), digital signal processors (DSPs), application specific integrated circuits (ASICs), programmable logic devices (PLDs), field programmable gate arrays (FPGAs), and/or field programmable logic devices (FPLDs). For example, the data collector 1102, the token generator 1114, the ML module 1120 and/or, more generally, the system 110 can be implemented as one or more modules of software, computer- or machine-readable instructions executed on the processor 62. Further, the exemplary system 1100 may include one or more elements, processes and/or devices in addition to, or instead of, those illustrated in FIG. 11A, and/or may include more than one of any or all of the illustrated elements, processes and devices.

Figure 11B:
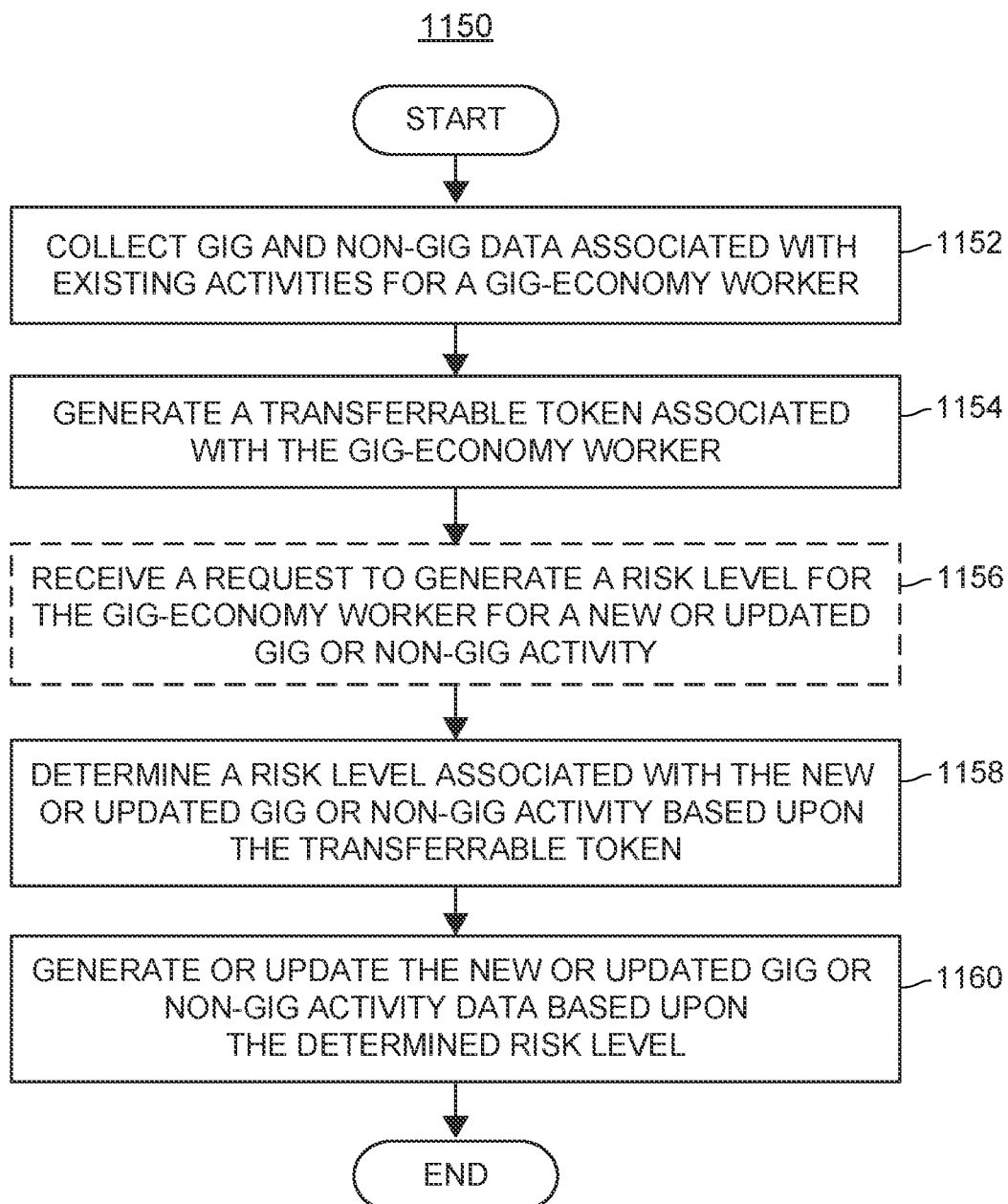
FIG. 11B illustrates a flow diagram of an exemplary transferable token generation and application method.

B. Exemplary Methods for Generating and Applying Transferable Tokens for Gig-Economy Risk Assessment FIG. 11B illustrates a flow diagram of an exemplary computer-implemented method 1150 to generate and utilize transferable tokens 1112 for applying information regarding risk across various types of gig and non-gig economy activities, behaviors, and work. The method 1150 may be implemented as one or more processes, methods, logic, software, or computer-readable or machine-readable instructions. The processes, methods, logic, software and instructions may be one or more executable modules, executable programs and/or portions of an executable program for execution by a processor such as the processor 62 of the server 40 (FIG. 1A). The method 1150 may be embodied in software or instructions stored on a non-transitory computer- or machine-readable storage device, storage medium and/or storage disk 60 associated with the processor 62 in which information is stored for any non-transitory duration (e.g., for extended time periods, permanently, for brief instances, for temporarily buffering, and/or for caching of the information).

Although the exemplary program 1150 of FIG. 11B is described with reference to the system 1100, other methods of generating and utilizing transferable tokens 1112 for applying information regarding risk, reputation, or quality across various types of gig and non-gig economy activities, behaviors, and work may alternatively be implemented based upon the description herein. For example, the order of execution of the blocks may be changed, and/or some of the blocks described may be changed, eliminated, or combined. Additionally, or alternatively, any or all of the blocks may be implemented by one or more hardware circuits or modules structured to perform the corresponding operations, with or without executing software or instructions.

The exemplary computer-implemented method 1150 of FIG. 11B for generating and utilizing transferable tokens 1112 for applying information regarding risk across various types of gig and non-gig economy activities, behaviors, and work begins with, for example, the data collector 1102 (e.g., the processor 62 of the server 40) waiting to receive, collect or otherwise obtain data 1106 representative of current or past gig and non-gig activities and work (e.g., a first type of gig such as an on-demand transportation service gigs) of the gig worker 1110, and possibly other gig workers 1110 (e.g., the additional gig-economy workers 16 of FIGS. 1A-B) (block 1152). The data 1106 may be collected as gigs are performed and/or may be collected based upon historical data 1106 regarding a plurality of completed gigs.

In some embodiments, the data 1106 may indicate a beginning of a new or updated gig or non-gig related interaction between the gig worker 1110 and a third party, such as, a customer (e.g., one of the gig-economy customers 21 of FIGS. 1A-B), an insurance entity, a banking entity, etc. The data 1106 may indicate a location at which the gig worker 1110 activated a gig-economy platform application on a mobile device (e.g., the mobile computing device 110 of FIG. 2), a location at which the gig worker 1110 accepted a gig via a mobile device, locations to which the gig worker 1110 traveled, etc. The processor 62 may thus receive data 1106 representative of one or more movements of the gig worker 1110 (block 1152).

Once the data 1106 is collected, accessed, or otherwise received the token generator 1114 (e.g., operating on the server 40) may generate one or more transferable tokens 1112 associated with the gig worker 1110 based upon the gig and non-gig data 1106, which may relate to a current or first type of gig and/or non-gig activities and work (block 1154). The transferable tokens 1112 may include at least one indication of a risk level or risk preference profile of the gig worker 1110 based upon the data 1106, such as the gig metrics associated with gigs performed by the gig worker 1110, detected gig-related behaviors (e.g., driving behavior) of the gig worker 1110 during performance of the gigs.

As described above, the data 1106 may, additionally and/or alternatively, include data 1106 associated with the gig worker 1110 that is not gig related. In further embodiments, the transferable tokens 1112 may include indications of quality or reputation, such as a transferable rating associated with the gig worker 1110 based upon performance of one or more types of gig-economy work, which may be provided as an indicator of likely performance of other types of gig-economy work.

The transferable tokens 1112 may be generated using one or more risk models associated with gig and non-gig performance, which may be the trained machine learning models of the ML module 1120. For example, each of a plurality of data points (e.g., gig records or event records associated with gigs and non-gig activities) of the data 1106 may be applied to a risk model to determine risk levels associated with particular gigs and non-gig activities (e.g., a second type of gig). The risk levels may be used to generate one or more risk scores for the gig worker 1110, in some embodiments. In further embodiments, the risk levels or risk scores may be used to generate a risk modifier score indicating the gig-economy worker's general level of risk relative to a baseline (e.g., an average risk score for gig-economy workers in an area).

In some embodiments, such transferable tokens 1112 may be generated and stored as or with a user profile (e.g., an average mood profile or commercial driving profile). For example, a risk modifier score may be stored as an entry in a user profile associated with the gig-economy worker 1110. Such a user profile may include additional relevant data relating to the gig worker 1110, such as the gig-related and non-gig-related information discussed elsewhere herein with respect to gig-economy workers.

In some embodiments, the token generator 1112 (e.g., the server 40) may receive from the gig worker 1110 or a third party (e.g., a person, organization, insurer, banker, school, or employer) associated with the gig worker 1110 a request for risk, quality, or reputation information for the gig worker 1110 (e.g., their transferable token 1112 or information based upon the transferable token 1112). The transferable token 1112 or information based upon the transferable token 1112 enables the third party to determine one or more aspects, terms, or characteristics of gig and non-gig activities, such as a new or updated insurance policy, loan approval, savings rate, admission, gig work, etc. For example, the reputation of the gig worker 1110 on other types of gigs may be applied to a new type of gig distinct from a past or current types of gigs. For example, a current type of gig may be on-demand transportation services, while the new or updated type of gig may be package delivery services.

Although the risks associated with the two types of gigs may be different, the information regarding risk levels may be applicable to both. Thus, the server 40 may determine a risk level associated with the updated or new type of gig(s) based in part upon the risk levels associated with the current type of gig as indicated by the transferable token 1112 (block 1158).

In some embodiments, this may include using one or more risk models such as the ML module 1120 to generate risk levels based upon condition data, gig-economy worker profile data, or other available data 1106 regarding performance of gigs of the new or updated types of gigs by the gig worker 1110, then adjusting such risk levels by a factor determined from the transferable token 1112. In some such embodiments, a risk modifier may be directly applied to the calculated risks associated with the new or updated type of gig to determine adjusted risk levels. In some examples, the transferable token 1112 itself is provided to a requesting third party to make risk assessments or other determinations based upon their own criteria in addition to and/or alternative to any risk score included in the transferable token 1112.

Based upon the adjusted risk levels determined using the transferable token 1114, the server 40 may then generate or update gig or non-gig activities (block 1160). For example, a gig insurance policy covering at least the new or updated gig or non-gig activities may be updated or generated. In some embodiments, indications or options regarding the gig insurance policy may be presented to the gig worker 1110 via a display 202 of a mobile computing device 110 (FIG. 2). In further embodiments, the generated or updated data may include data regarding a prediction relating to the gig worker 1110 in a new activity, such as performing a new type of gig-economy work with high quality or timely repaying a new loan.

The transferable token generation and application method 1150 may then end. In some embodiments, further data 1106 may be collected regarding performance of new or updated gig and non-gig activities used to refine the risk levels indicated in the transferable token 1112, which may be applied to further types of gigs.

Exemplary Targeted Recommendation Generation for Gigs

During the performance of gig-economy work, gig-economy workers or customers may benefit from certain additional services, products, or offerings by other parties. However, the variety of additional services, products, or offerings may be overwhelming. Therefore, targeted recommendations may be generated and presented to gig-economy workers or customers based upon data associated with such gig-economy workers or customers to improve the value of such recommendations.

Figure 12A:
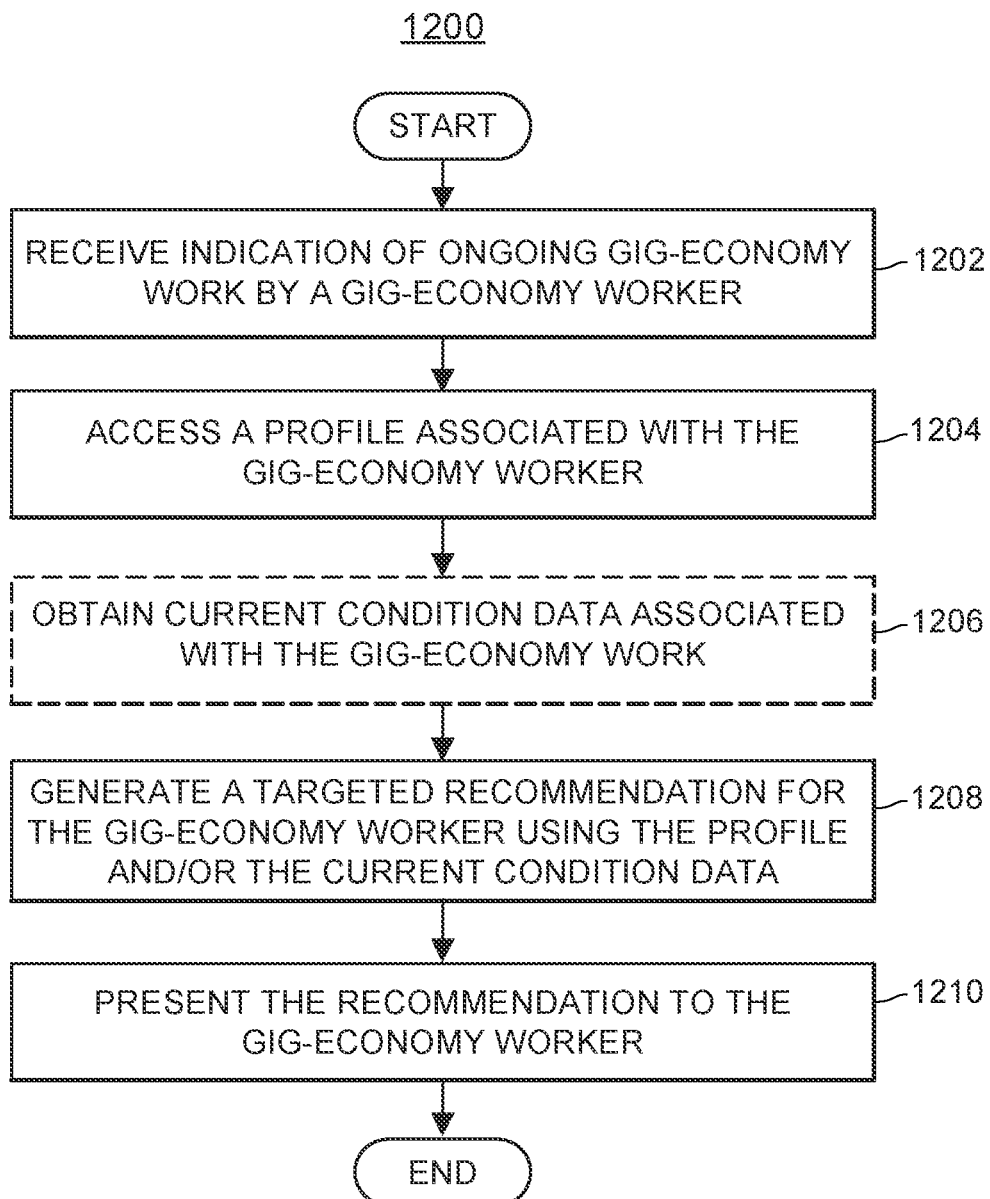
FIG. 12A illustrates a flow diagram of an exemplary targeted recommendation method.

FIG. 12A illustrates a flow diagram of an exemplary targeted recommendation method 1200 for generating and presenting recommendations for a particular gig-economy worker. Although the method 1200 describes generating and presenting such recommendations to a gig-economy worker, it should be understood that a similar method may be used to generate and present recommendations to customers within the gig economy. The method 1200 may be performed in whole or part by the processors 62 of one or more servers 40 in communication within one or more mobile computing devices 110 or other computing devices. In further embodiments, similar methods may be implemented including additional, fewer, or alternative aspects.

The targeted recommendation method 1200 may begin with the server 40 receiving an indication of ongoing gig-economy work by a gig-economy worker (block 1202). The indication may be associated with performance of a particular gig or may simply indicate availability for gig-economy work. The indication may be generated by an application on a user mobile device 12 or other mobile computing device 110 associated with the gig-economy worker 17 upon occurrence of an event (e.g., acceptance of a gig, completion of a gig, or indication of availability on a gig-economy platform application) and communicated to the server 40 via the network 3. Upon receiving the indication, the server 40 may access a profile associated with the gig-economy worker (block 1204). The profile may include information related to past gigs performed, gig data related to such gigs, previous recommendations presented to the gig-economy worker, preferences of the gig-economy worker (e.g., risk preference, preferred work schedule, or loyalty rewards program memberships), or other relevant data associated with the gig-economy worker. The profile may be accessed from a database 46 associated with the server 40.

In some embodiments, the server 40 may additionally obtain current condition data associated with the gig-economy work (block 1206). Such current condition data may include current conditions relating to a current or expected future location of the gig-economy worker.

The server 40 then generates one or more targeted recommendations for the gig-economy worker based upon the available information (block 1208), which may include the profile and/or the current condition data. In some embodiments, the recommendations may be generated using one or more recommendation models associated with gig-economy work, which may be trained machine learning models similar to those discussed elsewhere herein. The one or more recommendations generated may include recommendations regarding gig insurance policies, fuel, food, coffee, tools, equipment, supplies, or similar products or services.

The recommendations may include discounts or special offers for the gig-economy worker. For example, the server 40 may determine a vehicle 10 is running low on fuel based upon current condition data received from an on-board computer 11A and generate a recommendation to refuel at a nearby gas station, which may further include a promotional code to receive a discount on a car wash. In some embodiments, the one or more recommendations may be generated by or based upon data provided by additional participants 51 (e.g., local businesses or aggregated advertising platforms) via additional participant computing devices 50 in communication with the server 40 via the network 3.

After the one or more recommendations have been generated for the gig-economy worker, the server 40 may cause the recommendations to be presented to the gig-economy worker (block 1210). Causing the one or more recommendations to be presented may include sending data containing such recommendations to a mobile computing device 110 associated with the gig-economy worker to cause the presentation of the one or more recommendations via a display 202. In some embodiments, the recommendations may be displayed together with one or more options to obtain further information or to implement a recommendation (e.g., by purchasing a gig insurance policy or obtaining directions to a location). The targeted recommendation method 1200 may then end.

Figure 12B:
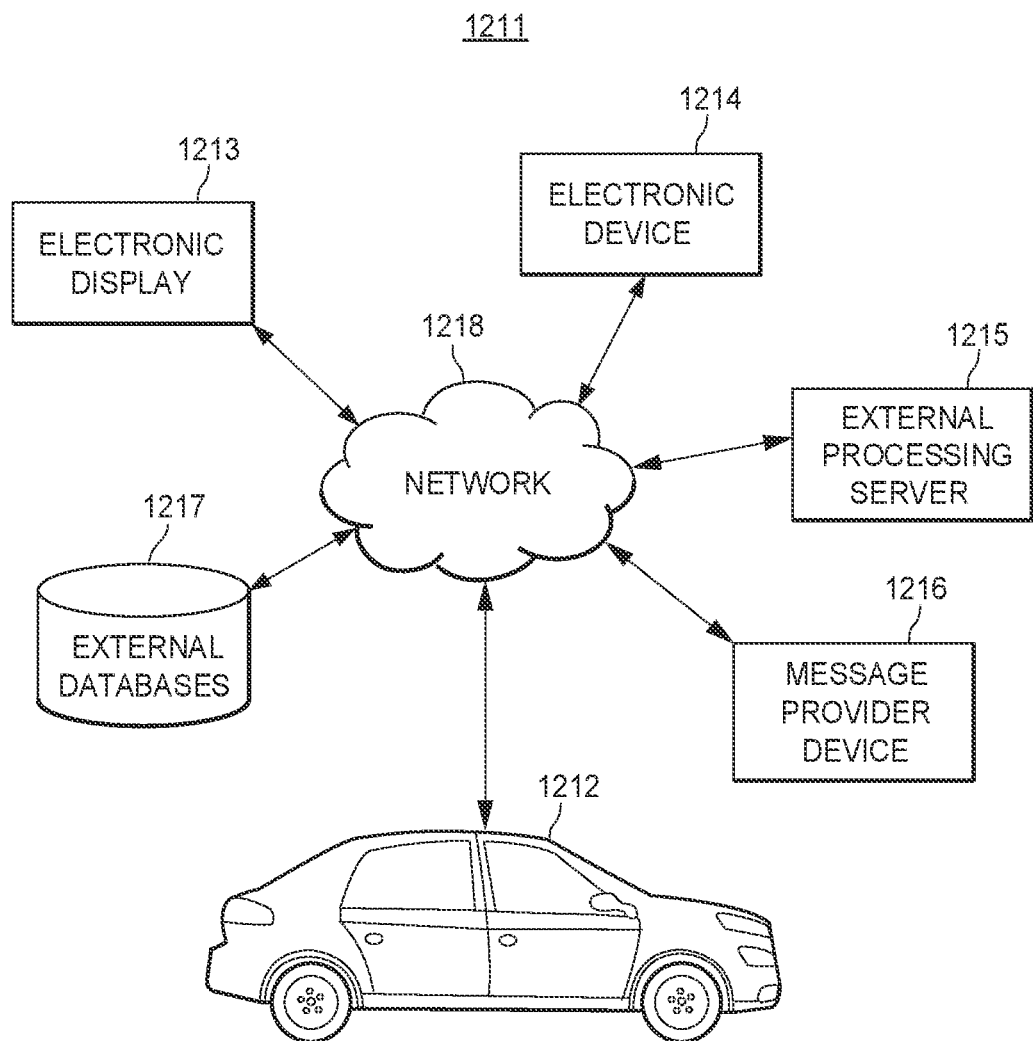
FIG. 12B illustrates a block diagram of an exemplary computer system for facilitating targeted recommendation display for transportation network trips.

A. Examplary Systems and Related Functionality for Facilitating Targeted Recommendation Display for Transportation Network Trips FIG. 12B illustrates an exemplary computer system 1211 for facilitating targeted recommendation display for transportation network trips. The exemplary system 1211 may include a vehicle 1212, an electronic display 1213, an electronic device 1214, an external processing server 1215, a message provider device 1216, external databases 1217, and a network 1218. While illustrated in FIG. 12B as a single external database, in some embodiments the external databases 1217 includes two or more external databases. The network 1218 may be a computer network of an insurance provider (e.g., provided or used by the insurance provider or communications over which the insurance provider otherwise controls or facilitates).

Figure 12C:
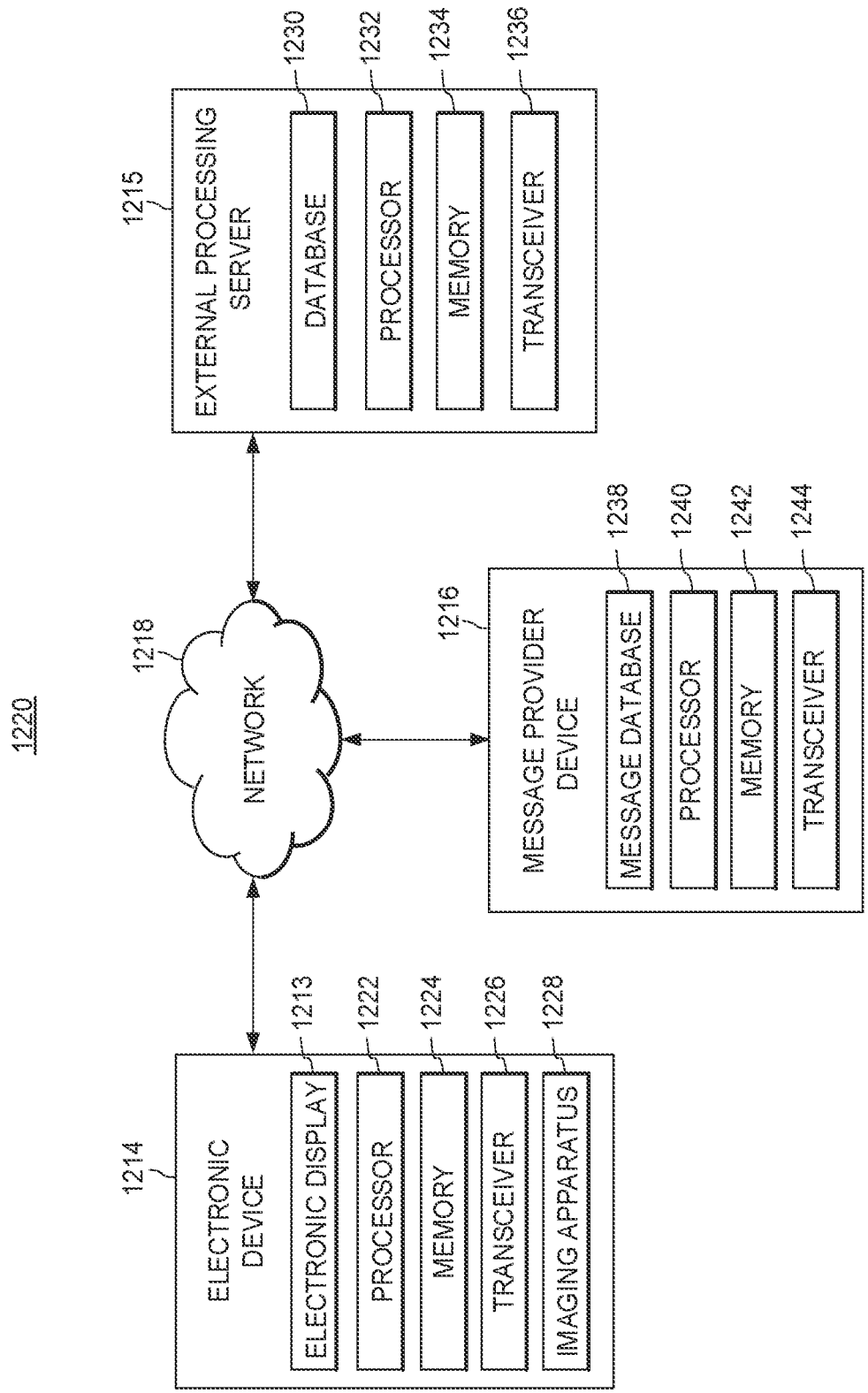
FIG. 12C illustrates a block diagram of another exemplary computer system for facilitating targeted recommendation display for transportation network trips.

In reference to the exemplary system 1220 of FIG. 12C, the electronic device 1214 may include the electronic display 1213, a processor 1222, a memory 1224, a transceiver 1226, and an imaging sensor 1228. While referred to herein as a "processor" and a "memory," in some embodiments the processor 1222 includes two or more processors and the memory 1224 includes two or more memories. The processor 1222 may be configured to analyze both still image data and video data (e.g., video data received by the transceiver 1226) and analyze aspects of the still image data and/or video data. The memory 1224 may store computer-executable instructions, which may be executed by the processor 1222.

It should be understood that the electronic display 1213 may be either an external, standalone device or an internal component of the electronic device 1214. In other words, in certain embodiments, the electronic display 1213 may be a standalone entity disposed within a vehicle (e.g., vehicle 1212). In that case, the electronic display 1213 may have a processor, memory, imaging assembly, transceiver, etc., and be configured to receive a targeted recommendation from the electronic device 1214, external processing server 1215, or any other suitable transmitter (e.g., external databases 1217).

The imaging sensor 1228 may include, for example, an image sensor (e.g., a camera, a video camera), and/or a proximity sensor. As such, the imaging sensor 1228 may be configured to capture still images, video footage, proximity information (e.g., indicative of distances to/from imaging apparatus). However, it should be understood that the imaging sensor 1228 is not limited to the sensors disclosed herein. Additionally, the electronic device 1214 may be configured to receive communications from the external processing server 1215 and/or other suitable transmitters (e.g., external databases 1217) in response to transmitting captured data and/or before, during, or after displaying a targeted message.

The external processing server 1215 may include a database 1230, a processor 1232, a memory 1234, and a transceiver 1236. While referred to herein as a "processor" and a "memory," in some embodiments the processor 1232 includes two or more processors and the memory 1234 includes two or more memories. The processor 1232 may be configured to process both still image data and video data (e.g., video data received from a prospective client) and analyze aspects of the still image data and/or video data. The memory 1234 may store computer-executable instructions, which may be executed by the processor 1232. The database 1230 may include gig-economy worker profiles.

The gig-economy worker profiles may correspond to a set of information associating a gig-economy worker with certain transportation network trip characteristics and/or priorities. For example, a gig-economy worker profile may indicate that a particular gig-economy worker (e.g., driving vehicle 1212) may consistently drive in low population density areas, and may further drive in those areas late at night. As further discussed herein, based upon the gig-economy worker profile, the external processing server 1215 may determine targeted recommendations for display on the electronic display 1213. The gig-economy worker profiles may also correspond with insured user profiles/accounts, insurance policies, or other user profiles, accounts, policies, etc.

Further, the gig-economy worker profile may include relevant data associated with a gig-economy worker indicated in the gig-economy worker profile. For example, if a gig-economy worker profile includes information associated with an insurance policy listing a gig-economy worker as the insured, the insurance policy may list the gig-economy worker's name, age, gender, etc. Moreover, and as discussed further herein, the relevant data may include multiple profile features associated with each gig-economy worker profile. These profile features may, for example and as discussed further herein, facilitate targeted recommendation display within a vehicle 1212 by allowing the external processing server 1215 to develop a broader knowledge base with which to determine the targeted recommendations for display.

The exemplary computer system 1220 further includes a message provider device 1216. The message provider device 1216 includes a message database 1238, a processor 1240, a memory 1242, and a transceiver 1244. While referred to herein as a "processor" and a "memory," in some embodiments the processor 1240 includes two or more processors and the memory 1242 includes two or more memories. The message database 1238 may include a set of recommendations for display, for example, on the electronic display 1213 disposed within the vehicle 1212 for viewing by a gig-economy worker and/or a customer of the gig-economy worker.

The message provider device 1216 may be connected to each of the electronic device 1214 and the external processing server 1215 via the network 1218, such that all devices (1214, 1215, and 1216) may communicate to each other via their respective transceivers (1226, 1236, and 1244). For example, the external processing server 1215 may receive updated gig-economy worker profile information from the electronic device 1214. The external processing server 1215 may store this received information in its database 1230 and/or its memory 1234. Thus, and as discussed further herein, the external processing server 1215 may be configured to process, analyze, or otherwise interpret data captured by and/or received from the electronic device 1214.

Moreover, the message provider device 1216 may transmit targeted recommendation data to the electronic device 1214 and/or external processing server 1215 through the network 1218. The electronic device 1214 and/or external processing server 1215 may receive the targeted recommendation and store it in memory 1224, 1234 and/or further transmit the targeted message to the electronic device 1214 and/or electronic display 1213 for display. It will be appreciated that the external processing server 1215 and/or message provider device 1216 may be a server and/or device provided by or used by an insurance provider, or use of which the insurance provider otherwise controls or facilitates.

In some embodiments, the network 1218 may be or may include a network such as the Internet and/or any other type of suitable network (e.g., a local area network (LAN), a metropolitan area network (MAN), a wide area network (WAN), a mobile network, a wired or wireless network, a private network, a virtual private network, etc.). The network 1218 may also or alternatively be or include one or more cellular networks such as code division multiple access (CDMA) network, GSM (Global System for Mobile Communications) network, WiMAX (Worldwide Interoperability for Microwave Access) network, Long Term Evolution (LTE) network, etc.

As further described below, the exemplary systems (1211, 1220) facilitate targeted recommendation display within automobiles, and allow, among other advantages, convenient, incentivized recommendations to gig-economy workers and/or their customers to increase revenue for gig-economy workers and customers alike. The recommendations displayed on the systems described herein are more readable than those of conventional digital displays because the recommendations are displayed within vehicles which places the recommendations closer to gig-economy workers and/or customers than the conventional display devices (e.g., billboards).

The recommendations are also more relevant than the static, general messages on conventional display devices because they are dynamically updated and targeted for the gig-economy worker and/or customer, and can be based upon travel routes extracted from the gig-economy applications. Moreover, the systems of the present disclosure improve user interactions with targeted recommendations by allowing a gig-economy worker and/or customer to potentially generate revenue during a gig-economy trip (e.g., a transportation network trip) by interacting with the targeted recommendations.

Figure 12D:
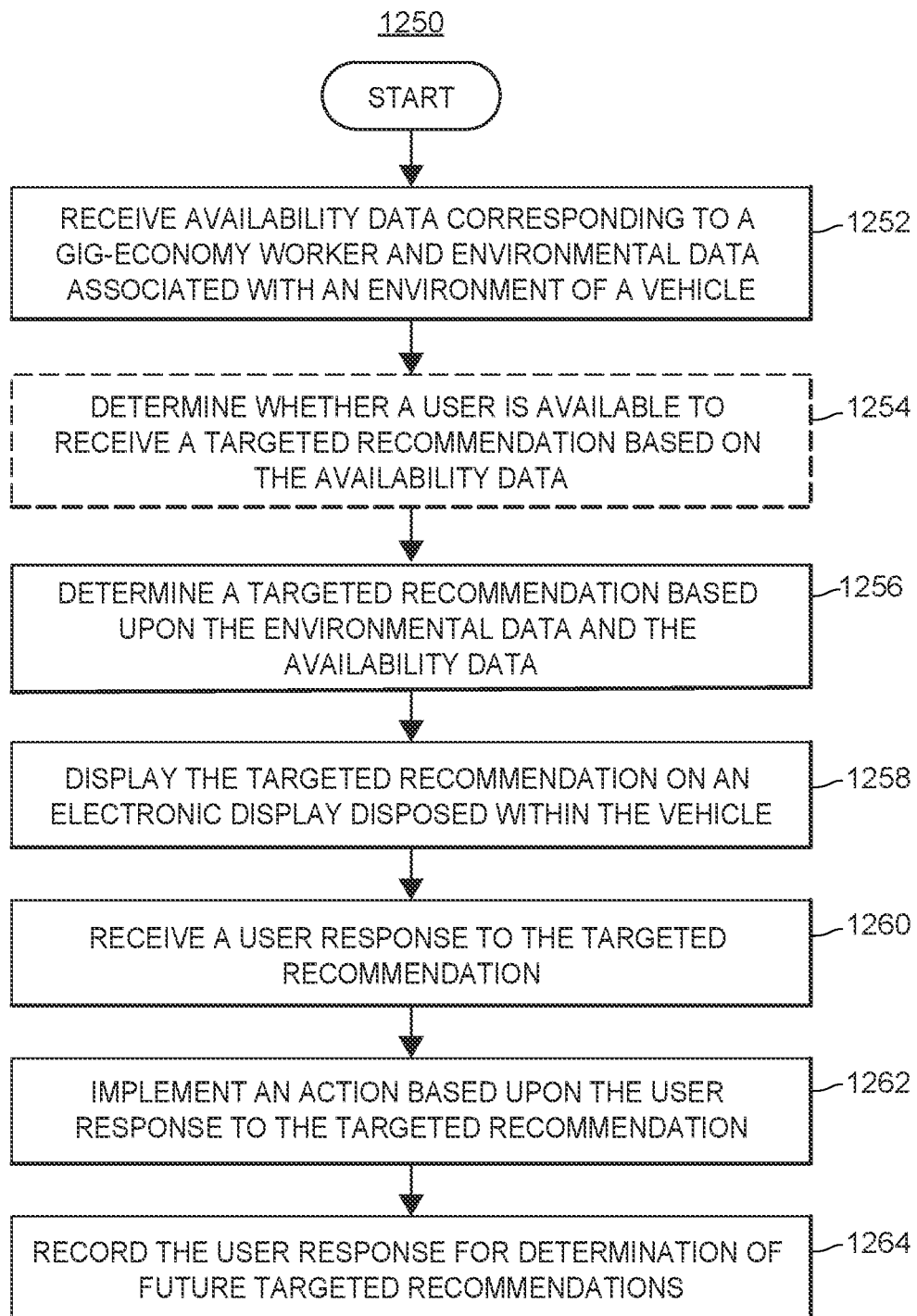
FIG. 12D illustrate a flow diagram depicting an exemplary computer-implemented method corresponding to various embodiments of the present disclosure.

B. Examplary Methods for Facilitating Targeted Recommendation Display for Transportation Network Trips FIG. 12D is a flowchart depicting an exemplary computer-implemented method 1250 corresponding to various embodiments of the present disclosure. The method 1250 begins at block 1252 where, for example, a computer processor (e.g., electronic device 1214) receives availability data corresponding to a gig-economy worker and environmental data associated with an environment of a vehicle (e.g., vehicle 1212). The availability data may indicate a beginning of a commercial interaction between the gig-economy worker and a customer (e.g., gig-economy customers 21). However, it should be understood that the availability data may indicate a gig-economy worker activating a gig application on a mobile device and/or any other suitable action or combination thereof. For example, the gig-economy worker may activate a gig application on a mobile computing device (e.g., mobile computing device 110) to initiate participation in the gig-economy system 100. By activating the mobile application, the mobile computing device may transmit the availability data to an external server (e.g., fleet management server 45) to facilitate the gig-economy worker matching with a customer, as described herein.

Moreover, the availability data may include profile information relating to the gig-economy worker and/or a customer who accepts a gig with the gig-economy worker. The profile information included in the availability data may generally relate to any activity taken by the gig-economy worker and/or customer on gig applications. For example, in some embodiments, the availability data may include a gig-economy worker purchasing history or a customer purchasing history. Block 1252 may be performed by, for example, the electronic device 1214.

The environment may be an area located proximate to and/or extending away from the vehicle 1212. For example, the environment may be or include a street, highway, interstate, sidewalks, crosswalks, front lawns, parking lots, etc. Moreover, the environment and the environmental data may include a current route traveled by the gig-economy worker during a gig. For example, the environmental data may indicate a set of individuals and landmarks associated with the environment of the vehicle 1212, and entities/situations likely to be encountered on the current route (e.g., traffic conditions along the current route). In some embodiments the environmental data may include one or more of: (i) a road condition, (ii) a weather condition, (iii) a nearby traffic condition, (iv) a road type, (v) a construction condition, (vi) a presence of pedestrians, or (vii) a presence of other obstacles.

In some embodiments, the computer processor (e.g., electronic device 1214) may receive the environmental data from one or more of (i) vehicle-to-vehicle (V2V) communication protocols, (ii) vehicle-to-infrastructure (V2I) communication protocols, or (iii) one or more mobile devices. For example, the computer processor may communicate, via the transceiver 1226, with other vehicles to determine environmental data concerning another vehicle and its occupants. The computer processor may receive environmental data such as the year, make, model, VIN of another vehicle, and/or any associated user information linked with the vehicle data. As one example, the environmental data received from another vehicle may be associated with a gig-economy worker profile of the driver of the other vehicle. The vehicle 1212 may access this gig-economy worker profile and extract other information from the profile that may be relevant. The profile may indicate, inter alia, number of gigs completed, typical driving patterns/locations, length of average gig, ratings received in gig applications, targeted recommendations displayed and/or interacted with, and/or any other suitable information or combination thereof. As discussed further herein, the external processing server 1215 may receive and use such information when determining a targeted recommendation for display on the electronic display 1213.

In certain embodiments, detecting the environmental data may further include capturing the environmental data via the imaging sensor 1228. The imaging sensor 1228 may include an image sensor, and the image sensor may be configured to capture a set of digital images. The set of digital images may be included in or otherwise comprise the environmental data. Generally, the electronic device 1214 includes a field of view (FOV) indicating an area where the electronic device's 1214 sensors (e.g., imaging sensor 1228) are capable of capturing data (e.g., environmental data). In certain embodiments, the vehicle 1212 may have a sensor or sensors surrounding its exterior and thus may have an effective FOV corresponding to the entire surrounding environment of the vehicle or any portion of the surrounding environment therein.

Moreover, and as discussed further herein, the FOV may have a range of any suitable degree to capture the necessary environmental data. For example, the electronic device's 1214 sensors may be disposed at a plurality of locations around the vehicle 1212 such that the entire environment (e.g., 360° view surrounding the vehicle 1212) is captured to yield environmental data.

To illustrate, the imaging sensor 1228 may capture a set of digital images featuring a set of individuals and landmarks associated with the environment of the vehicle 1212. The imaging sensor 1228 may capture the set of digital images in response to receiving the availability data or otherwise confirming the gig-economy worker's participation in a gig, and/or in response to the proximity sensor or any other sensor included in the imaging sensor 1228 detecting the presence of at least one entity within a FOV of the imaging sensor 1228.

The imaging sensor 1228 may also include a proximity sensor, and the proximity sensor may be configured to capture a set of proximity data. The proximity data may be indicative of a set of distances from the vehicle 1212 to individuals, landmarks, and/or other entities within the vehicle 1212 environment. To illustrate, the proximity sensor may capture a set of proximity data indicative of a set of distances from the vehicle 1212 for each of a set of landmarks (e.g., buildings within viewing distance of the vehicle 1212). The proximity sensor may further determine that a restaurant is 20 feet from the vehicle 1212, a clothing store is 50 feet from the vehicle 1212, a gas station is 100 feet from the vehicle 1212, etc. Additionally, the proximity sensor may determine that the restaurant is 20 feet from the right rear panel of the vehicle 1212, the clothing store is 50 feet from the left rear panel of the vehicle 1212, etc.

In certain embodiments, the electronic device 1214 may transmit, via the transceiver 1226, the set of distances and the set of digital images to the external processing server 1215. As discussed further herein, the external processing server 1215 may then determine the targeted recommendation by correlating the set of distances with the set of digital images. For example, the external processing server 1215 may prioritize recommendations that are more relevant to the landmarks that are closer to the vehicle 1212, and thus, the electronic device 1214.

After the electronic device 1214 captures the environmental data, the device 1214 may analyze the environmental data to determine the individuals, landmarks, and/or other entities included therein. These individuals, landmarks, and/or other entities may be categorized and transmitted to the external processing server 1215 or a targeted recommendation model stored in memory 1224 to determine a targeted recommendation. The computer processor may use any of a number of extraction techniques to generate the demographic data from the environmental data.

The computer processor may include (i) facial recognition, (ii) object recognition (OR), (iii) optical character recognition (OCR), and/or any other suitable extraction technique. Moreover, the computer processor may incorporate other relevant features into the environmental data. For example, the computer processor may include a location of the vehicle, a time when the image sensor captured the set of digital images, weather conditions included in the images (e.g., snow, rain, fog, etc.), and/or any other suitable features or combination thereof.

The method 1250 continues at optional block 1254 by determining whether a user is available to receive a targeted recommendation based upon the availability data. Generally, if a gig-economy worker or customer does not have a gig application active, they may be unavailable to receive a targeted recommendation. If the gig-economy worker or customer has a gig application active, but has not currently accepted/requested a gig, or has recently completed a gig, they may be available to receive a targeted recommendation. However, if the gig-economy worker is currently performing a gig (e.g., driving a customer to a destination), then the gig application may be active, but the gig-economy worker may be unavailable for a targeted recommendation. Accordingly, the electronic device (e.g., electronic device 1214) executing the gig application may determine whether a gig-economy worker and/or customer is available to receive a targeted recommendation based upon the availability data, for example, by determining whether the gig-economy worker is actively performing a gig.

If the availability data indicates the vehicle is moving along a route specified by the gig application (e.g., from point A to the customer's destination), then the electronic device may determine that the gig-economy worker is unavailable to receive a targeted recommendation. Similarly, if the availability data corresponding to a customer indicates that the customer recently completed a gig (e.g., reached their destination), then the electronic device may determine that the customer is unavailable to receive a targeted recommendation. Optional block 1254 may be performed by, for example, the electronic device 1214.

Additionally or alternatively, the availability data may include information a gig application provider or platform provider may use to vet and qualify gig-economy workers. For example, the availability data may include accident information, telematics information, and/or other suitable information to indicate whether a gig-economy worker qualifies to receive/display and/or profit from targeted recommendations.

The targeted recommendation platform may include multiple tiers of targeted recommendations which may include different vendors and/or messages and may further include different qualifications based upon the availability data. For example, a first vendor may submit three distinct targeted recommendations for display within a gig-economy worker vehicle.

The first targeted recommendation may be included in a first tier of the targeted recommendation platform, may include a first message, may have a relatively small profit share with the gig-economy worker, and may require a low level of qualification (e.g., below average reviews, below average time spent working via gig application, etc.) to display. The second targeted recommendation may be included in a second tier of the targeted recommendation platform, may include a second message, may have a relatively average profit share with the gig-economy worker, and may require a medium level of qualification (e.g., average reviews, average time spent working via gig application, etc.) to display. The third targeted recommendation may be included in a third tier of the targeted recommendation platform, may include a third message, may have a relatively large profit share with the gig-economy worker, and may require a high level of qualification (e.g., above average reviews, above average time spent working via gig application, etc.) to display The method 1250 continues at block 1256 by determining a targeted recommendation based upon the environmental data and the availability data. Generally, a targeted recommendation may be a message from a participating vendor or other entity that is intended to provide the viewer with relevant information for that viewer. For example, in certain embodiments, the targeted recommendation may include (i) a survey, (ii) a coupon, (iii) a special offer, and/or (iv) an advertisement. Block 1256 may be performed by, for example, the electronic device 1214.

The computer processor may determine the targeted recommendation based upon a stored selection of recommendations (e.g., stored in database 1230 and/or message database 1238), the computer processor may receive a targeted recommendation from an external source (e.g., message provider device 1216), the computer processor may retrieve a relevant recommendation from an external source (e.g., external databases 1217), and/or the computer processor may generate a targeted recommendation based upon a targeted recommendation model (e.g., stored in memory 1224). The targeted recommendations may include surveys, advertisements, coupons, interactive video/audio displays, videos, audio recordings, and/or any other suitable data or combination thereof.

For example, the computer processor may analyze the environmental data to determine a set of tags representative of a set of landmarks indicated in the environmental data. This set of tags may include data corresponding to any of the information indicated herein, including vehicle location, time of day, weather, building location, logos, street sign text, geolocation data, and/or any other suitable environmental indication. Using this set of tags, the computer processor may determine a targeted message by applying a targeted recommendation model to the set of tags.

The targeted recommendation model may utilize machine learning, such as a convolutional neural network or any other suitable machine learning architecture. For example, the targeted recommendation model may associate the set of tags included in the environmental data with the corresponding tags included in each of a stored set of messages. The stored message that includes the most tags corresponding with the set of tags included in the environmental data may be selected for display.

To illustrate, assume the computer processor (e.g., electronic device 1214) generates environmental data indicative of a set of landmarks adjacent to a roadway which a gig-economy worker is actively transporting a customer along a route planned by the corresponding gig-economy application. As mentioned, the electronic device 1214 may generate this environmental data through use of mapping/geolocation technology accessed through the gig-economy application platform, through the use of on-board sensors (e.g., imaging sensor 1228), through the access to gig-economy worker profiles and customer profiles, and/or any other suitable source. Thus, further assume that the computer processor accesses profiles for both the gig-economy worker and the customer to retrieve customer profile data and gig-economy worker profile data.

In this example, the environmental data may indicate that the set of landmarks includes a grocery store, a gas station, a clothing store, and a fast food restaurant; and the customer profile data may indicate that the customer has taken several trips to the clothing store while utilizing the services of a gig-economy worker. The computer processor may utilize the targeted recommendation model to determine that a targeted recommendation regarding a coupon for the clothing store should be displayed to the customer. If a targeted recommendation corresponding to the clothing store exists in memory (e.g., memory 1224) or can be retrieved from an external source (e.g., message database 1238), then the computer processor may simply display the targeted recommendation to the customer via the electronic display 1213 disposed in the vehicle 1212.

However, if a targeted recommendation corresponding to the clothing store does not exist in memory, the targeted recommendation is outdated, or the computer processor cannot otherwise simply retrieve a targeted recommendation, the computer processor may utilize the targeted recommendation model to generate a targeted recommendation. For example, if the computer processor accesses, via the network 1218, a website or other database corresponding to the clothing store, the computer processor may retrieve relevant information about the clothing store to include in the targeted recommendation. The computer processor may retrieve the clothing store hours, address, sales/deals information associated with the particular store location identified in the environmental data, and/or any other suitable data. Accordingly, the computer processor may extract the time of day from a timestamp of the environmental data to determine whether the clothing store is open, and whether any potential sales/deals identified from the store website or other suitable source are available to the customer. Assuming that the customer is passing or approaching the clothing store during business hours and while a sale/deal is currently ongoing, the computer processor may automatically generate, via the targeted recommendation model, a targeted recommendation for the customer indicating the current sale/deal at the clothing store (e.g., "50% off all items at X clothing store," etc.)

Moreover, in this example, the computer processor may generate a survey style targeted recommendation for the customer based upon their profile information (e.g., purchasing history, travel locations, etc.). The computer processor may utilize the targeted recommendation model to generate a survey/questionnaire regarding the types of clothing (e.g., clothing brands, apparel types, etc.) a customer may prefer or prefer to learn more about. The computer processor may access the clothing store website to extract various brands, clothing types, and/or other relevant information from the website to generate a survey containing topics on which the customer may vote or otherwise express an opinion or interest. For example, the computer processor, using the targeted recommendation model, may generate a survey style targeted recommendation asking the customer which popular brands of clothing the customer may be interested in purchasing, learning more about, receiving discounts for, being notified of sales, etc. The survey may also ask the customer about types of clothing the user is interested in purchasing, after which, the computer processor may provide brand recommendations that cater to the clothing types the customer indicated.

In certain embodiments, the computer processor (e.g., electronic device 1214, external processing server 1215) determines the targeted recommendation by correlating the set of distances captured by the proximity sensor with the set of digital images captured by the image sensor. For example, the set of digital images may indicate a set of landmarks displaced at various distances from the vehicle 1212, as will be correspondingly indicated in the set of distances. The computer processor may, in part, determine the targeted recommendation by determining a message that is more relevant to the landmarks with a smaller associated distance in the set of distances.

To illustrate, assume there are two landmarks included in the environmental data. The first landmark is a clothing store located near an upcoming exit ramp of an interstate highway that is part of a route for a customer of a gig-economy worker. The second landmark is a gas station near a subsequent exit ramp of the interstate highway that is beyond the route for the customer (e.g., further along the interstate and past the customer's exit). The computer processor may search for targeted recommendations for both landmarks, but may prioritize a targeted recommendation for the clothing store. The clothing store is along the route of the customer, and thus increases the chance the customer will take advantage of the targeted recommendation, and the gas station may be of minimal interest to the customer because they are not currently driving a vehicle (e.g., vehicle 1212) that would utilize a gas station. The computer processor may analyze the distances in the set of distances to make this determination, and correspondingly weight the remaining data associated with the clothing store more heavily than the data associated with the gas station when making the targeted recommendation determination. Accordingly, the computer processor may determine a targeted recommendation that is relevant to some and/or all landmarks identified in the environmental data, but that is more relevant to the closer landmarks or those landmarks that are nearby the current route of a customer.

In certain embodiments, determining the targeted recommendation comprises transmitting the environmental data to an external processing server (e.g., external processing server 1215). Once the external processing server 1215 receives the transmitted environmental data, the server 108 may determine the targeted recommendation from the environmental data, and transmit the targeted recommendation to the electronic device 1214.

The method 1250 continues at block 1258 by displaying the targeted recommendation on an electronic display disposed within the vehicle (e.g., vehicle 1212). Generally, and as previously mentioned, the electronic display (e.g., electronic display 1213) may be an interactive interface of the vehicle, an electronic device of the gig-economy worker, and/or an electronic device of the customer. For example, the electronic display 1213 may be disposed on the back of a head rest within the vehicle 1212, or the computer processor may display the targeted recommendation via a customer's electronic device through the gig-economy application. In certain embodiments, the electronic display may be non-interactive, and may present discount/sale/deal information the customer or gig-economy worker may read from the electronic display, scannable codes (e.g., QR codes), and/or other information which the user is unable to access or influence by touching, swiping, or otherwise physically interacting with the electronic display. Block 1258 may be performed by, for example, the electronic display 1213.

As mentioned herein, in certain embodiments, the electronic display 1213 and the electronic device 1214 may be communicatively connected, but physically separate elements. For example, the electronic device 1214 may be located in the vehicle 1212 interior (e.g., as a connected component of the engine control unit (ECU)), while the electronic display 1213 is disposed within the vehicle 1212. Accordingly, in certain embodiments where the electronic device 1214 and the electronic display 1213 are physically separate elements, if the electronic device 1214 determines the targeted recommendation, the electronic device 1214 may transmit the targeted recommendation to the electronic display 1213 to display the targeted recommendation for viewing by the gig-economy worker, the customer, and/or any other suitable recipient. The gig-economy worker, the customer, and/or other suitable recipient may view the targeted recommendation, and may receive the message contained therein, interact with the targeted recommendation, and/or perform other suitable actions in accordance with the particular targeted recommendation displayed.

In certain embodiments, prior to displaying a targeted recommendation, the computer processor may display an opt-in option for viewing by a customer, gig-economy worker, and/or other suitable recipient. Generally, the opt-in option may indicate to the customer that they have an option to receive targeted recommendations based upon their routes, historical usage of gig-economy applications, customer profile information, and other suitable information. For example, a customer may initiate a gig-economy application to ride from point A to point B. Shortly after being picked up at point A, the gig-economy application may prompt the customer to either opt-in or opt-out of receiving targeted recommendations.

If the customer opts-out of receiving targeted recommendations, the computer processor may refrain from receiving environmental data, determining a targeted recommendation, and displaying the targeted recommendation for the duration of the current gig from point A to point B. If the customer opts-in to receiving targeted recommendations, the computer processor may immediately or at any point during the current gig from point A to point B receive environmental data, determine a targeted recommendation, and display the targeted recommendation to the customer.

Moreover, in certain embodiments, the targeted recommendations may indicate an amount of expected revenue the customer, gig-economy worker, and/or other suitable recipient may receive as a result of receiving the targeted recommendations. Generally, the targeted recommendations may provide a customer or gig-economy worker an opportunity to generate personal revenue by answering questions (e.g., in a survey type recommendation) or by otherwise interacting with the targeted recommendations (e.g., scanning a displayed QR code).

The computer processor may calculate or otherwise access a revenue amount associated with each targeted recommendation, and include the revenue amount before, during, or after displaying the targeted recommendation. For example, the computer processor may display to a customer a topic for a survey type targeted recommendation, along with an associated revenue the customer may earn as a result of completing the survey type targeted recommendation. Once the customer completes the survey type targeted recommendation, the computer processor may authorize a transfer of funds in the amount of the associated revenue from an account associated with the survey type targeted recommendation to an account associated with the customer.

In certain embodiments, and responsive to causing the electronic display to display the targeted recommendation, determining one or more of (i) a benefit or (ii) an incentive associated with a policy associated with the gig-economy worker. Generally speaking, a gig-economy worker and/or a customer may receive targeted recommendations during a gig as a means to generate more personal revenue. Gig-economy workers may interact with the electronic display to acknowledge targeted recommendations while waiting for a customer to arrive or in between gigs, but a gig-economy worker may be unable to interact with the electronic display while driving. Accordingly, when a gig-economy worker has a gig-application active, the computer processor may preferentially offer the gig-economy worker targeted recommendations when the gig-economy worker is not actively performing a gig. If the computer processor determines that the gig-economy worker acknowledges the targeted recommendation while not performing a gig, the computer processor may also determine that the gig-economy worker should receive a beneficial impact to their associated policy (e.g., a gig policy).

Correspondingly, the computer processor may transmit a notification to the external processing server 1215 indicating the intended benefit (e.g., lower premium, lower deductible, elevated coverage level, etc.). The external processing server 1215 may then access the insurance policy and apply the benefit to the insurance policy. In this way, the system (1211, 1220) facilitates both targeted recommendation display for those within the vehicle 1212, and an improved insurance incentive program whereby users (e.g., insurance customers) have increased satisfaction through lower insurance rates and higher levels of service.

The method 1250 continues at block 1260 by receiving a user response to the targeted recommendation. Generally, the user response may include a gig-economy worker and/or a customer interacting with the display to select responses to questions, scanning the display to receive a scannable code or other message displayed thereon, and/or any other suitable response. For example, the targeted recommendation may be a survey-type, wherein the user response may include a series of responses to questions posed in succession on the electronic display.

If the electronic display is interactive, the user response may include the gig-economy worker and/or customer touching, swiping, gesturing, reading aloud, and/or otherwise interacting with the electronic display. If the electronic display is non-interactive, the user response may include the gig-economy worker and/or customer capturing one or more images of the display, scanning the display, and/or otherwise extracting the information contained in the targeted recommendation. Block 1260 may be performed by, for example, the electronic device 1214.

The method 1250 continues at block 1262 by implementing an action based upon the user response to the targeted recommendation. Once the user (e.g., gig-economy worker and/or customer) provides a user response to the targeted recommendation, the electronic device may transmit the user response to an external computing device (e.g., the external processing server 1215, the message provider device 1216, etc.) where the user response may be processed. Based upon the information contained in the user response, the external computing device may determine and implement a corresponding action. Block 1262 may be performed by, for example, the processor 1222, the external processing server 1215, and/or the message provider device 1216.

Generally speaking, the corresponding action may indicate an interaction with a user profile, a signal to a vendor website/platform, and/or any other suitable action configured to acknowledge the user response. For example, a customer may complete a survey-type targeted recommendation and interact with the user interface to indicate the completion of the survey. The computer processor may transmit the indication of the completed survey to a vendor server that is managed by a vendor that sponsored the survey to inform the vendor server of the user that completed the survey. The indication may include user profile information corresponding to the customer, and as a result, the vendor server may perform an action by transmitting/applying a discount related to goods/services provided by the vendor to the user profile corresponding to the customer. Moreover, the action may correspond to the message provider device 1216 or other suitable device/processor initiating a transfer of funds from a message provider account to an account associated with the customer.

In certain embodiments, the action may correspond to a benefit applied to an insurance policy (e.g., a gig policy), such as a lower premium, a lower deductible, a broader coverage base, a higher policy limit, etc. However, it will be appreciated that the action may be any suitable type of benefit application, incentive receipt, and/or other suitable response or combination thereof.

In certain embodiments, and responsive to receiving the user response from the customer or gig-economy worker, the computer processor may determine a follow-up question/series of questions, and/or submit the received response information to a vendor, sponsor, or other suitable entity. For example, if a targeted recommendation provides a customer or gig-economy worker with a discount code for a fast food restaurant in the form of a QR code, the customer may scan the QR code with a smartphone or other suitable device. The smartphone may then transmit a receipt signal through the gig-economy application to acknowledge receipt of the targeted recommendation. The computer processor may then transmit the acknowledgement to a server/database or other suitable resource associated with the fast food restaurant to indicate that their discount code is being scanned as a result of the targeted recommendations.

Additionally or alternatively, the computer processor may record the acknowledgement for use in future determinations of targeted recommendations. For example, the computer processor may prioritize targeted recommendations associated with the fast food restaurant, fast food restaurants, food related recommendations, and/or any suitable categorization or combination thereof.

Accordingly, the method 1250 continues at block 1264 by recording the user response for determination of future targeted recommendations. Generally, the external processing server 1215 or a targeted recommendation model stored in memory 1224 used to determine a targeted recommendation may receive the user response, and store the response in memory to inform future targeted recommendations. The external processing server 1215 and/or the targeted recommendation model may extract individual responses/interactions and user profile data from the user response to determine correlations between responses given and user characteristics. Block 1264 may be performed by, for example, the memory 1224, the external processing server 1215, and/or the message provider device 1216.

For example, if a user response indicates that a young customer responded to a survey-type targeted recommendation related to a first clothing store, the external processing server 1215 and/or the targeted recommendation model may preferentially display a similar/identical survey-type targeted recommendation related to the first clothing store to other young customers.

Moreover, the external processing server 1215 and/or the targeted recommendation model may analyze individual responses within the user response to determine correlations that are user-specific. For example, if a gig-economy worker completes a survey-type targeted recommendation related to fast food restaurants, the external processing server 1215 and/or the targeted recommendation model may analyze each response to determine fast food preferences of the gig-economy worker. The gig-economy worker may indicate that they prefer a first fast food restaurant over a second fast food restaurant. Accordingly, the external processing server 1215 and/or the targeted recommendation model may preferentially display future targeted recommendations corresponding to the first fast food restaurant for the gig-economy worker.

As will be apparent from the above description, and as should be appreciated with respect to all examples presented herein, the functions or operations shown in FIG. 12D may be performed in any suitable order, any desired number of times, and/or with any suitable variation to the particular order and/or combination shown so as to achieve a desired result, such as a desired manner of facilitating targeted recommendation display within gig-economy vehicles.

By providing systems and methods that facilitate targeted recommendation display within gig-economy vehicles as described herein, various advantages are achieved. For example, the systems and methods provide and/or are implemented through the use of devices that provide information particularly suited for use with other features of the systems and methods to facilitate targeted recommendation display within gig-economy vehicles. Notably, the systems and methods provide a seamless, real-time solution to detecting environmental data associated with an environment of a vehicle, determining a targeted recommendation from the environmental data, and displaying the targeted recommendation. The targeted recommendations are more relevant than the static, general messages on conventional display devices because they are dynamically updated, targeted, and generated/determined for the gig-economy worker and/or customer.

The systems and methods of the present disclosure can generate targeted recommendations based upon travel routes extracted from the gig-economy applications and profile information associated with the gig-economy worker and/or customer. Moreover, the systems of the present disclosure improve user interactions with targeted recommendations by allowing a gig-economy worker and/or customer to potentially generate revenue during a gig-economy trip (e.g., a transportation network trip) by interacting with the targeted recommendations. Other advantages will be recognized by one of ordinary skill in the art in light of the teaching and disclosure herein.

Exemplary Gig-Economy Services Coordination and Mobilization

At any given time, only a small portion of all gig-economy workers are engaged in gig-economy activities or indicate themselves as available for gig-economy work. Some portion of the remaining gig-economy workers would be available to accept new gigs if they knew such gigs to be available, but they may be logged out of the relevant gig-economy platform applications or may have silenced notifications relating to gig demand. During emergencies, such as natural disasters, there may be an urgent need for certain gig-economy services such as on-demand transportation. Likewise, non-emergency situations may create irregularly occurring or non-recurring intervals of elevated demand for gig-economy services, which may be local to areas associated with triggering events.

For example, a large corporate event, political or civic event, or entertainment event may result in an interval of high demand for on-demand transportation services in an area near the event. Similarly, a powerful storm system may subsequently result in an interval of high demand for gig-economy work related to repair of water damage, roof damage, or damage to landscaping elements.

Figure 13:
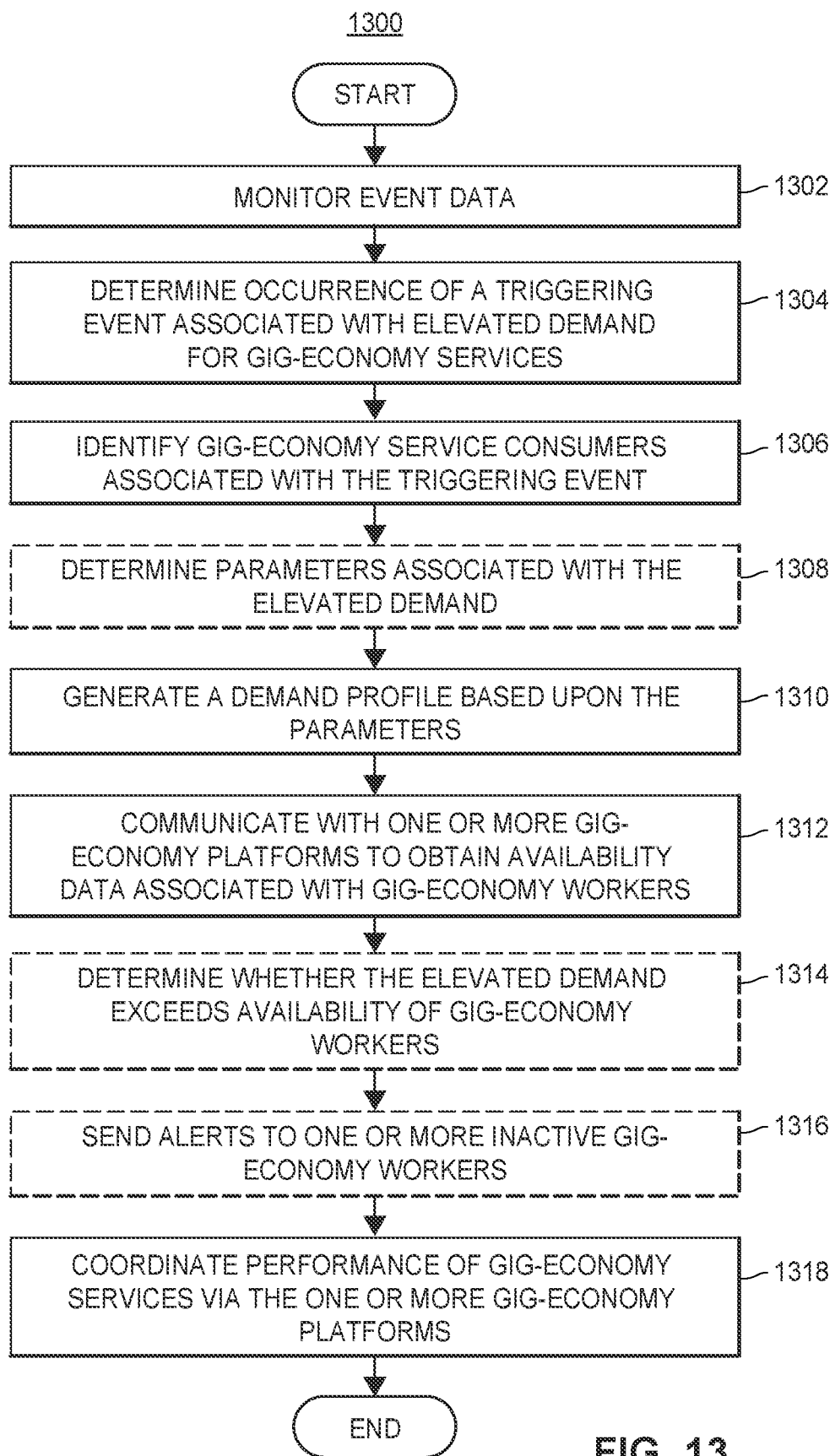
FIG. 13 illustrates a flow diagram of an exemplary computer-implemented method for coordination and mobilization method for providing gig-economy services to gig-economy service consumers during times of elevated demand.

FIG. 13 illustrates a flow diagram of an exemplary coordination and mobilization method 1300 for providing gig-economy services to gig-economy service consumers during times of elevated demand. Such methods may be implemented by a server 40 of a gig-economy service coordinator (e.g., an insurer or third party) to facilitate provisions of gig-economy services to gig-economy service consumers. The gig-economy service consumers may be gig-economy customers 21 (or associated customer computing devices 20) who obtain the performance of gig-economy services, but who may or may not directly pay for such services.

The coordination and mobilization methods may be used to coordinate gig-economy workers and gig-economy service consumers for gigs during transient intervals of high demand relative to supply of gig-economy services. For example, to coordinate performance of gig-economy services during times of elevated demand, the server 40 may be further configured to communicate with gig-economy platforms (e.g., on-demand services network platforms 70) to match or otherwise facilitate gigs for gig-economy workers and gig-economy service consumers. In some embodiments, this may include providing discount codes to gig-economy service consumers or providing incentives to gig-economy workers.

In further embodiments, the methods may involve mobilization of gig-economy workers to meet high demand caused by triggering events. As an example, to accommodate elevated demand, the server 40 may be further configured to determine the occurrence of a triggering event (e.g., an observed spike in demand or an event expected to significantly increase demand in the immediate future), identify a plurality of currently inactive gig-economy workers (e.g., gig-economy workers who are signed-out of a gig-economy platform or scheduled as unavailable for gig-economy work but not currently performing a gig) based upon user profiles indicating past performance of relevant types of gigs, and cause alert notifications to be sent to the identified gig-economy workers (e.g., by communication with a gig-economy platform server or by direct communication with a plurality of mobile computing devices 110 associated with the identified gig-economy workers). In some embodiments, the alert notifications may include details regarding the gig demand, such as causes of the increased demand, expected duration of the increased demand, or locations of the increased demand. In further embodiments, similar methods may be implemented including additional, fewer, or alternative aspects.

The exemplary coordination and mobilization method 1300 may begin with monitoring event data concerning potential triggering events (block 1302). The event data may be evaluated to determine the occurrence of a triggering event associated with elevated demand for gig-economy service (block 1304). In some embodiments, gig-economy service consumers associated with the triggering event (e.g., gig-economy customers located in an affected area) may be identified (block 1306). Parameters associated with the elevated demand may also be determined (block 1308), such as demand quantity, duration, or location. From such parameters, a demand profile may then be generated (block 1310) and communicated to one or more gig-economy platforms in order to obtain availability data associated with the availability of gig-economy workers to meet the elevated demand (block 1312). In some embodiments, the method may include determining whether the elevated demand exceeds the availability of the gig-economy workers (block 1314) and, if so, sending alerts to inactive gig-economy workers to notify them of the elevated demand (block 1316). Performance of gig-economy service is coordinated via the one or more gig-economy platforms (block 1318), which may include connecting gig-economy workers with gig-economy service consumers or otherwise facilitating payment or incentives for relevant gigs.

At block 1302, the server 40 may monitor event data relating to triggering events associated with elevated levels of demand for gig-economy services. Such event data may include data regarding emergency conditions, natural disasters, severe weather, large gatherings, or other similar triggering events. The event data may include data regarding triggering events that have already occurred (e.g., past severe weather conditions), are presently occurring (e.g., evacuation due to emergency conditions in an area), or are scheduled to occur at a future time (e.g., planned entertainment, civic, charitable, or other events). Monitoring event data may include evaluating data at the server 40, collecting data from external data sources, or receiving a notification from a party associated with a triggering event.

In some embodiments, a party associated with a planned future event (e.g., an event organizer) may provide event data to the server 40 via the network 3 as an indication of the future event (e.g., a notification or request to coordinate gig-economy services related to the event), which event data may be provided in a format accepted by application programming interfaces (APIs) of the server 40. In further embodiments, the server 40 may request or receive notifications regarding emergency conditions, such as severe weather alerts, emergency reports, or other data regarding events for which gig-economy services may be required.

In some embodiments, the server 40 may receive data from one or more external data sources providing data regarding events via the network 3, which may include current events or future events. Such external data sources may include data streams or sites, from which the server 40 may continuously or periodically collect event data. In some embodiments, the event data may be manually entered by an operator via an API of the server 40.

At block 1304, the server 40 may determine the occurrence of a triggering event associated with an elevated demand level over a limited interval of time based upon the event data. An indication of the triggering event may be generated based upon patterns identified or inferred from the event data (e.g., by identifying a type of event likely to cause a spike in demand for a type of gig-economy service), or an indication of the triggering event may be directly extracted from the event data (e.g., by extracting the indication from a notification or request of the triggering event provided to the server 40). Triggering events may include emergency conditions causing an elevated demand for gig-economy services, unscheduled events causing an elevated demand for gig-economy services, or scheduled events causing an elevated demand for gig-economy services.

Emergency conditions and unscheduled events may include hurricanes, fires, floods, other natural disasters, outbreaks of disease, chemical spills, civil unrest, or other similar conditions creating an elevated demand for related gig-economy services in areas associated with the triggering event. For example, natural disasters may be associated with an elevated demand for on-demand transportation services, followed by an elevated demand for repair services. Scheduled events may include private or public events organized by groups, entities, or individuals, such as company meetings, conferences, marathons, or concerts.

In some embodiments, determining the occurrence of a triggering event may include the determination of information associated with the triggering event, such as parameters relating to an associated area, an associated time, or a plurality of associated gig-economy service consumers. In some embodiments, determining the occurrence of the triggering event may include determining an upcoming interval of elevated demand associated with a current or future triggering event. For example, a scheduled future gathering or anticipated future severe weather conditions may be identified as triggering events occurring within projected time intervals.

Other triggering events may be determined to have occurred in the past yet cause an elevated demand for certain gig-economy services in the present or future. For example, a past emergency condition in an area may be determined to have occurred, causing property damage within an associated area. In such example, repair or maintenance gig-economy services may experience elevated demand after the emergency condition has passed.

At block 1306, in some embodiments, the server 40 may identify a plurality of gig-economy service consumers associated with the triggering event. The gig-economy service consumers may be gig-economy customers 21 (or associated customer computing devices 20) that are in some way associated with the triggering event. An association may be determined between the gig-economy service consumers and an area associated with the triggering event, such as by proximity to a location of the triggering event. As an example, the gig-economy service consumers may be identified as individuals currently located in or associated with an address within an area affected by the triggering event, such as individuals in an area being evacuated due to an emergency condition (e.g., hurricane, earthquake, fire, flooding, or chemical hazards). In some such embodiments, the server 40 may identify the gig-economy service consumers based upon geospatial coordinates from GPS units 250 of mobile computing devices 110 associated with the gig-economy service consumers. In some such embodiments, current or frequent locations of a predefined set of potential gig-economy service consumers may be determined and used to identify the gig-economy service consumers associated with an area of the triggering event, such as locations of individuals having accounts with the gig-economy service coordinator (e.g., home addresses of customers of an insurer).

An association may similarly be determined between the gig-economy service consumers and a party associated with the event, such as an organizer of a large gathering. As an example, employees of a company or volunteers of a charity event may be identified as gig-economy service consumers by organizations organizing large events. Such gig-economy service consumers may be identified by an organizer or other party associated with the triggering event in a notification or request sent to the gig-economy service coordinator.

In some embodiments, the gig-economy service consumers may be identified based upon other associations with a triggering event, such as insurance customers of an insurer who have filed claims related to property damage (e.g., flooding, roof damage, damaged trees, broken windows, or structural damage) following severe weather conditions.

At block 1308, the server 40 may determine parameters associated with the elevated demand for gig-economy services based upon the obtained or determined information. Such parameters may be determined based upon the event data or other data, including information regarding the triggering event, information from external data sources, information regarding identified gig-economy service consumers, or information provided in a request or notification to the gig-economy service coordinator (e.g., expected attendance at scheduled events). The parameters may indicate information relevant to the provisioning of gig-economy services, such as the following: one or more types of gig-economy services associated with the elevated demand, a demand quantity for the one or more types of gig-economy services (e.g., a level of total demand or incremental increase in demand), one or more times or intervals of time associated with the elevated demand (e.g., a time window during which demand is expected to be elevated), one or more areas or locations associated with the triggering event or with the elevated demand, one or more details of the gig-economy service demand (e.g., transportation distance, repair completion timing, or access limitations), one or more requirements for performance of the gig-economy services (e.g., equipment required, skills required, or minimum quality rating required), one or more price or cost levels associated with the gig-economy services, one or more priority levels associated with the elevated demand, or one or more incentives associated with performance of the gig-economy services.

The types of gig-economy services may include on-demand transportation services (e.g., transportation from an area impacted by emergency conditions, transportation to a scheduled event, or transportation from a scheduled event), repair or maintenance services (e.g., repair of property damage following severe weather, flooding, fire, or civil unrest), business support services (e.g., short-term logistics or delivery support), or other gig-economy services. The demand quantity may be an estimate of current demand associated with the triggering event or an estimate of future demand associated with a future triggering event (e.g., a scheduled corporate event, charitable activity event, political or civic event, or entertainment event).

At block 1310, the server 40 may generate a demand profile based upon the determined parameters. The demand profile may include indications of the parameters, such as actual or estimated demand quantity for a type of gig-economy service related to the triggering event. The demand profile may include additional relevant information related to the elevated demand, such as timing information or other information including or related to the determined parameters. In some embodiments, the demand profile may include indications of one or more gig-economy platforms for use in coordination or mobilization of gig-economy service performance, as discussed below. In further embodiments, the demand profile may be formatted in a manner for communication to the one or more gig-economy platforms.

At block 1312, the server 40 may communicate demand data with one or more gig-economy platforms to obtain availability data relating to gig-economy worker availability to perform the one or more types of gig-economy services. The demand data may be sent from the server 40 to APIs of the one or more gig-economy platforms via the network 3 to request or collect availability data, and responses including the availability data may be received by the server 40 via the network 3. In some embodiments, the server 40 may communicate with a fleet management server 45 or other server associated with each of the one or more gig-economy platforms to obtain the availability data.

The demand data may include the demand profile, data extracted from the demand profile, or data otherwise associated with the demand profile. Such demand data may indicate values of the parameters determined by the server 40, such as demand quantity. If the elevated demand is expected to occur at a future time, the demand data may further include an indication of the time or time interval associated with the demand quantity.

In response to communicating the demand data to the one or more gig-economy platforms, the server 40 may receive the availability data regarding availability of a plurality of gig-economy workers associated with the respective one or more gig-economy platforms. In order to provide more useful information, the availability data may be limited to gig-economy workers who match the parameters associated with the elevated demand, such as gig-economy workers performing one or more types of gig-economy services indicated in the demand data. The availability data may indicate overall availability of the plurality of gig-economy workers, without specifically indicating availability of specific workers. Alternatively, the availability data may indicate current, scheduled, or predicted availability of specific gig-economy workers. In some embodiments, availability data may be obtained by the server 40 from the one or more gig-economy platforms via associated APIs based upon parameters associated with time and location (and, where applicable, type of gig-economy service), without sending an indication of a demand quantity.

At block 1314, in some embodiments, the server 40 may use the availability data and the demand profile to determine whether the actual or estimated level of the elevated demand exceeds the availability of gig-economy workers to perform the gig-economy services. Such determination may be based upon the total demand and total availability, or it may be based upon the incremental demand above ordinary levels associated with the triggering event.

In some such embodiments, the server 40 may further determine one or more responses to the disequilibrium between the supply and demand of the gig-economy services, such as taking actions to increase availability or decrease demand. Increasing the supply of available gig-economy workers to perform the gig-economy services for the gig-economy service consumers may include alerting inactive gig-economy workers to the elevated demand, providing incentives to the gig-economy workers to perform the gig-economy services, or providing incentives to the one or more gig-economy platforms to prioritize the gig-economy consumers over other gig-economy customers. Decreasing the demand may include prioritizing a subset of gig-economy consumers for priority performance of gig-economy services (e.g., scheduling waves or groups of gig-economy consumers at different times), offering incentives to gig-economy service consumers to delay receiving gig-economy services, or adding disincentives for gig-economy service consumers.

At block 1316, in some embodiments, the server 40 may coordinate performance of gig-economy services by sending alerts or notifications to inactive gig-economy workers to increase availability of gig-economy workers to perform the gig-economy services associated with the triggering event. The alerts or notifications may be generated by the server 40 and transmitted to the inactive gig-economy workers (either directly or through the respective one or more gig-economy platforms) to indicate the elevated level of demand.

In some embodiments, such alerts or notifications may further indicate incentives to perform the gig-economy services. Such incentives may include bonus payments or other inducements to perform the type of gig-economy services associated with the elevated demand for the gig-economy service consumers, which may be the identified gig-economy service consumers. As an example, the server 40 may identify a plurality of inactive gig-economy workers providing on-demand transportation services based upon previous registration of the workers with the gig-economy coordinator or with respective gig-economy platforms to receive notifications of emergency demand or other elevated demand situations, which may include determining inactive gig-economy worker proximity to an area affected by the elevated demand based upon geospatial location data, then send alert notification to the identified inactive gig-economy workers. Thus, the inactive gig-economy workers may be notified of unexpected situations of elevated demand, such as emergency evacuation conditions.

At block 1318, the server 40 may coordinate performance of gig-economy services according to the determined parameters by the gig-economy workers for the gig-economy service consumers via the one or more gig-economy platforms. In some embodiments, such coordination may include obtaining performance of the gig-economy services through multiple gig-economy platforms, which may offer the same type of gig-economy services or different types of gig-economy services. Thus, in some embodiments, the server 40 may coordinate performance of one type of gig-economy service for the plurality of gig-economy service consumers by facilitating performance for some of the gig-economy service consumers through a first gig-economy platform and for other gig-economy service consumers through a second gig-economy platform (e.g., by assigning the individual gig-economy service consumers to different gig-economy platforms). In some embodiments, it may not be necessary, possible, or desirable to obtain performance for the gig-economy services for all of the gig-economy service consumers, so the server 40 may coordinate performance to the gig-economy services for only some of the gig-economy service consumers (e.g., the identified gig-economy service consumers).

Coordination of the performance of the gig-economy services may include connecting individually identified gig-economy service consumers with specific gig-economy workers through the APIs of the one or more gig-economy platforms. In some embodiments, such coordination may include providing user discount codes for the gig-economy services to the gig-economy service consumers. Such user discount codes may be obtained from the gig-economy platforms through their APIs (or provided to the gig-economy platforms through their APIs) to provide partial or full reductions in the cost of the gig-economy services provided to the gig-economy service consumers. The server 40 may obtain or generate user discount codes and provide such codes to the gig-economy service consumers (e.g., via e-mail, text message, or application notification on a mobile computing device of each identified gig-economy service consumer) for use in obtaining performance of the gig-economy services. The gig-economy service consumers may then enter such user discount codes into applications associated with the gig-economy platforms when obtaining the gig-economy services.

In some embodiments, similar codes may be provided to and used by the gig-economy service consumers to obtain priority performance of the gig-economy services, with or without a discount or surcharge. In further embodiments, coordinating performance of the gig-economy services may include providing incentives to the gig-economy workers for performing the gig-economy services for the gig-economy service consumers. Such incentives may include bonus payments to gig-economy services provided according to the determined parameters associated with the elevated demand, which bonus payments may be variable based upon aspects of such performance (e.g., based upon timing of performance, distance of travel, or other metrics of performance). In some such embodiments, the server 40 may provide indications of such incentives to the gig-economy workers via APIs of the gig-economy platforms, which indications may be tied to user codes or may be presented to the gig-economy workers via mobile applications related to the respective gig-economy platforms. Other methods of coordinating performance of the gig-economy services may additionally or alternatively be implemented in various embodiments.

Other Matters

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

With the foregoing, an insurance customer may opt in to a program to receive a reward, insurance discount, or other type of benefit. In some aspects, customers may opt in to a rewards, loyalty, or other program associated with gig-economy work monitoring, such as a rewards program that collects data regarding user driving in order to determine discounts for safe driving behavior. The customers may therefore allow a remote server to collect sensor, telematics, vehicle, mobile device, and other types of data discussed herein. With customer permission or affirmative consent, the data collected may be analyzed to provide certain benefits to customers. For instance, insurance cost savings may be provided to lower risk or risk averse customers. Recommendations that lower risk or provide cost savings to customers may also be generated and provided to customers based upon data analysis, as discussed elsewhere herein. Other functionality or benefits of the systems and methods discussed herein may also be provided to customers in return for them allowing collection and analysis of the types of data discussed herein. In return for providing access to data, risk-averse insureds, vehicle owners, or vehicle occupants may receive discounts or insurance cost savings on transportation-related insurance, as well as home, renters, personal articles, and other types of insurance from the insurance provider.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. For example, a module may comprise dedicated circuitry or logic that is permanently configured (e.g., as a special-purpose processor, such as a field programmable gate array (FPGA) or an application-specific integrated circuit (ASIC) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple such modules exist contemporaneously, communications may be achieved through signal transmission (e.g., over appropriate circuits and buses) that connect the modules. In certain embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and may operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the one or more processors or processor-implemented modules may be located in a single geographic location (e.g., at a location of a mobile computing device or at a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Such memories may be or may include non-transitory, tangible computer-readable media configured to store computer-readable instructions that may be executed by one or more processors of one or more computer systems.

As used herein any reference to "one embodiment," "an embodiment," "one example," or "an example" means that a particular element, feature, structure, or characteristic described in connection with the embodiment is included in at least one embodiment. The appearances of the phrases "in one embodiment," "in an embodiment," "in some embodiments," "in one example," "in some examples," or similar phrases in various places in the specification are not necessarily all referring to the same embodiment, the same example, or the same set of embodiments or examples.

Some embodiments may be described using the terms "coupled," "connected," "communicatively connected," or "communicatively coupled," along with their derivatives. These terms may refer to a direct physical connection or to an indirect (physical or communicative) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless the context clearly indicates otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for the systems and a methods disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the claims at the end of this patent are not intended to be construed under 35 U.S.C. § 112(f), unless traditional means-plus-function language is expressly recited, such as "means for" or "step for" language being explicitly recited in the claims. The systems and methods described herein are directed to an improvement to computer functionality, which may include improving the functioning of conventional computers in performing tasks.

What is claimed is:

1. A computer-implemented method for generating a transferable token for a gig-economy worker, the method comprising:
training, by one or more processors, a machine-learning model based upon a first set of data associated with a first geographic area and representing activities, behaviors, or work of the gig-economy worker;
determining, by the one or more processors, occurrence of a subsequent event associated with the machine-learning model or the first set of data, wherein the subsequent event comprises determining a second set of data representing the activities, behaviors, or work of the gig-economy worker contains sufficient data for training the machine-learning model as a model specific to a second geographic area, which second geographic area is contained within the first geographic area;

retraining, by the one or more processors, the machine-learning model using the second set of data;

collecting, by the one or more processors, telematics data indicating a plurality of driving behaviors of the gig-economy worker during performance of one or more gigs, wherein the plurality of driving behaviors comprise control actions performed by the gig-economy worker to control operation of one or more vehicles during vehicle trips;

receiving, at the one or more processors, data representing at least one of an activity, behavior or work of the gig-economy worker, the data including the telematics data;

responsive to receipt of the data, determining, by the one or more processors, at least one of a risk level or a risk profile for the gig-economy worker based upon the data by applying the machine-learning model to the data, wherein determining the at least one of the risk level or the risk profile includes determining a risk score for each of the plurality of driving behaviors indicated by the telematics data;

forming, by the one or more processors, the transferable token that includes a plurality of data entries, including the at least one of the risk level or the risk profile for the gig-economy worker and a baseline risk level indicating average risk for gig-economy workers performing similar gig-economy work as the gig-economy worker;

receiving, by the one or more processors, a request for the transferable token from a third party token consumer via an application programming interface (API); and providing, by the one or more processors via a network interface, the transferable token to the third party token consumer in response to the request.

2. The computer-implemented method of claim 1, further comprising determining aspects of the transferable token to indicate information related to least one of a second risk level or a second risk profile for use in offering a new or updated policy, service, agreement, or account.

3. The computer-implemented method of claim 1, wherein forming the transferable token includes determining the at least one of the risk level or the risk profile to indicate a general risk level associated with the gig-economy worker based upon performance of a first type of gig-economy work by the gig-economy worker and indicative of risk relating to a second type of gig-economy work by the gig-economy worker.

4. The computer-implemented method of claim 1, wherein the data includes an indication of at least one of the following with respect to performance of gig-economy work by the gig-economy worker: a quality of work performed, a rating associated with the gig-economy worker, or a reputation of the gig-economy worker.

5. The computer-implemented method of claim 1, further comprising:

receiving, by the one or more processors, additional data indicating aspects of performance of one or more gigs by the gig-economy worker; and updating, by the one or more processors, the transferable token by adjusting the at least one of the risk level or the risk profile based upon the additional data.

6. The computer-implemented method of claim 1, wherein the at least one of the risk level or the risk profile is further based upon at least one of an activity, a behavior or a work of another gig-economy worker.

7. The computer-implemented method of claim 1, wherein the transferable token is a first transferable token, the gig-economy worker is a first gig-economy worker, and further comprising:

receiving a second transferable token including at least one of a risk level or a risk profile for a second gig-economy worker based upon data the representing at least one of an activity, behavior or work of the second gig-economy worker; and offering a new or updated at least one of a policy, a service, an agreement, or an account to the second gig-economy worker based upon the second transferable token.

8. A system for generating a transferable token for a gig-economy worker, the system comprising:

a data collector implemented as a module by one or more processors configured to (i) collect telematics data indicating a plurality of driving behaviors of the gig-economy worker during performance of one or more gigs, wherein the plurality of driving behaviors comprise control actions performed by the gig-economy worker to control operation of one or more vehicles during vehicle trips, and (ii) receive data representing at least one of an activity, behavior or work of the gig-economy worker;

a machine-learning module implemented by one or more processors configured to: (i) train a machine-learning model based upon a first set of data associated with a first geographic area and representing activities, behaviors, or work of the gig-economy worker, (ii) determine occurrence of a subsequent event associated with the machine-learning model or the first set of data, wherein the subsequent event comprises determining a second set of data representing the activities, behaviors, or work of the gig-economy worker contains sufficient data for training the machine-learning model as a model specific to a second geographic area, which second geographic area is contained within the first geographic area, (iii) retrain the machine-learning model using the second set of data, and (iv) determine at least one of a risk level or a risk profile for the gig-economy worker based upon the telematics data and the data by applying the machine-learning model to the data, wherein determining the at least one of the risk level or the risk profile includes determining a risk score for each of the plurality of driving behaviors indicated by the telematics data;

a token generator implemented as a module by one or more processors configured to form the transferable token that includes a plurality of data entries, including the at least one of the risk level or the risk profile for the gig-economy worker and a baseline risk level indicating average risk for gig-economy workers performing similar gig-economy work as the gig-economy worker;

an application programming interface (API) implemented by one or more processors and configured to receive a request for the transferable token from a third party token consumer; and a network interface component configured to provide the transferable token to the third party token consumer via an electronic communication network in response to the request.

9. The system of claim 8, wherein the token generator is configured to determine aspects of the transferable token to indicate information representing at least one of a second risk level or a second risk profile for use in offering a new or updated policy, service, agreement, or account.

10. The system of claim 8, wherein the token generator is configured to determine the at least one of the risk level or the risk profile to indicate a general risk level associated with the gig-economy worker based upon performance of a first type of gig-economy work by the gig-economy worker and indicative of risk relating to a second type of gig-economy work by the gig-economy worker.

11. The system of claim 8, wherein the data includes an indication of at least one of the following with respect to performance of gig-economy work by the gig-economy worker: a quality of work performed, a rating associated with the gig-economy worker, or a reputation of the gig-economy worker.

12. The system of claim 8, wherein:
the data collector is configured to receive additional data indicating aspects of performance of one or more gigs by the gig-economy worker; and
the token generator is configured to update the transferable token by adjusting the at least one of the risk level or the risk profile based upon the additional data.

13. The system of claim 8, wherein the at least one of the risk level or the risk profile is further based upon at least one of an activity, a behavior or a work of another gig-economy worker.

14. A non-transitory computer-readable storage medium comprising computer-readable instructions for generating a transferable token for a gig-economy worker that, when executed by one or more processors, cause an apparatus to:
train a machine-learning model based upon a first set of data associated with a first geographic area and representing activities, behaviors, or work of the gig-economy worker;
determine occurrence of a subsequent event associated with the machine-learning model or the first set of data, wherein the subsequent event comprises determining a second set of data representing the activities, behaviors, or work of the gig-economy worker contains sufficient data for training the machine-learning model as a model specific to a second geographic area, which second geographic area is contained within the first geographic area;
retrain the machine-learning model using the second set of data;
collect telematics data indicating a plurality of driving behaviors of the gig-economy worker during performance of one or more gigs, wherein the plurality of driving behaviors comprise control actions performed by the gig-economy worker to control operation of one or more vehicles during vehicle trips;
receive data representing at least one of an activity, behavior or work of the gig-economy worker, the data including the telematics data;
responsive to receipt of the data, determine at least one of a risk level or a risk profile for the gig-economy worker based upon the data by applying the machine-learning model to the data, wherein determining the at least one of the risk level or the risk profile includes determining a risk score for each of the plurality of driving behaviors indicated by the telematics data;
forming a transferable token that includes a plurality of data entries, including the at least one of the risk level or the risk profile for the gig-economy worker and a baseline risk level indicating average risk for gig-economy workers performing similar gig-economy work as the gig-economy worker;
receive a request for the transferable token from a third party token consumer via an application programming interface (API); and
provide the transferable token to the third party token consumer in response to the request.

15. The non-transitory computer-readable storage medium of claim 14,
wherein the computer-readable instructions, when executed by the one or more processors, cause the apparatus to determine aspects of the transferable token to indicate information related to at least one of a second risk level or a second risk profile for use in offering a new or updated policy, service, agreement, or account.

16. The non-transitory computer-readable storage medium of claim 14, wherein the computer-readable instructions, when executed by the one or more processors, cause the apparatus to:
receive additional data indicating aspects of performance of one or more gigs by the gig-economy worker; and
update the transferable token by adjusting the at least one of the risk level or the risk profile based upon the additional data.

17. The non-transitory computer-readable storage medium of claim 14, wherein the transferable token is a first transferable token, the gig-economy worker is a first gig-economy worker, and wherein the computer-readable instructions, when executed by the one or more processors, cause the apparatus to:
receive a second transferable token including at least one of a risk level or a risk profile for a second gig-economy worker based upon data the representing at least one of an activity, behavior or work of the second gig-economy worker; and
offer a new or updated at least one of a policy, a service, an agreement, or an account to the second gig-economy worker based upon the second transferable token.

* * * * *

UNITED STATES PATENT AND TRADEMARK OFFICE
CERTIFICATE OF CORRECTION

PATENT NO. : 11,783,257 B1
APPLICATION NO. : 17/170830
DATED : October 10, 2023
INVENTOR(S) : Hannah Estes et al.

It is certified that error appears in the above-identified patent and that said Letters Patent is hereby corrected as shown below:

In the Claims

Column 77, Line 39, Claim 2, "to least" should be -- to at least --.

Column 78, Line 7, Claim 7, "upon data the" should be -- upon the data --.

Column 80, Line 47, Claim 17, "upon data the" should be -- upon the data --.

Signed and Sealed this
Thirtieth Day of April, 2024

Katherine Kelly Vidal
*Director of the United States Patent and Trademark Office*